(12) United States Patent
Desai et al.

(10) Patent No.: US 6,820,204 B1
(45) Date of Patent: Nov. 16, 2004

(54) SYSTEM AND METHOD FOR SELECTIVE INFORMATION EXCHANGE

(76) Inventors: Nimesh Desai, 13261 Tiburon Way, Tustin, CA (US) 92782; Sanjay Udani, 1930 Tamarind Ave., #8, Hollywood, CA (US) 90068; James David Kimble, Jr., 14040 Tahiti Way, #512, Marina Del Rey, CA (US) 90292-6511; Thomas P. Werges, 1334 Euclid Ave., #4, Santa Monica, CA (US) 90404; David Dean Richardson, 330 E. Cordova St., #311, Pasadena, CA (US) 91101; Jeffrey A. Gustafson, 10130 Lemona Ave., Mission Hills, CA (US) 91345

(*) Notice: Subject to any disclaimer, the term of this patent is extended or adjusted under 35 U.S.C. 154(b) by 0 days.

(21) Appl. No.: 09/541,890

(22) Filed: Mar. 31, 2000

Related U.S. Application Data

(60) Provisional application No. 60/127,114, filed on Mar. 31, 1999.

(51) Int. Cl.[7] .............................. G06F 11/30; H04L 9/00
(52) U.S. Cl. ..................... 713/201; 713/154; 713/166; 709/249; 705/51; 705/54; 375/741
(58) Field of Search ................................. 713/201, 200, 713/202, 152, 165, 166, 171, 167, 193; 709/224, 248, 225, 206, 250, 249, 44; 705/51, 54, 56, 58, 26, 52; 707/1, 10, 2; 379/93.02, 93.07; 235/380, 382.5, 492; 345/741

(56) References Cited

U.S. PATENT DOCUMENTS

| | | | |
|---|---|---|---|
| 5,065,429 A | 11/1991 | Lang | 705/56 |
| 5,263,158 A | * 11/1993 | Janis | 707/1 |
| 5,345,586 A | 9/1994 | Hamala et al. | 707/10 |
| 5,506,984 A | 4/1996 | Miller | 707/10 |

(List continued on next page.)

Primary Examiner—Emmanuel L. Moise
(74) Attorney, Agent, or Firm—Manatt Phelps & Phillips LLP

(57) ABSTRACT

A system and method for providing users with granular control over arbitrary information that allows for selective, real-time information sharing in a communications network such as the Internet is provided. In a network including a plurality of network devices operated by a plurality of users, a real-time information exchange system for sharing user profile information between respective users includes a database management system connected to the network. The database management system, which may be distributed across the network, stores the user profile information for a plurality of registered users of the information exchange system. The user profile information includes a plurality of data elements, each data element having an associated one of the plurality of registered users. Each data element has an associated group of users to whom access to the data element has been granted, and users not included in the associated group of users are denied access to the data element. Each registered user may selectively control the granting and denying of access to each of its associated data elements by other respective user, on an element-by-element, and user-by-user basis. Further, each registered user may dynamically create its own data fields.

24 Claims, 42 Drawing Sheets

U.S. PATENT DOCUMENTS

| | | | |
|---|---|---|---|
| 5,701,423 A | 12/1997 | Crozier | 345/762 |
| 5,726,898 A | 3/1998 | Jacobs | 700/231 |
| 5,787,175 A | 7/1998 | Carter | 713/165 |
| 5,809,497 A | 9/1998 | Freund et al. | 707/2 |
| 5,818,936 A | 10/1998 | Mashayekhi | 713/167 |
| 5,835,595 A | 11/1998 | Fraser et al. | 713/169 |
| 5,864,683 A | 1/1999 | Boebert et al. | 709/249 |
| 5,867,799 A | 2/1999 | Lang et al. | 707/1 |
| 5,872,850 A | 2/1999 | Klein et al. | 705/5 |
| 5,884,323 A | 3/1999 | Hawkins et al. | 707/201 |
| 5,892,900 A | 4/1999 | Ginter et al. | 713/200 |
| 5,923,845 A | 7/1999 | Kamiya et al. | 709/206 |
| 5,933,498 A | 8/1999 | Schneck et al. | 705/54 |
| 5,933,811 A | 8/1999 | Angles et al. | 705/14 |
| 5,974,141 A | 10/1999 | Saito | 705/52 |
| 5,974,238 A | 10/1999 | Chase, Jr. | 709/248 |
| 5,983,200 A | 11/1999 | Slotznick | 705/26 |
| 5,983,214 A | 11/1999 | Lang et al. | 707/1 |
| 5,983,270 A | 11/1999 | Abraham et al. | 709/224 |
| 5,987,440 A | 11/1999 | O'Neil et al. | 705/44 |
| 6,002,772 A | 12/1999 | Saito | 705/58 |
| 6,005,939 A | 12/1999 | Fortenberry et al. | 705/76 |
| 6,038,597 A | 3/2000 | Van Wyngarden | 709/219 |
| 6,044,155 A | 3/2000 | Thomlinson et al. | 713/155 |
| 6,213,391 B1 * | 4/2001 | Lewis | 235/380 |
| 6,614,888 B1 * | 9/2003 | Andreason | 379/93.02 |

* cited by examiner

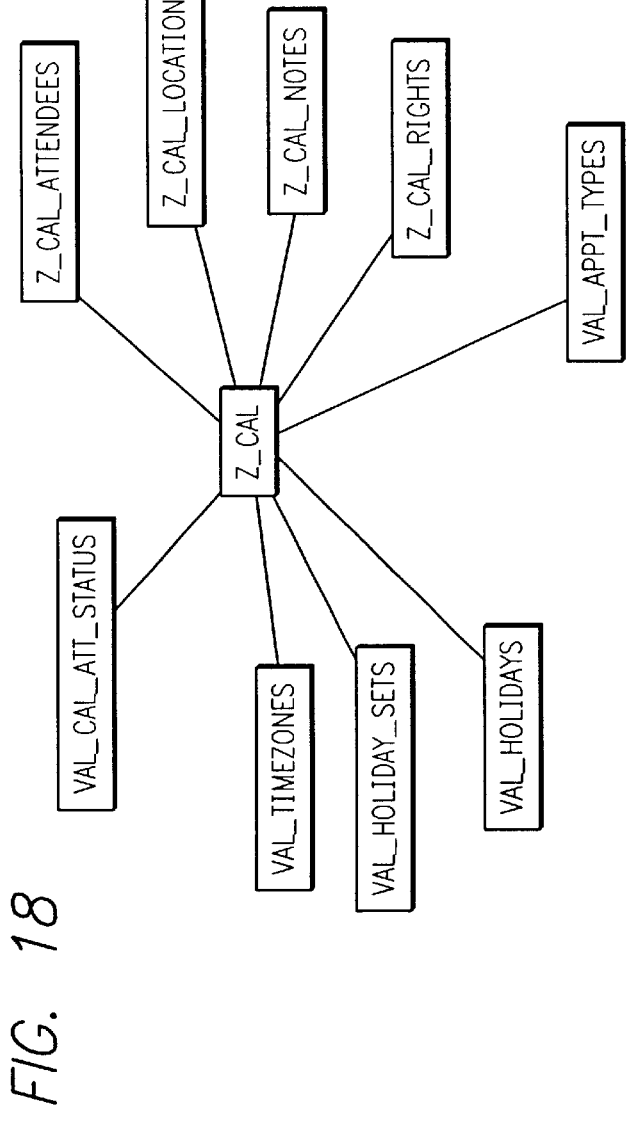
FIG. 18
FIG. 20
FIG. 19

SYSTEM AND METHOD FOR SELECTIVE INFORMATION EXCHANGE

CROSS-REFERENCE TO RELATED APPLICATION

This application claims the benefit, pursuant to 35 U.S.C. § 119(e), of U.S. Provisional Application No. 60/127,114, filed Mar. 31, 1999, which application is specifically incorporated herein, in its entirety, by reference.

BACKGROUND OF THE INVENTION

1. Field of the Invention

The present invention relates to systems and methods for storing, accessing and exchanging information, and in particular to a system and method for providing users with granular control over arbitrary information that allows for selective, real-time information sharing in a communications network such as the Internet.

2. Description of Related Art

Information exchange is a common facet of everyday life. For many years, individuals have manually distributed their personal information, such as by passing out business cards, filling out forms, surveys and warranty cards with their names and addresses, providing career and educational information on their resumes and reciting their credit card numbers over the telephone while making purchases. In addition, individuals have manually collected the personal information of others, such as by collecting business cards, maintaining an address book or Rolodex™ and storing telephone books and catalogs. As the amount of exchanged information has grown, the drawbacks and limitations of manual information exchange have become more glaring—i.e., manual information exchange is disorganized, error-prone, repetitive and time-consuming.

In the last decade the amount of exchanged information has exploded, in large part due to the widespread use of computer systems and other electronic devices. Many individuals now have several home and work telephone numbers (used for different purposes such as fax or modem access, pagers, and mobile communication), web site addresses, electronic mail ("e-mail") addresses, electronic bank account numbers, and a variety of other personal identification information. This information is typically stored electronically in databases tied to applications such as personal calendars and personal contact managers, and is typically exchanged through electronic systems such as e-mail and voicemail. Businesses, organizations and other entities have faced even greater growth in the amount of information that is stored and exchanged.

To exchange information, a copy of the information is typically transmitted to the intended recipient. The recipient may desire the information for a transient purpose (e.g., a credit card number for a one-time purchase), in which case the information copy may be discarded after use, or the recipient may desire the information for a continuing use, in which case the information copy may be stored by the recipient in a database. Each time the individual transmits the information to a new recipient, a new copy of the information is generated, and potentially stored in an additional database. This approach to information exchange is characterized with certain drawbacks, such as the lack of control over the copy of the information once it is transmitted and the excessive redundancy that results each time the copied information is stored in another database. Another problem is that copies of the data often become out-of-synchronization, and thus obsolete, as information such as telephone numbers and addresses change.

The tasks of managing, protecting and updating information has grown increasingly burdensome, especially in cases where the information is accessed by a plurality of applications and systems and the stored information is copied to many databases located in different locations. For example, an individual may provide personal address information to hundreds of recipients, such as creditors, subscription, delivery and repair services, friends, family, business associates, etc. Each of these recipients may then store this personal address information in their own databases, such as address books and customer lists. If this personal address information changes (e.g., when the individual changes residence), updating the information requires the individual to transmit a copy of the new information to every individual, business and organization that has a copy of the personal address information. Each recipient must then update each of its databases that have this personal address information. Information such as telephone numbers, home addresses, e-mail addresses and credit card numbers change frequently, making the process of synchronizing information extremely time consuming, burdensome and prone to error. The accuracy and timeliness of this information is important for business communications, interpersonal communications, purchases and various other purposes. Thus, there exists a need in the art for information exchange that is simple, efficient, timely, and is not error-prone.

Certain modern applications provide electronic solutions to some of these problems by synchronizing data in limited contexts. For example, personal digital assistants ("PDAs") are handheld devices that include an internal memory for storing a copy of the user's personal calendar, address and e-mail information. Another copy of the information is typically stored on a personal computer through applications such as Microsoft Outlook™ and CorelCENTRAL™. When the user adds or updates stored information on either the personal computer or the PDA, the stored information on the other system will be temporarily out of date. A typical PDA includes a cradle that may be connected to the personal computer to provide a communications link between the two systems. When the PDA is inserted into the cradle, the user can press a button on the PDA to synchronize the stored information in the two devices. While this solution is adequate for some personal information, it is characterized with much of the same drawbacks discussed above. The data will be untimely until the PDA is physically placed into the cradle and the synchronization function is performed. Further, stored information that has been exchanged with third parties will not be updated through this synchronization procedure. The third parties will need to be individually contacted with the new information and the third party will then need to update each of its databases.

Another solution in the prior art is to provide a centralized database that multiple individuals may access. For example, a university may keep its alumni information in a centralized database that is accessible to its alumni through the Internet. Individual alumni may edit their information profiles and view the profiles of other alumni through a university web site. Because the same copy of the stored personal information is used for both updating and viewing, there is no need to transmit copies of the personal information to other alumni when the information is updated. Although the centralized database simplifies information exchange between alumni, there are still many drawbacks. For example, the user would still need to notify non-alumni (e.g., creditors, family, friends, business contacts) of the changed information. Further, the data may not be gathered in a manner that is useful for the user. Many individuals would prefer to maintain their own database of contacts that are relevant to the individual, and this database would likely include non-alumni (e.g., creditor information, family, friends), and exclude many alumni. As a result, information stored in centralized databases is still copied to individuals' personal address books and other databases.

Another problem in the prior art is controlling access to stored information. For example, an individual may want to provide broad access to personal contact information such as address and telephone number, but may not wish to publicly share credit card information that is stored in the same database. While making an online purchase, the individual may need to provide the public address information as well as the personal credit card information. Thus, it would be desirable for a secure system and method that would provide individuals with control over their stored information so that the individual can control who and for how long that information is accessible.

In view of these problems with the prior art, there exists a need for a system and method for information exchange that provides control over the content of stored information, as well as control over the access to the stored information. Individuals, businesses, and other entities should be able to group and customize the stored information in a useful manner. The system and method should be easy to use, efficient and allow for timely sharing of information with selected individuals on a granular level and provide security against unwanted disclosures and edits to the stored information.

SUMMARY OF THE INVENTION

The present invention provides a system and method for information exchange that provides control over the content of stored information, as well as control over the access to the stored information. Each user of the system and method has granular control over its own user profile information, and can control access to each stored data element of its user profile information on a user-by-user basis.

In accordance with a preferred embodiment of the present invention, an information exchange system includes a storage system adapted to store profile data for a plurality of users. The information exchange system is connected to one or more registered users through a communications network, such as the Internet, to allow each respective registered user to access, edit and manage the registered user's profile data through a network device. The network device may be any device that is adapted to communicate with the information exchange system through the network, such as a personal computer running a standard Internet web browser application, a personal digital assistant ("PDA"), a wireless application protocol telephone ("WAP phone"), a pager or a network appliance. The information exchange system includes a plurality of online applications that are accessible to the registered user and generate or make use of profile data having attributes that are proprietary to the registered user. In the preferred embodiment, the applications available to the registered user include personal e-mail, chat rooms, personal calendars, contact management and document management applications.

The registered user's attributes may be stored in pre-defined data fields created by the information exchange system and its applications, or in user-defined data fields created by each respective registered user. One or more of these attributes (both pre-defined and user-defined) may be logically grouped into views that also may be either pre-defined or user-defined. The registered user may selectively grant access to each view to one or more third parties, such as friends or family members. Preferably the registered user's profile data is kept private by the information exchange system until the registered user provides access to a view of the stored data.

In addition to profile data generated through applications such as e-mail and personal calendar, the information exchange system may be used to track the registered user's use of the network, including places visited, pages read, items purchased online, etc. This data, along with the other profile data, is valuable to both the registered user and vendors who may wish to direct advertisements or product offers to the registered user. In a preferred embodiment of the present invention, the vendors will not receive this information unless and until the registered user provides access to the vendor. Further, the registered user may selectively "push" certain subsets of profile data to one or more vendors, or to a centralized recommendation engine. Each vendor may use the pushed profile information to direct advertisements, product offers and other information to the registered user, as well as to automatically fill in data entry forms with relevant profile information. If the profile information is pushed to a centralized recommendation engine, then the profile information is processed and appropriate vendor information from one or more vendors (such as a product offer) may be selectively provided to the registered user. The registered user may have control over which vendors have access to its profile data, and which subsets of the profile data are provided to those vendors.

The information exchange system and its storage system may be distributed across a plurality of devices, which may be physically located in one or more geographic locations. Further, one or more affiliated entities, including its own storage system for storing profile data, may also be connected to the network. The affiliated entity may be any entity that desires to maintain control over its internal information, such as a corporation running an intranet. The affiliated entity may include e-mail, document management, calendaring, internal contact databases and other applications, and the data from these various applications may be stored on the data storage system.

In operation, the registered user may access profile data located on any information exchange system or affiliated entity that is connected to the network, provided access has been granted to the registered user. The registered user logs onto either an affiliated entity or an information exchange system, preferably through a World Wide Web address. When the registered user requests profile data, the profile data is automatically retrieved from the various locations and made available to the registered user. In a preferred embodiment, the affiliate includes a software firewall that can prevent external access to a subset of the profile data stored on its affiliate storage system. Through the software firewall, the affiliate, on a field-by-field and person-by-person basis, may prevent a certain subset of information from being accessed through the network, while allowing the remainder of the information to be freely accessed through the network if its associated registered user has granted access thereto.

The information exchange system may also be used with unaffiliated data storage sites such as an external e-mail system including an e-mail data storage, an external personal calendar database or an external file system. The information from such sites may be centrally accessed through the information exchange system.

In a preferred embodiment, intelligent synchronization software is loaded onto the network device of certain registered users. The intelligent synchronization software operates in the background to detect network activity, and then automatically pulls newly updated information from the information exchange system, such as new addresses, e-mail addresses and messages, meeting invitations, and new files stored on the information exchange system, onto the network device and updates any local databases with the new information. The intelligent synchronization software may be used to provide Internet capabilities to standalone database applications and systems.

A preferred embodiment of the information exchange system includes a secure hardware configuration to protect the registered user's stored profile information from hackers. The information exchange system includes a main server and a plurality of secondary servers, connected through a first network. Each server is also connected directly to the network. The secondary servers are further connected, through a second network, to a storage system, a database management system and an e-mail system. The database management system stores user profile information and is additionally connected to a key management system.

When a user first registers with the information exchange system, a unique user identification ("ID") is generated, as well as a random public/private key pair which is generated by the key management system. In order to store information on the information exchange system, the key management system generates a secret key for each separately stored data element. Each data element is encrypted with its secret key, and then stored in a database table, along with a universal identifier ("ID") for the data element. The secret key is encrypted using the user's public key, and the encrypted secret key is then stored in a key chain database, along with the user's unique ID and the universal ID. Because all of the data is encrypted, other users of the information exchange system cannot view the content of any stored data element of user profile information unless access is provided to that content's secret key.

To grant access to stored data, the registered user first selects a data element from the user's stored profile information. The registered user then selects one or more third party users to which access to the selected data element is to be granted. The information exchange system then retrieves the third party's public key from its user profile. The registered user's copy of the encrypted secret key for the selected data element is located, and it is decrypted using the registered user's private key. The secret key is then encrypted using the third party's public key, and stored in the key chain database, along with the third party's user ID and the universal ID for the data element. The registered user may create a view of one or more data elements, and access to one or more views may be granted to one or more groups of users created by the registered user. In the preferred embodiment, pre-defined views and groups are also provided.

After access has been granted, it can be denied on an element-by-element and person-by-person basis. First, the registered user selects one or more users and one or more data elements. For each user, the key chain database is searched for every record including the associated user ID and a universal ID of a selected data element. Each record, which includes the encrypted secret key generated by the registered user when access was first granted to the user, is then deleted.

In the preferred embodiment, if the registered user forgets his password, then the registered user's private key cannot be recovered from the key management system due to the system's security features. Without the proper private key, the registered user's encrypted secret keys cannot be decrypted, and consequently, none of the encrypted data elements can be decrypted. As a result, the registered user cannot access its own user profile. To solve this lost password problem, a preferred embodiment includes a key escrow feature that tracks a virtual registered user. The virtual registered user includes many of the same features as an actual registered user, including a public/private key pair. Every time a data element is stored on the information exchange system, the virtual registered user is automatically granted access to the data. In other words, a copy of the secret key for the new data element is encrypted using the public key of the virtual registered user and stored in the key chain database.

A preferred embodiment of a password recovery process includes the steps of, generating a new password; creating a new public/private key pair; generating a temporary password; searching the key chain database for every instance of the registered user's ID, and for each record found decrypting an associated secret key with the virtual registered user's private key; encrypting the secret key using the new public key; and storing the new encrypted secret key in the key chain database.

A more complete understanding of the SYSTEM AND METHOD FOR SELECTIVE INFORMATION EXCHANGE will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 18 is a block diagram showing a calendar module database schema of an embodiment of the present invention;

FIG. 19 is a block diagram showing a mail module and storage module database schemas of an embodiment of the present invention;

FIG. 20 is a block diagram showing a chat module database schema of an embodiment of the present invention;

DETAILED DESCRIPTION OF THE PREFERRED EMBODIMENT

In the detailed description that follows, like element numerals are used to describe like elements illustrated in one or more of the aforementioned figures.

Figure 1:
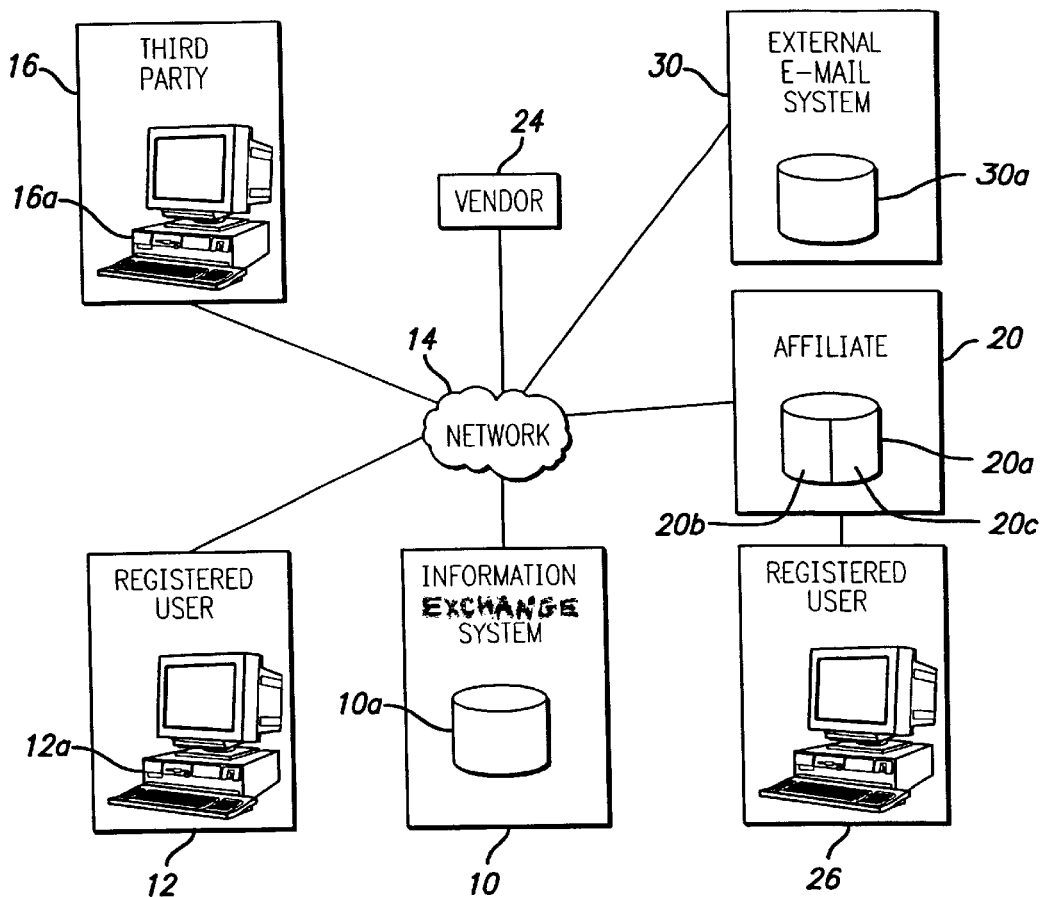
FIG. 1 illustrates a first preferred embodiment of the present application.

A preferred embodiment of the present invention will be described with reference to FIG. 1. An information exchange system 10 includes a storage system 10a adapted to store profile data for a plurality of users, such as registered user 12. The information exchange system 10 and the registered user 12 are connected to a communications network 14, such as the Internet, thereby allowing the registered user 12 to access, edit and manage the registered user's profile data through a network device 12a. The network device 12a may be any device that is adapted to communicate with the information exchange system 10 through the network 14, such as a personal computer running a standard Internet web browser application, a personal digital assistant ("PDA") a wireless application protocol telephone ("WAP phone"), a pager or a network appliance.

A profile is any non-trivial application that is used to access and manipulate a collection of attributes associated with the registered user 12. The information exchange system 10 includes a plurality of online applications that are accessible to the registered user 12 and include profile data having attributes that are proprietary to the registered user 12. In the preferred embodiment, the applications available to the registered user 12 include personal e-mail, chat rooms, personal calendars, contact management and document management applications. In addition, the information exchange system 10 includes facilities that allow the registered user 12 to enter, edit and store attributes in the storage system 10a, including profile data generated from any of the applications.

The registered user's attributes may be stored in pre-defined data fields created by the information exchange system 10 and its applications, or in user-defined data fields created by the registered user 12. One or more of these attributes (both pre-defined and user-defined) may be logically grouped into views that also may be either pre-defined or user-defined. The registered user 12 may selectively grant access to each view to one or more third parties 16, such as friends or family members, connected to the network 14 through a network device 16a. The third parties 16 may include registered users of the information system 10, unregistered users, or both.

Figure 2:
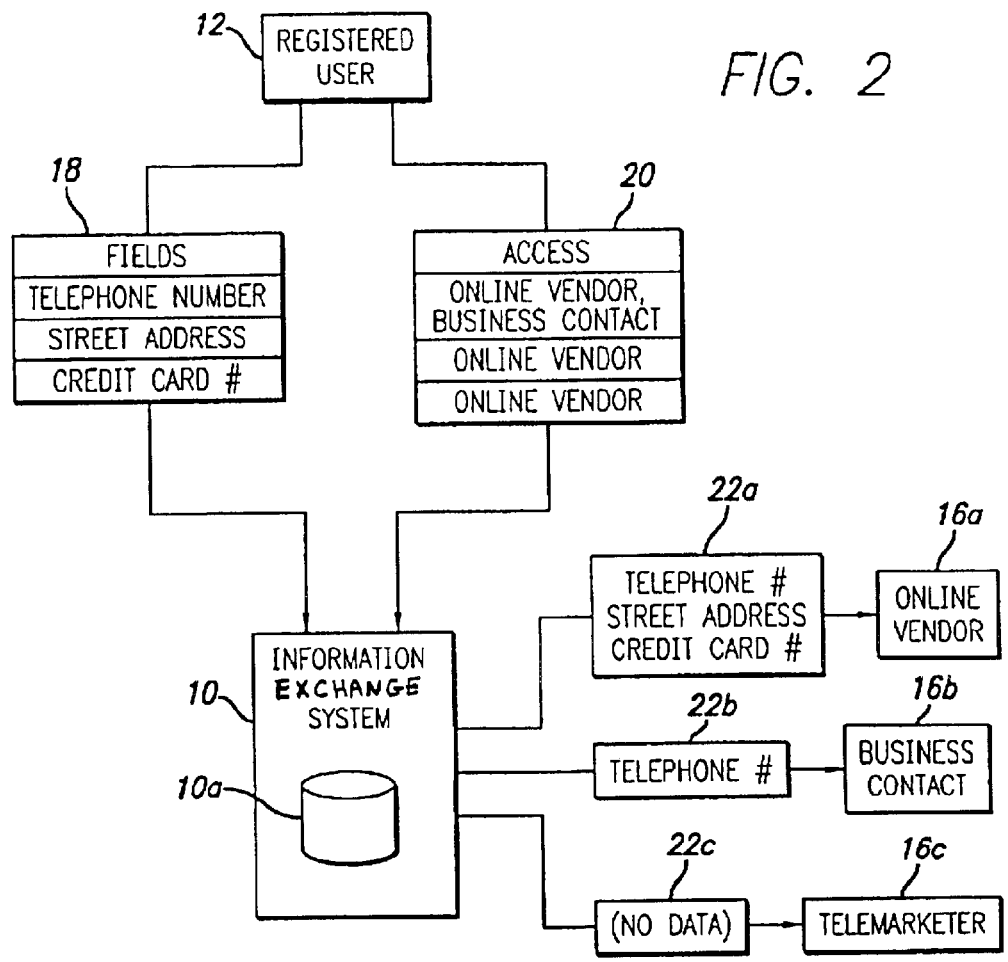
FIG. 2 illustrates a preferred embodiment of element-by-element, user-by-user access to profile information.

In the preferred embodiment, the registered user's profile data is kept private by the information exchange system 10 until the registered user 12 provides access to a view of the stored data. As illustrated in FIG. 2, the registered user 12 can securely control access to its stored profile data on an element-by-element and user-by-user basis. Registered user 12 stores profile data 18, such as telephone number, street address and a credit card number, in the storage device 10a, through a data entry application accessed by the registered user 12 through the information exchange system 10. The information exchange system 10 further includes facilities that allow the registered user 12 to selectively grant access to this stored profile data to one or more third parties 17a–c on an element-by-element basis. As illustrated in tables 18 and 20, the registered user 12 granted an online vendor 17a access to its telephone number, street address and credit card number, and a business contact 17b was granted access to the registered user's telephone number.

The online vendor 17a can retrieve the registered user's telephone number, street address and credit card number 22a from the information exchange system 10 to fulfill an online purchase request. The business contact 17b can retrieve the registered user's telephone number 22b from the information exchange system 10, but cannot access any other profile data (such as street address and/or credit card number) because access to that information was not granted by the registered user 12. Finally, a telemarketer 17c who was not granted access from the registered user 12 to any of the registered user's profile data can attempt to retrieve the profile data from the information exchange system 10, but no profile data will be provided 22c.

In addition to profile data generated through applications such as e-mail and personal calendar, the information exchange system 10 may be used to track the registered user's 12 use of the network 14, including places visited, pages read, items purchased online, etc. This data, along with the other profile data, is valuable to both the registered user 12 and vendors who may wish to direct advertisements or product offers to the registered user 12. In a preferred embodiment of the present invention, the vendors will not receive this information unless and until the registered user 12 provides access to the vendor. Referring back to FIG. 1, the registered user 12 may selectively "push" certain subsets of profile data to one or more vendors 24. Each vendor 24 may use the profile information to direct advertisements, product offers and other information to the registered user 12 that may be of interest to the registered user 12 based on the pushed data. Alternatively, the profile data may be pushed to a recommendation database. The recommendation database processes the received data and, where appropriate, selectively provides vendor information, from one or more vendors, to the registered user.

The vendor may also use the pushed data to automatically fill in data entry forms or process electronic transactions. The registered user 12 has control over which vendors 24 have access to its profile data, and which subsets of the profile data are provided to those vendors 24. Because the control is in the hands of the registered user 12, the registered user 12 will likely receive intelligent commerce recommendations which provide actual value to the registered user 12. For example, the registered user 12 may provide access to profile information such as its favorite musical or play, its travel schedule and its online calendar to selected vendors 24. The vendors 24 may review the available time periods in the online calendar, review the travel schedule to determine the registered user's 12 location (such as city and hotel) on a given date, and recommend to the registered user 12 a local musical or play based on the registered user's 12 preferences. Using the automatic form fill and data pushing features of this embodiment, the vendor could, upon acknowledgement from the registered user (e.g., by a single click of a screen button), charge tickets for the musical or play to the registered user's credit card account.

The information exchange system 10 and its storage system 10a, may be distributed across a plurality of devices, which may be physically located in one or more geographic locations. Further, one or more affiliated entities 20, including a storage system 20a for storing profile data, may also be connected to the network 14. Each affiliated entity 20, such as a corporation with a private intranet, incorporates information exchange features of the present invention into its internal database system. The affiliated entity 20 may include e-mail, document management, calendaring, internal contact databases and other applications, and the data from these various applications may be stored on the data storage system 20a.

In operation, the registered user 12 may access profile data located on any information exchange system 10 or affiliated entity 20 that is connected to the network 14, provided access has been granted to the registered user 12. The registered user 12 first logs onto either an affiliated entity 20 or an information exchange system 10, preferably through a World Wide Web address, to identify itself to the system. When the registered user 12 requests profile data, the profile data is automatically retrieved from the appropriate location and made available to the registered user 12. The location of the data is transparent to the registered user 12, who may create, edit, access, store and provide access to profile data without regard to its physical storage location.

In a preferred embodiment, the affiliate 20 includes a software firewall that is used by the affiliate 20 to prevent external access to a certain subset of the profile data stored in the storage system 20a. Through the software firewall, the affiliate 20, on a field-by-field, user-by-user basis, may prevent a certain subset of information 20b from being accessed through the network 14, while allowing the remainder of the information to be freely accessed if its associated registered user has granted access thereto.

The information exchange system 10 may also be used with unaffiliated data storage sites such as an external e-mail system 30 including an e-mail data storage 30a, an external personal calendar database or an external file system. The information from such sites may be centrally accessed through the information exchange system 10. For example, if a registered user 12 has one or more external e-mail accounts, such as a work e-mail account at an unaffiliated business, or a personal e-mail account through the registered user's 12 Internet Service Provider ("ISP"), the information exchange system 12 may provide a centralized location to receive and send these e-mails. If the registered user 12 grants access to its external e-mail account, then the information exchange system 10 will periodically access the external e-mail system 30 to determine whether there is any new e-mail information. All new e-mail information is transmitted to, and stored on the information exchange system 10, where it can be accessed through the e-mail application on the information exchange system 10.

The information exchange system 10 may also be used with a plurality of existing software, such as CorelCENTRAL™ or Lotus Smartsuite™. In a preferred embodiment, intelligent synchronization software is loaded onto the registered user's 12 network device 12a. The intelligent synchronization software operates to detect network activity and, when network activity is detected, automatically pulls newly updated information from the information exchange system 10, such as new addresses, e-mail addresses and messages, meeting invitations, and new files stored on the information exchange system 10, onto the network device 12*a* and updates the local databases so that the local database, and the information exchange system, include synchronized information. This synchronization procedure may also include uploading new information stored on the network device 12*a* to the information exchange system 10. The intelligent synchronization software transmits the information between the information exchange system 10 and the network device 12*a* in the background, during periods of low traffic on the communications link between the network device 12*a* and the network 14, making the download process virtually imperceptible to the registered user 12. Through the intelligent synchronization software, standalone applications operating on the network device 12*a* are provided with a level of Internet functionality.

Hardware Infrastructure

Figure 3:
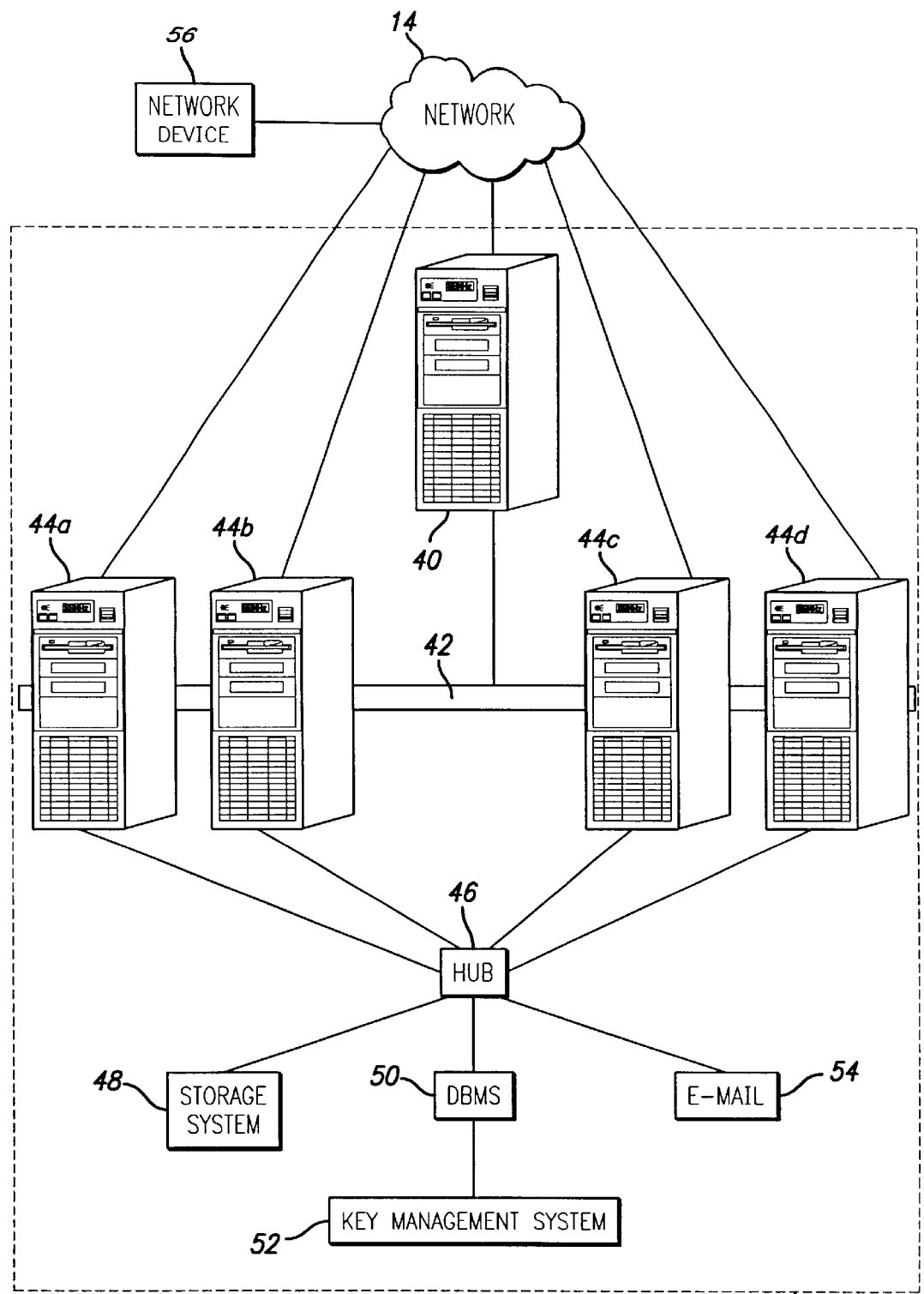
FIG. 3 is a preferred embodiment of the information exchange system hardware system.

A preferred embodiment of the information exchange system 10 includes a secure hardware configuration such as illustrated in FIG. 3, to protect the registered user's stored profile information from hackers or other intruders who attempt to gain unsolicited access to the information exchange system 10. The information exchange system 10 includes a main server 40 and a plurality of secondary servers 44*a–d*, connected through a first network 42. Preferably, the main server 40 and each of the secondary servers 44*a–d* includes a Netfinity 5000™ web server, running a hardened Linux kernel to protect against unsolicited attacks. The main server 40 and each of the secondary servers 44*a–d* are additionally connected to the network 14, through high speed connections such as T1 lines.

The secondary servers 44*a–d* are further connected, through a second network 46, to a storage system 48, a database management system 50 and an e-mail system 54. The storage system 48 is used to provide general file storage for registered users of the information exchange system 10. The database management system 50 is connected to a key management system 52, and stores user profile information. In a preferred embodiment, the database management system 50 includes a Netfinity 7000™ server executing Oracle™ database software. The key management system 52 is preferably dedicated hardware adapted to securely generate and store encryption keys and perform certain encryption/decryption functions, such as nForce™ by nCipher Corporation, Woburn, Mass. For security purposes, the second network 46 is not directly accessible from the network 14.

Figure 4:
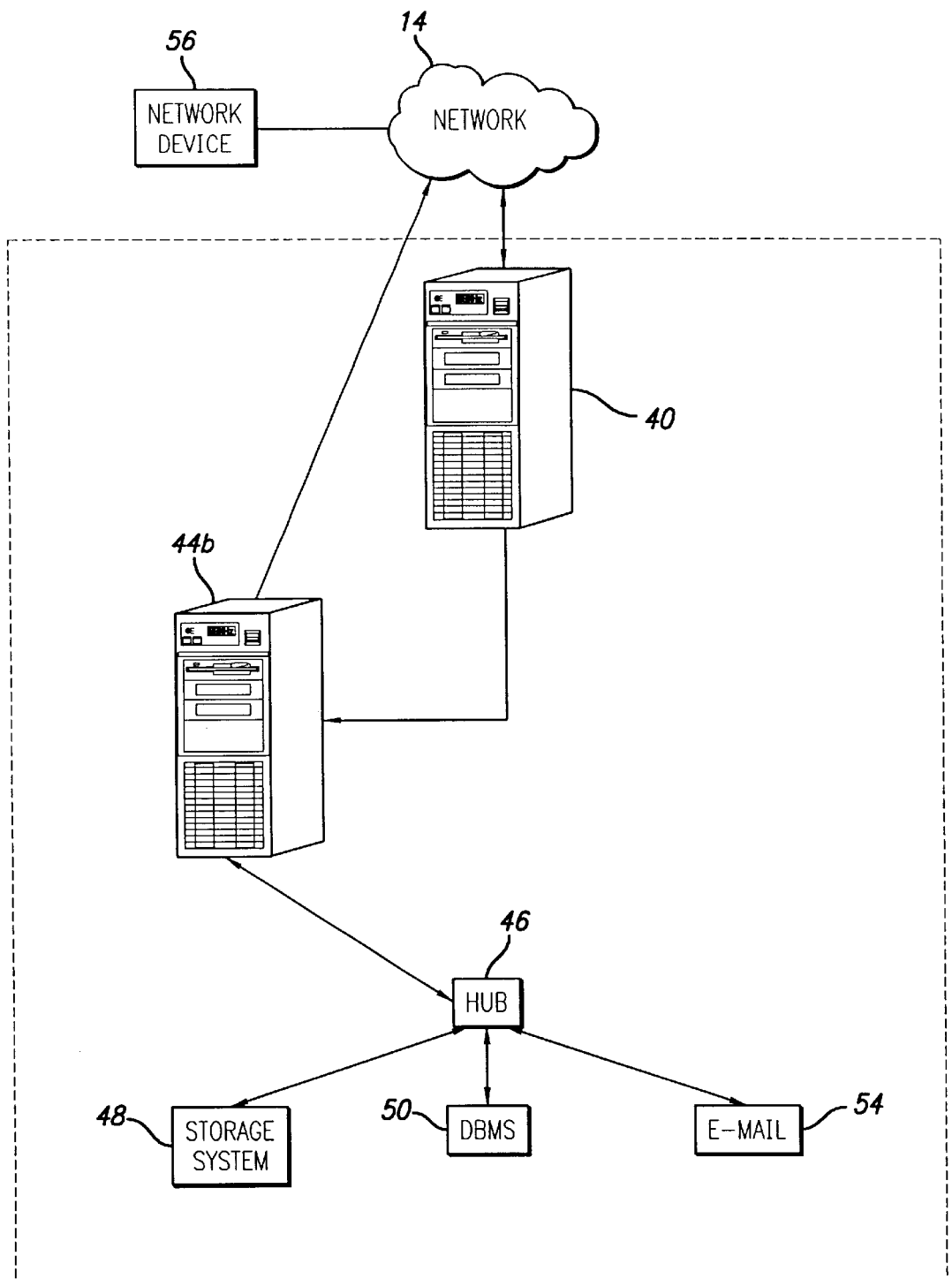
FIG. 4 illustrates a preferred embodiment of the data flow through the information exchange system of FIG. 3.
Figure 5:
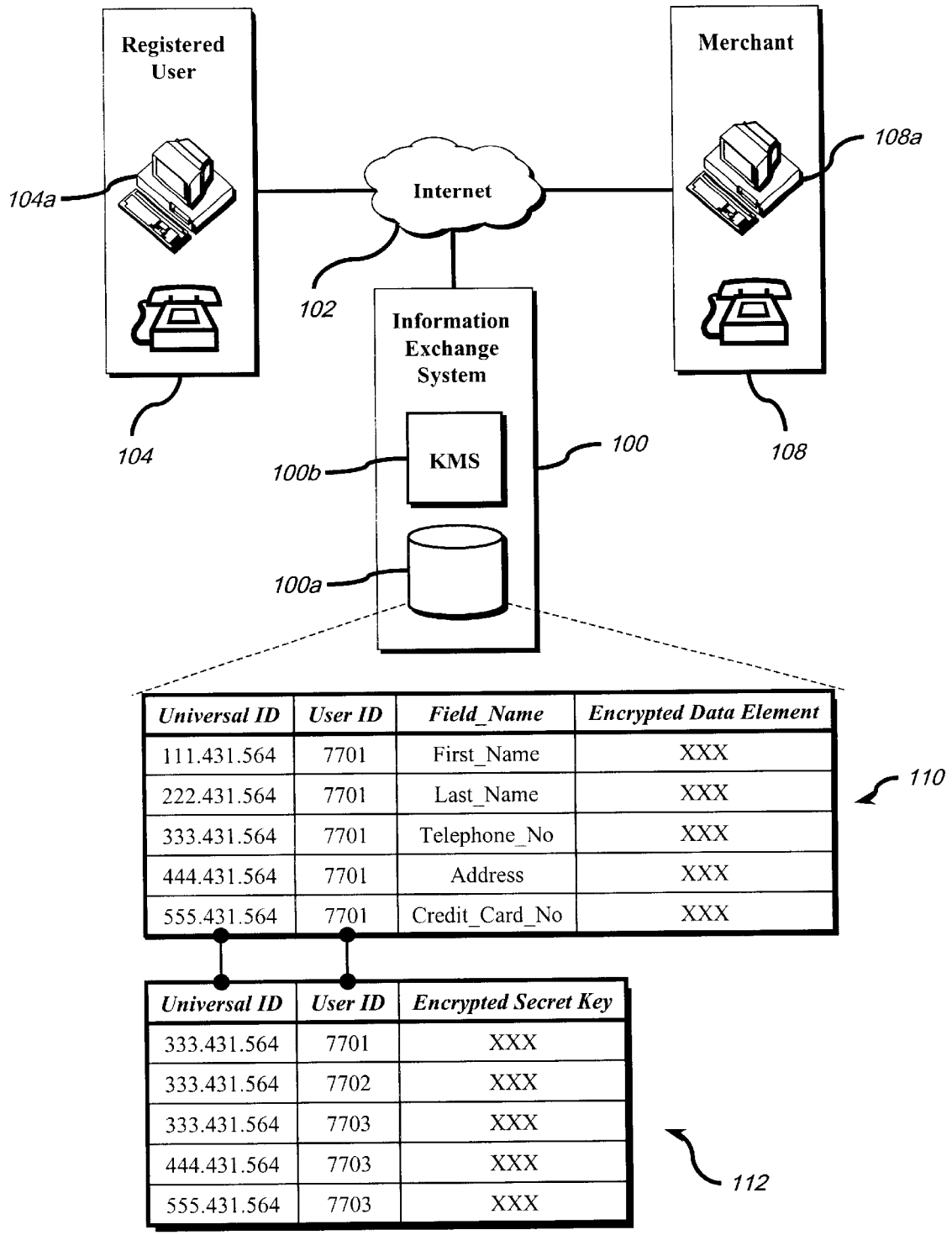
FIG. 5 illustrates a preferred embodiment of the information exchange of the present invention.

FIG. 4 illustrates the flow of information between the various components of the information exchange system 10 and the network device 56. The network device 56 connects to the main server 40 through the network 14. The main server 40, performing workload balancing operations, distributes the user request to one of the secondary computers 44*a–d* in a manner that optimizes the processing resources of the information exchange system 10. In a preferred embodiment, the main server 40 distributes requests on a round-robin basis; however, other workload balancing approaches may also be used. The resource request is then processed by a secondary computer 44*b* which communicates with the network device 56 through the network 14.

In this embodiment, the network device 56 cannot communicate directly to a secondary server 44 through the network 14—all communications into the information exchange system 10 first pass through the main server 40. The secondary server 44*b* has full access to the storage system 48, the database management system 50 and the e-mail system 54 through the second network 46. However, the main server 40 and the secondary server 44*b* are adapted so that the main server 40 cannot communicate with the storage system 48, the database management system 50 and the e-mail system 54, either directly or through the secondary server 44. Because all outside communications pass through the main server 40, the network device 56 does not have direct access to the secondary server 44*b* or the stored profile information, making the stored profile information difficult to compromise from outside the information exchange system.

Key Management

The operation of a preferred embodiment of the information exchange system will now be described with reference to FIGS. 5–8. An information exchange system 100 is connected to a network such as the Internet 102. A registered user 104, using a network device 104*a*, such as a personal computer, can manage personal information stored in a storage system 100*a* of the information exchange system 100, and control access to that information from third parties, such as merchant 108 connected to the Internet 102 through a network device 108*a*.

When the user 104 is first registered with the information exchange system 100, a unique user ID is generated for the user, as well as a public/private key pair which is generated by the key management system 100*b*. The public/private key pair are selected for use in a public key cryptography system, such as RSA cryptography. As known in the art, in RSA cryptography data is encrypted by using a public key, and can only be decrypted by the corresponding private key. Once encrypted, the data is virtually secure, subject to modern computational, economic and mathematical constraints. In a preferred embodiment, the private key is maintained by the key management system 100*b* and is not accessible from outside the key management system 100*b*.

Figure 6:
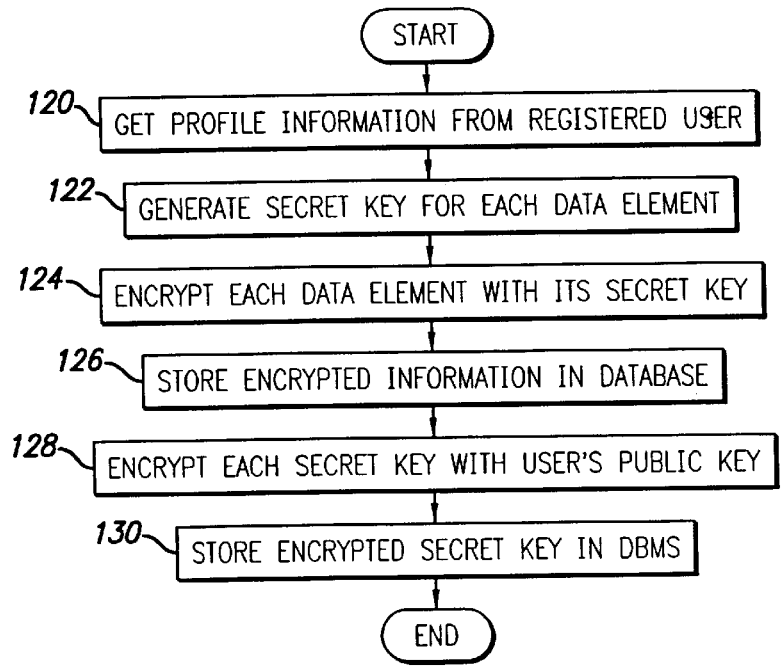
FIG. 6 is a flow diagram illustrating the encryption of data elements in a preferred embodiment of the present invention.

Referring to FIG. 6, a preferred procedure for storing new profile information in the information exchange system 100 is illustrated. First, at step 120, the registered user 104 provides data content for storage in the information exchange system 100. The data content can include any information that may be stored in the information exchange system 100. For example, data content may be entered into a data entry form having fields such as name, address, telephone number and credit card number, or may include data that is entered into applications such as a personal calendar program, an e-mail program or any other application that generates user profile information.

After the user provides the desired information, the key management system 100*b* randomly generates a secret key in step 122 for each discrete data element. Each secret key will be used for encrypting and decrypting its respective data element. In the preferred embodiment, the encryption-decryption algorithm is a symmetrical algorithm, such as DES or Blowfish, in which the same secret key is used for both data encryption and data decryption. In step 124, each data element of the new user information is encrypted with its respective secret key, and then in step 126, each respective encrypted data element is stored, along with a unique universal identifier and the user's ID in a database table 110. The universal identifier is a unique serial number that is used to reference the location of its respective data element in the information management system 100, and includes information such as a domain name and a database name. In step 128, the secret key for each respective encrypted data element is itself encrypted using the registered user's public key. The encrypted secret key is then stored, in step 130, in a key chain database 112, along with the user's ID and the universal ID that identifies the location of the stored data element.

Figures 7, 8B:
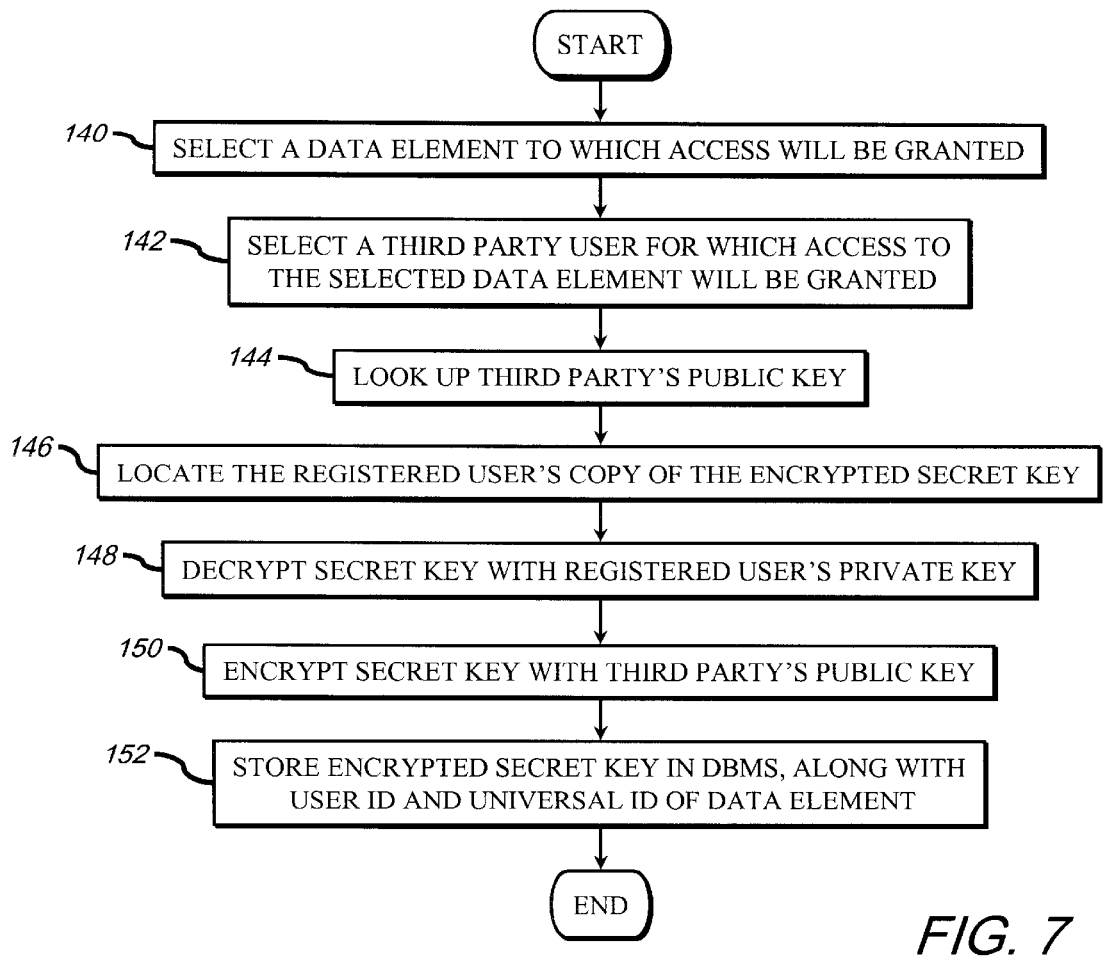
FIG. 7 is a flow diagram illustrating the preferred steps for granting an arbitrary third party user access to an arbitrary data element.

In the preferred embodiment, each separate data element of the user profile information stored on the information exchange system 100 is separately encrypted as described in the flow diagram of FIG. 6, on a field-by-field and record-by-record basis. Because all of the data is encrypted, other users of the information exchange system 100 cannot view the content of any data element of user profile information unless access is provided to that data element's secret key. Consequently, if the registered user 104 desires to provide access to certain profile information to a merchant 108, such as the registered user's credit card number, the user must first provide the merchant 108 with access to the secret key for each data element. The flow diagram of FIG. 7 illustrates the steps for granting an arbitrary third party user, such as merchant 108, access to an arbitrary data element, such as a credit card number. In step 140, the user selects a data element from the user's stored profile information. In step 142, the user selects a third party user, such as merchant 108, to which access to the selected data element will be granted. In step 144, the information exchange system 100 retrieves the merchant's 108 public key from the merchant's user profile. Next, in step 146, the registered user's copy of the encrypted secret key for the selected data element is located in the key chain database 112. The registered user's 104 private key is located by the KMS 100*b* and is used by the KMS 100*b*, in step 148, to decrypt the secret key. In step 150, the secret key is then encrypted using the third party's public key, and the encrypted secret key, the third party's user ID and the universal identifier for the data element are then stored in the key chain database 112.

After access has been granted, access can be subsequently denied on an element-by-element and person-by-person basis. First, an event occurs triggering the denial of access. For example, the registered user may select one or more user/data element pairs for which to deny access. It is further contemplated that access may automatically expire after the passing of a certain amount of time or a certain amount of accesses to the data element. For each user designated through the triggering event, the key chain database is searched for every record including the associated user ID and a universal ID of a selected data element. Each located record, which includes the encrypted secret key generated by the registered user when access was first granted to the user, is then deleted.

Figure 8A:
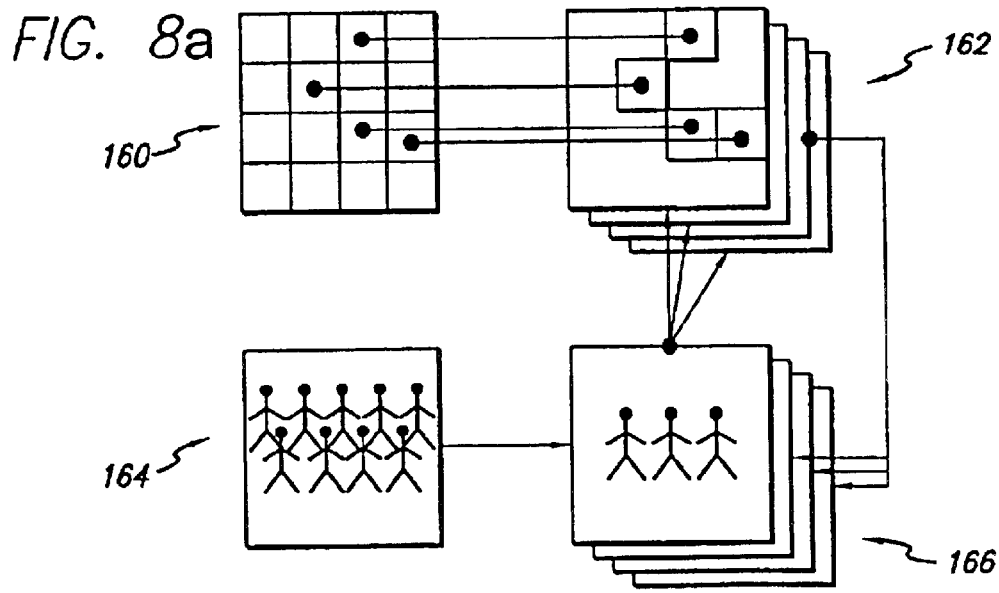
FIGS. 8a–c illustrate a preferred embodiment for providing one or more groups of arbitrary users access to one or more views of arbitrary data elements.
Figures 8C, 15A, 15B:
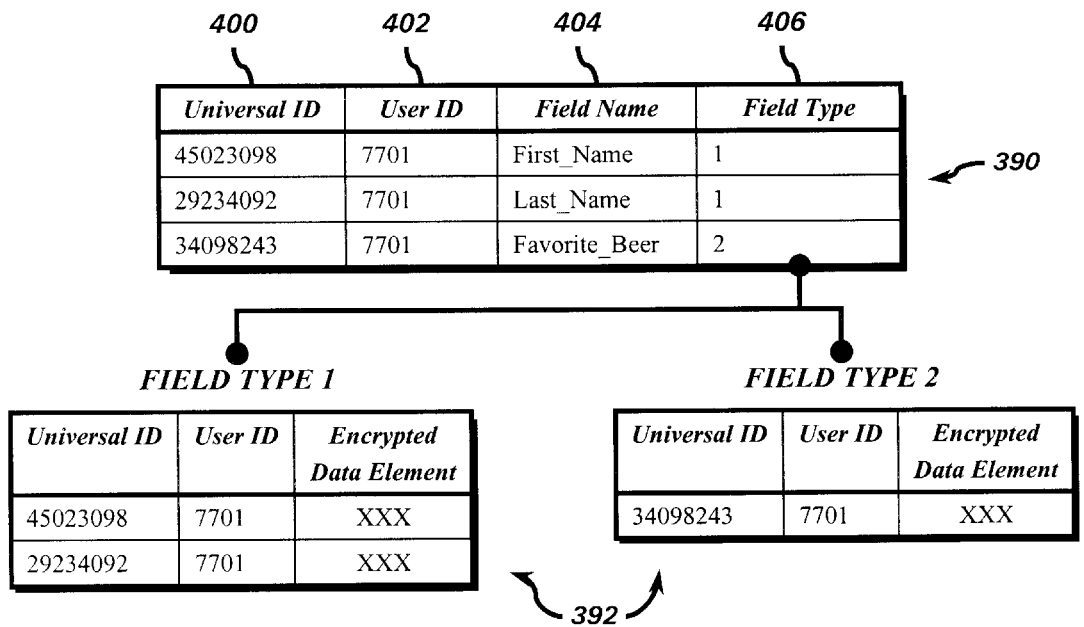
FIGS. 15a–b illustrate database structures in accordance with a preferred embodiment of the present application.

Referring to FIGS. 8*a–c*, a preferred embodiment for providing a plurality of arbitrary users access to a plurality of arbitrary data elements is described. Each registered user controls a plurality of profile data elements 160, which preferably include all of the registered user's stored profile information. Using the plurality of profile data elements 160, the registered user may create a plurality of views 162, each view including one or more arbitrary data elements selected by the registered user, and/or including one or more of the other views 162. For example, the registered user may group data elements such as first name, last name, employer name, business telephone, business e-mail, business street address, business city, business state and business zip, into a view for business contact information. To simplify the process of granting a third party access to a plurality of data elements, the registered user merely provides access to one or more view. Access to each data element in a view may be granted on an element-by-element basis according to the process illustrated in FIG. 7. In the preferred embodiment, the view is stored in a database table 163, which includes fields for storing a unique view ID for each respective view, a user ID for the owner of the view and a universal ID for each data element in the respective view. In another embodiment, the registered user may also designate a password for each view to provide instant access to third party users who are not registered users of the information management system. The registered user need only provide the third party user with the access code (e.g., verbally communicating the access code to a merchant over a telephone) to allow the third party user instant access to the desired information. Access to the unregistered user may be provided through a virtual registered user, as described herein.

Each registered user may selectively provide access to each view 162 to one or more third party users of the information exchange system. Selecting from a set of users 164 of the information exchange system, the registered user may create groups of third party users 166, each including one or more third party users and/or one or more groups of third party users 166. For example, the registered user may create separate groups for business associates, family members and friends. The registered user may then selectively grant any group of third party users 166 access to any view 162. As a result, each respective third party user in the selected group is granted access to each respective data element in the selected view. In the preferred embodiment, the group is stored in a database table 167, which includes fields for storing a unique group ID for each respective group, a user ID for the owner of the group and a user ID for each member of the respective group.

Figure 9:
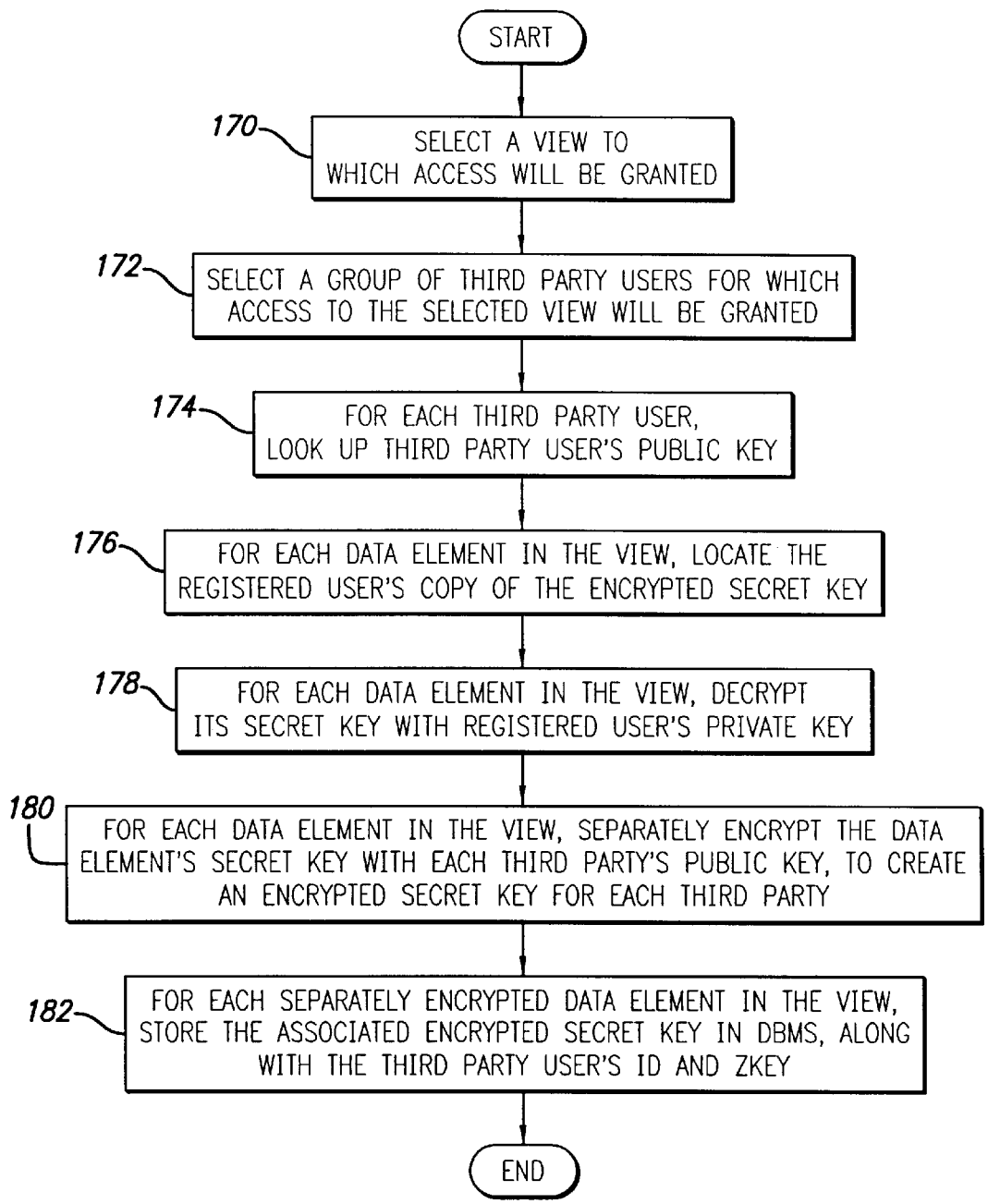
FIG. 9 is a flow diagram illustrating preferred steps for granting to an arbitrary group access to an arbitrary view.

A preferred embodiment for granting a group of users 166 access to a selected view is illustrated in FIG. 9. In step 170, the registered user selects a view. In step 172, the registered user selects a group of third party users to which access to the selected view will be granted. In step 174, the information exchange system 100 retrieves, for each third party user in the group, the third party user's public key from its user profile. Next, in step 176, the registered user's copy of the encrypted secret key for each data element in the view is located. The registered user's private key is located by the KMS 100*b* and is used by the KMS 100*b*, in step 178, to decrypt each respective secret key for each respective data element in the selected view. In step 180, for each data element in the view, its associated secret key is separately encrypted with each third party user's public key, creating an encrypted secret key for each third party user, for each data element. In step 182, each separately encrypted secret key, the associated third party's user ID and the universal identifier for the associated data element is stored in the key chain database, thereby providing each third party user in the group with access to each data element in the view.

Figure 10:
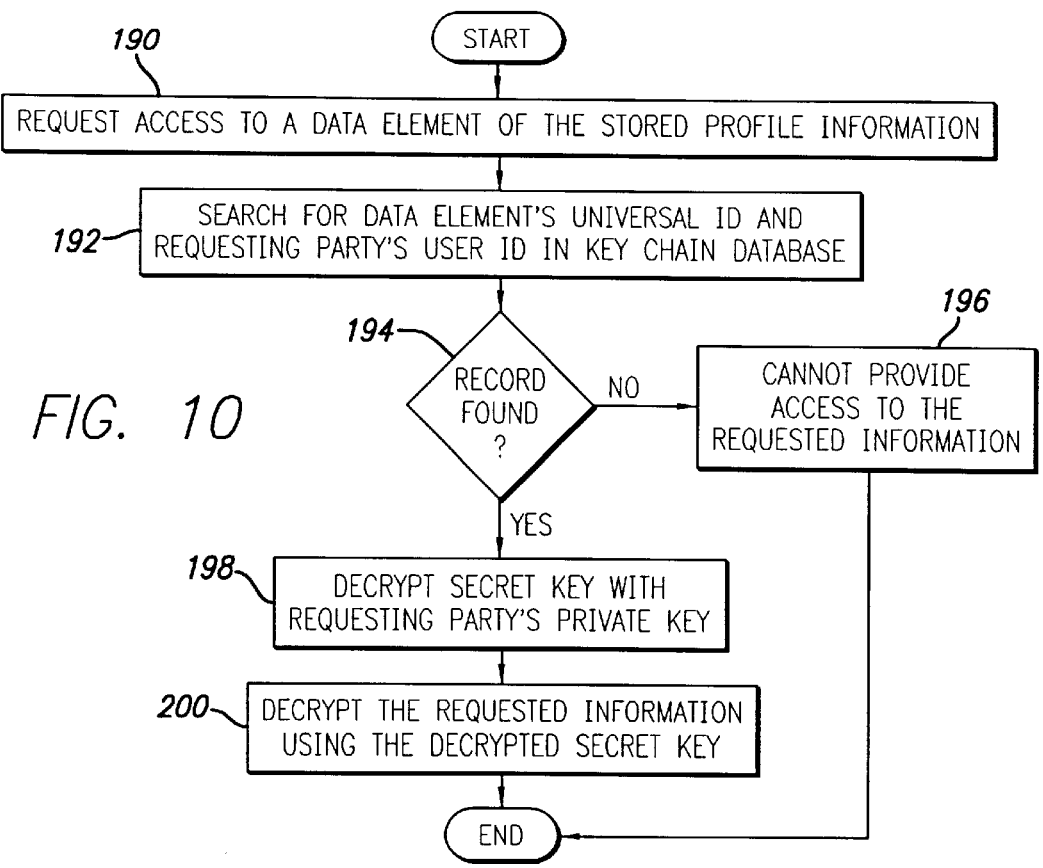
FIG. 10 is a flow diagram illustrating preferred steps for retrieving stored information from the information exchange system.

Selected third party users who have been granted access to selective elements of the registered user's profile information can retrieve the stored profile information. A preferred embodiment of the process of retrieving stored information from the information exchange system is illustrated in the flow diagram of FIG. 10, and will now be described with reference to FIG. 5. In step 190, the third party user, such as the merchant 108, requests access to a data element of the registered user's stored profile information. Each stored data element includes a unique universal ID. Records in the key chain database having the data element's universal ID and the third party user's ID are located in step 192.

If no matching records are found, then access cannot be granted to the third party user (steps 194, 196). This should be apparent because, in accordance with the preferred embodiment, the data element is encrypted by a secret key, and all copies of the secret key are encrypted using the public keys of users of the system; the third party cannot gain access to the data element without access to, and a way to decrypt, the secret key. If a matching record is found in the key chain database, then the encrypted secret key from the matching record is decrypted using the third party user's private key in step 198. The decrypted secret key is then used to decrypt the requested data element in step 200.

Referring back to FIG. 5, in operation, the registered user 104 will have some stored personal profile information in information exchange system 100, such as a name, address, telephone number and credit card number. Further, the registered user 104 may provide access to selective views of the profile information to selected third parties, such as merchant 108. If the registered user 104 desires to purchase an item from the merchant 108 for delivery to the user's home, the registered user 104 need only provide the merchant 108 with a universal identifier for the view. The merchant 108 may then access the information exchange system 100, and gain access to the registered user's 104 stored data, including mailing address, telephone number and credit card information for payment.

In a preferred embodiment, all of the data that is accessible to a registered user, whether the data belongs to the registered user or another user, may be accessed by the registered user by using its public/private key pair. When the registered user logs onto the information exchange system and enters a password, the registered user is identified to the information exchange system, which can then locate the registered user's public key in the user profile data, and access the registered user's private key through the key management system. However, in the preferred embodiment, if the registered user forgets his password, then the registered user's private key cannot be recovered from the key management system due to the system's security features. Without the proper private key, the registered user's encrypted secret keys, which are used to decrypt accessible data elements, cannot be decrypted and consequently, none of the encrypted data elements can be decrypted.

To solve this lost password problem, a preferred embodiment includes a key escrow feature that tracks a virtual registered user. The virtual registered user includes many of the same features as an actual registered user, including a public/private key pair. Every time a data element is stored on the information exchange system, the virtual registered user is automatically granted access to the data. In other words, a copy of the secret key for the new data element is encrypted using the public key of the virtual registered user and stored in the key chain database.

Figure 11:
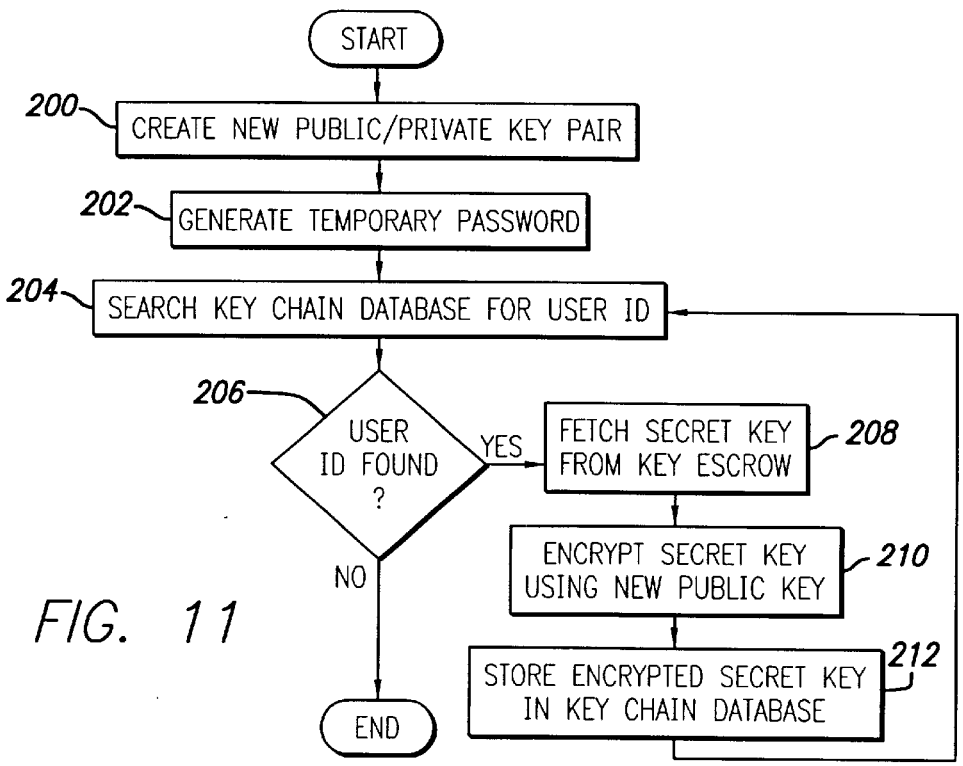
FIG. 11 is a flow diagram illustrating a preferred password recovery process.

The algorithm of FIG. 11 illustrates a preferred embodiment of the password recovery process. When a registered user loses its password, the system has no way of recovering the lost password and a new password must be generated. In step 200, a new public/private key pair is created for the registered user. Next, at step 202, a temporary password is generated for the user. The key chain database is then searched for every instance of the registered user's ID in steps 204–212. For each record found, there will be a corresponding secret key stored by the virtual registered user. This secret key is decrypted using the virtual registered user's private key at step 208. In step 210, the secret key is then encrypted using the new public key for the user. Finally, at step 212, the encrypted secret key is stored in the key chain database in place of the old encrypted secret key for the universal ID and user ID pair.

Decentralization

Figure 12:
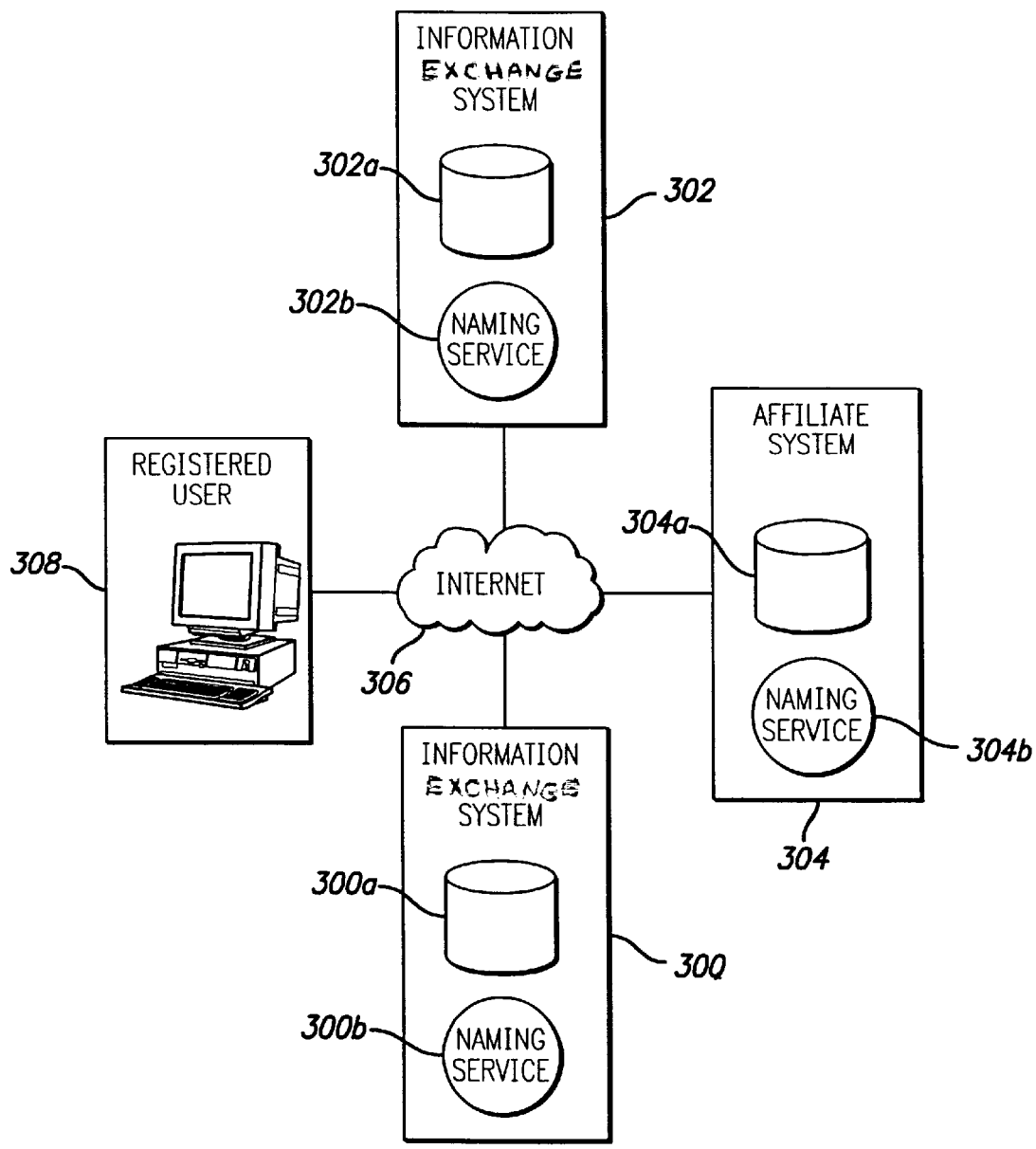
FIG. 12 illustrates a decentralized information exchange system.

Referring now to FIG. 12 and as discussed above, in a preferred embodiment there may be a plurality of information exchange systems 300 and 302, and affiliate systems 304 connected to a network 306, such as the Internet. A registered user 308 may connect to any of the systems 300–304 to access data stored in one of the storage systems 300a–304a. To retrieve data, the registered user 306 enters a query for profile information and each data element is located using its respective universal ID. Each universal ID may be used to determine the location of its associated data element, including the storage systems 300a–304a on which the data element resides, and the database to search within that storage location for the record in the database that includes that data element.

Preferably, when a universal ID is entered by the registered user 306, or utilized by an application, the universal ID is processed through a naming service 300b–304b that converts the universal key into a network address and database name. As known in the art, naming services, such as Internet domain name services, include software that converts a name, such as the universal ID, into a physical address on a network. By identifying every data element through a universal ID, and processing the universal ID through a naming service 300b–304b located on each system 300–304, a distributed information exchange system is achieved, with all of the functionality of the information exchange system described herein.

In a preferred embodiment, when a data element is accessed from a remote location, all decryption of the data element is performed locally—i.e., its secret key is decrypted, and the decrypted secret key is used to decrypt the data element, on the same information exchange system where the data element was located. The decrypted data is transferred across the Internet 304 using the Internet's secure socket layer for data security during transfer of the data.

Figure 13:
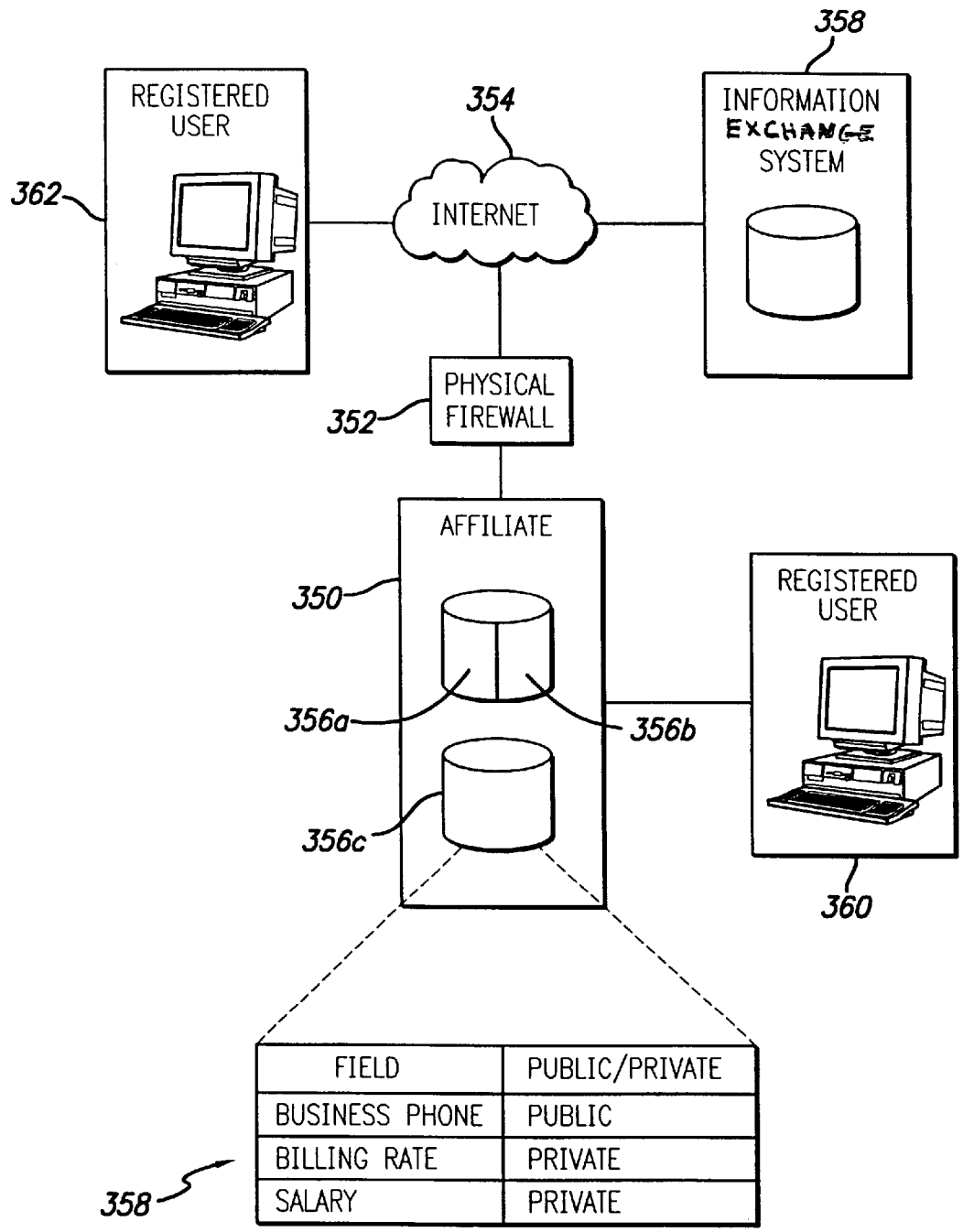
FIG. 13 illustrates a preferred embodiment of a software firewall.

As discussed above, an affiliate system may include a software firewall that allows the affiliate, on a field-by-field, person-by-person basis, to prevent a certain subset of information from being accessed through the Internet. A preferred embodiment of the software firewall is illustrated in FIG. 13. An affiliate system 350, is connected to the Internet 354 through a physical firewall 352. As known in the art, a firewall is a combination of hardware technologies such as one or more routers, that are used to give users in a private computer network or system, such as affiliate system 350, secure access to the Internet while protecting the internal network from unsolicited users. The affiliate system 350 includes data storage 356a–c which includes user profile information. A local registered user 360 and an external registered user 362 may access the profile data stored in data storage 356, data stored on information exchange system 358, or data stored on any other information exchange system or affiliate that is connected to the Internet 354.

In many circumstances, the affiliate system 350 will include a subset of data 356a that may be shared publicly across the Internet 354 (e.g., business contact information), and another subset of data 356b that the affiliate desires to maintain private (e.g., employee salaries, billing information). However, under the data access system described herein, each user may grant access to any other user on a field-by-field, person-by-person basis. In the preferred embodiment, a software firewall is implemented on the affiliate system 350 to prevent certain data fields from being accessed from the Internet 354. The software firewall includes a database 356c which includes a table 358 of fields and related public or private access information. Fields that are marked "public" may be accessed by users, such as registered user 362, through the Internet 354 and physical firewall 352. Fields that are marked "private" may only be accessed from inside the affiliate system's intranet or other local network.

Figure 14:
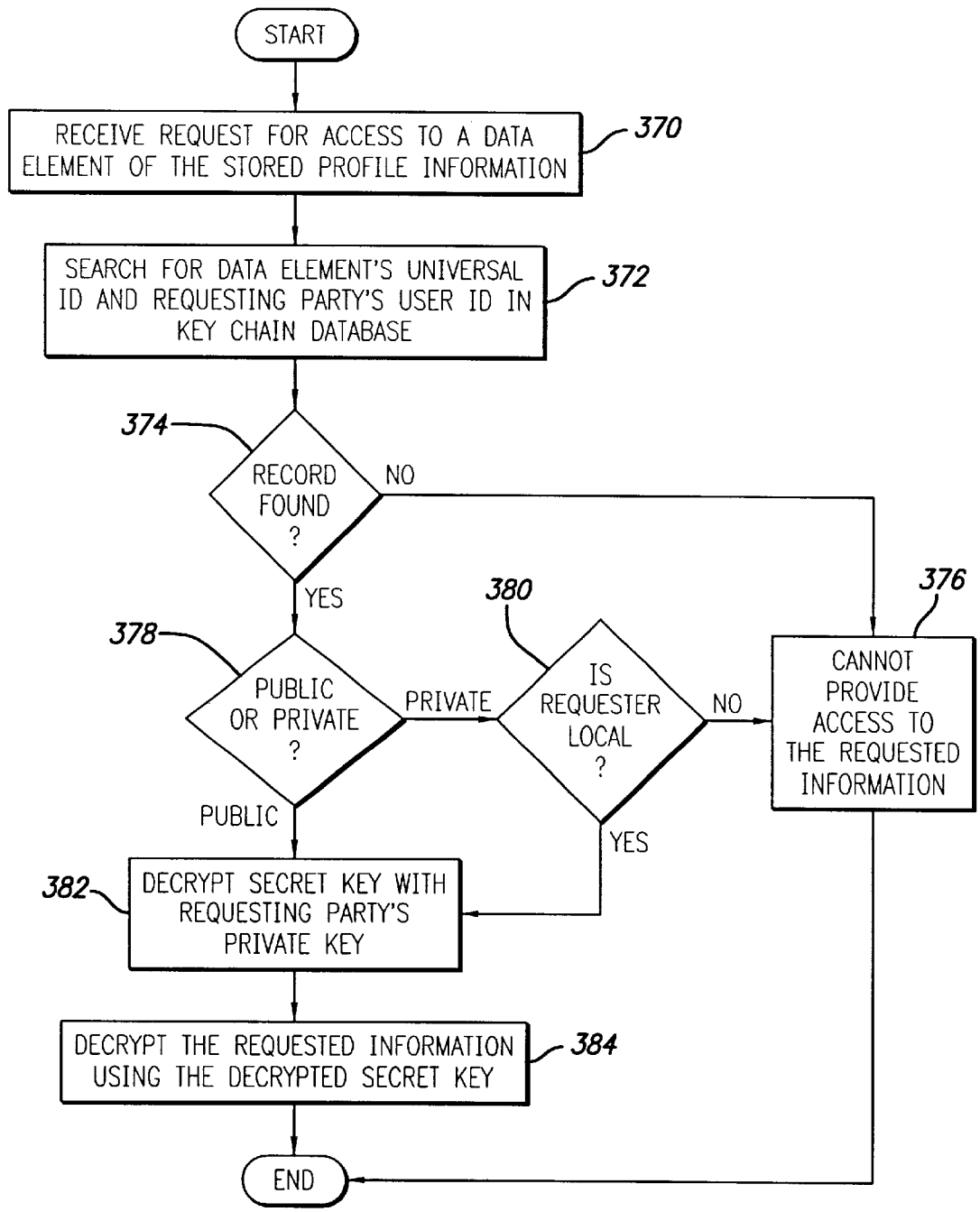
FIG. 14 is a flow diagram illustrating preferred steps for retrieving stored information from an affiliate system through its software firewall.

A preferred embodiment of the process of retrieving stored information from the affiliate system 350 through its software firewall is illustrated in the flow diagram of FIG. 14. In step 370, affiliate system 350 receives a request for access to a data element of stored profile information. The unique universal ID of the requested data element and the requesting party's user ID are searched for in the key chain database in step 372. If no matching records are found, then access cannot be granted to the requesting party (steps 374, 376). If a matching record is found in the key chain database, then a determination is made in step 378 whether the requested data element belongs to a data field that has been designated public or private. A query is run for the data field in the table 358, and if the field is deemed private, the network location of the requestor is determined in step 380. If the requesting user is located outside the physical firewall 352 then the requesting user is denied access to the data element. In the preferred embodiment, the affiliate system 350 denies access to a data element by preventing the decryption of the requesting user's secret key. Because the requesting user's private key is securely stored in the key management system, by denying access to the private key, the affiliate system 350 effectively denies access to the requested data element. If the requested data element is public, or the requestor is located within the physical firewall, the encrypted secret key associated with the data element and the requester is decrypted using the requestor's private key in step 382. In step 384, the decrypted secret key is used to decrypt the requested data element, which is then provided to the requestor.

Database Structure

In accordance with a preferred embodiment, the registered user may dynamically add arbitrary data fields to user profile information. A database structure for storing profile information in such a manner is illustrated in FIGS. 15a–b. A table 390 includes a universal ID field 400 for storing a location identifier of each record in the table, a user ID field 402 for storing the user identification of the registered user associated with the data record, a "field name" field 404 for storing the names of user profile fields, and a field type field 406 for storing the a data type associated with the field name.

In the preferred embodiment, a new record is added to the table 390 for each new data element associated with the registered user. The table may include pre-defined data fields, such as first_name and last_name, or arbitrary fields (e.g., favorite beer) dynamically created by the registered user. To define a new field, a new field name is created and a field type describing the stored information (e.g., numeric, character, date) is determined by the registered user. Next a new record is added to the table 390 including this new information. Preferably, there is a separate table 392 for each field type, which is used to store the data content for each field. The structure of these tables 390 and 392 is transparent to the registered user, who may be presented with the data from the information exchange system as single record, such as illustrated in FIG. 15b.

ZKEY System

A preferred embodiment of the present invention will now be described with reference to a ZKEY system. The ZKEY system is comprised of five software components: (1) the information entry and editing sub-system; (2) the information views sub-system; (3) the information view requests sub-system; (4) the sub-system for changing the ZKEY; and (5) a subsystem for changing the site password. It should be apparent that other software components can be added to the ZKEY system without significant modification to the system design.

Figure 16:
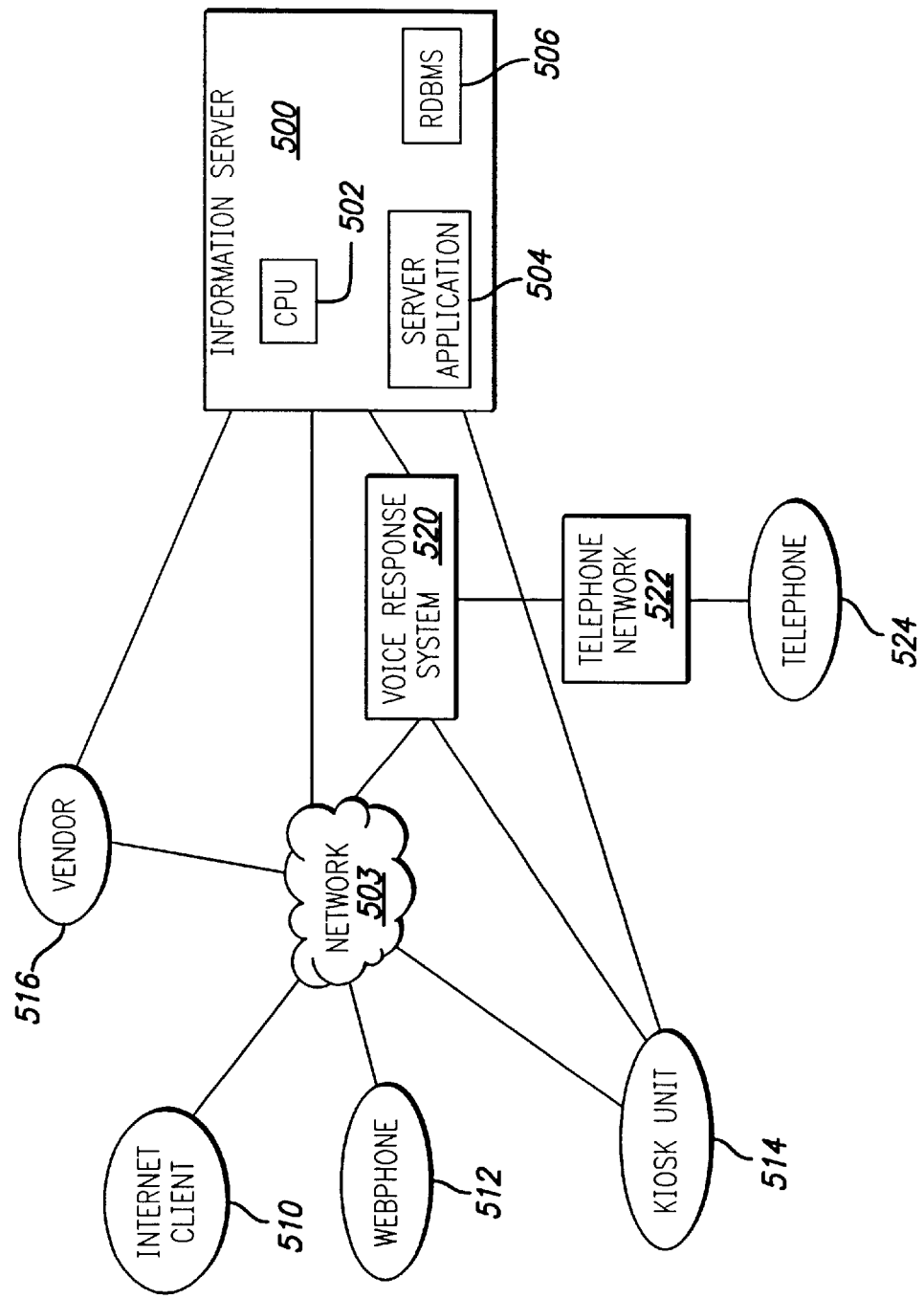
FIG. 16 is a block diagram illustrating a system architecture.

With reference to FIG. 16, a block diagram illustrating a system architecture which can be used with the ZKEY system is shown. A ZKEY server 500 includes a central processing unit 502 for running a server application 504, processing network transactions and issuing structured query language (SQL) instructions to a relational database management system (RDBMS) 506. RDBMS 506 is used to store records containing information about one or more entities.

Server 500 is connected to a network 508, such as the Internet, an intranet, local area network, wide area network or the like. An Internet client 510, a wireless application protocol phone ("WAP phone") 512, a kiosk unit 514, and a plurality of other network devices may be connected to network 508. A vendor 516, such as a retail establishment, product delivery service, distributor, food delivery service, or the like may further be connected to network 508. Alternatively, vendor 516 may be directly connected to server 500 for direct access to server 500. For example direct access may be facilitated either by modem through a telephone network, or by a high-speed digital T1, DSL or Integrated Services Digital Network (ISDN) connection.

A voice response system (VAS) 520 may be connected between network 508 and server 500 to provide the network 508 and server 500 with voice response capabilities. One skilled in the art would recognize that VAS 520 may comprise a tone detection/translation device, analog-to-digital sampler, tone recognition component, and other components which are typical of voice response systems. Signals from access systems which require voice or tone translation for communicating with server 500 are diverted through VAS 520 for translation. VAS 520 may also be connected to a telephone network 522. A telephone 524 may be connected to the telephone network 522 and can be used to access server 500 through the VAS 520.

Kiosk 514 may be connected to VAS 520 if the kiosk 514 has voice recognition or a tone keypad. Alternatively, kiosk unit 514 may also be directly connected to server 500 if not through network 508 and no voice or tone translation is needed.

Figure 17:
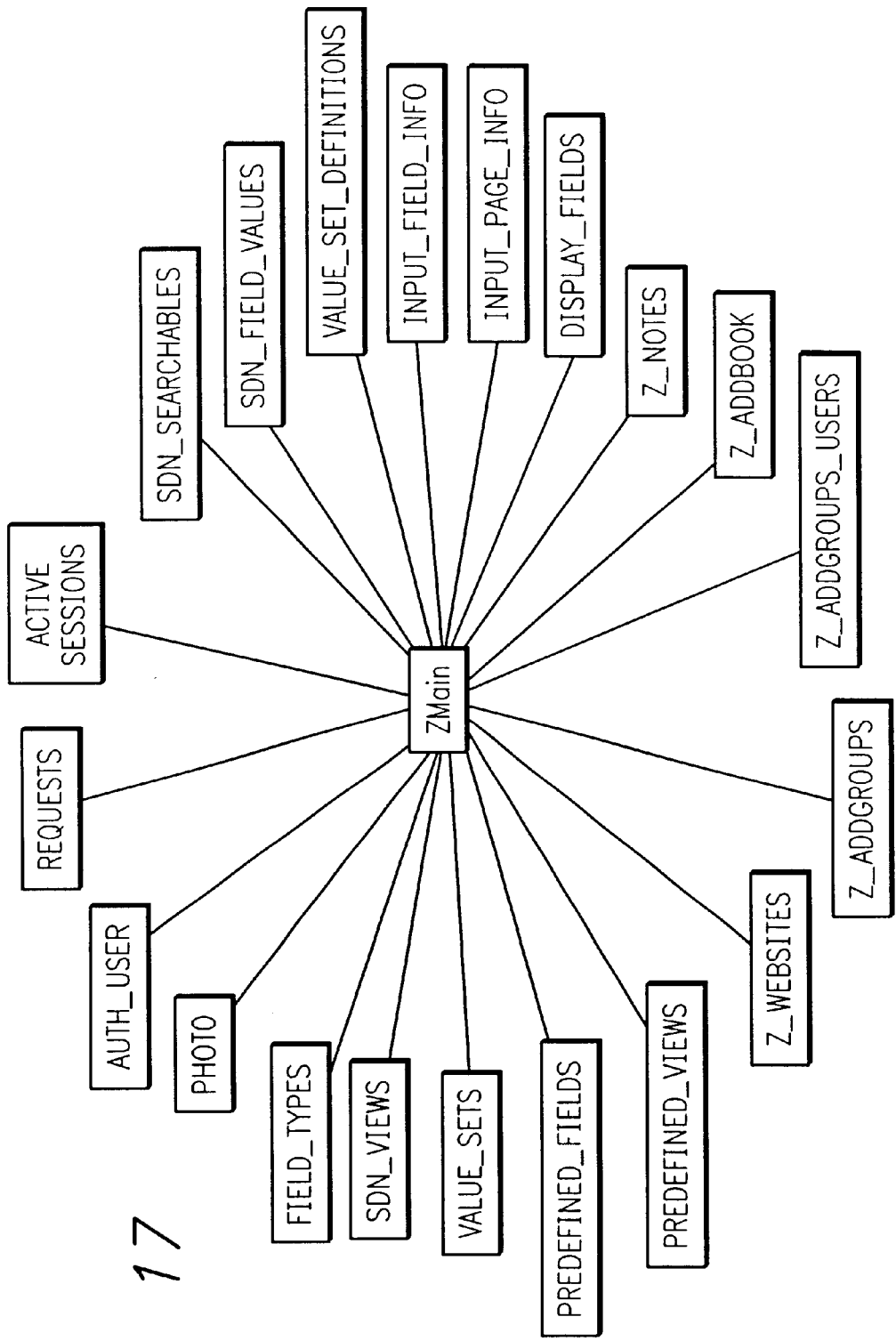
FIG. 17 is a block diagram showing a system database schema of an embodiment of the present invention.

With reference to FIG. 17, a spoke diagram is presented illustrating a preferred database schema of the user information and authorization tables. It would be apparent to one of ordinary skill that other schemas could be used. Each of the fields in the database are keyed on a field having a prefix "SDN." The tables within this database schema are comprised of the following:

ACTIVE SESSIONS: contains user authorizations, keeps track of who is logged into a web site, and maintains global variables;

AUTH_USER: verifies the users' identity using cookie technology or other electronic data transfer protocols;

Z_MAIN: contains the main user information registration data, and assigns an SDN internal key number to link all other relational data tables;

SDN_SEARCHABLES: stores searchable information for easy retrieval;

FIELD_TYPES: keeps track of descriptions of field values, for example, text, date, number, etc. allowed in the underlying database management system, which in this embodiment may be an "ORACLE" based database;

PREDEFINED_FIELDS: stores personal information fields defined for information input, for example, home phone, work phone, birthday, and the like;

INPUT_FIELD_INFO: keeps track of what field is displayed on what web page, and in what order the field appears;

DISPLAY_FIELDS: determines the ordering of fields within any profile information view;

PHOTO: enables a user to upload a photo image file directly into a database using Binary Large Object (BLOB) technology for the "ORACLE" based database;

REQUESTS: manages personal information requests and access grants;

Z_NOTES: stores personal notes describing another ZMEMBER within a contact list;

Z_WEBSITES: lists the users' favorite websites;

Z_ADDBOOK: the main address book table that lists other ZMEMBERS in an existing ZMEMBERS's address books;

Z_ADDGROUPS: contains customized user group descriptions;

Z_ADDGROUPS_USERS: contains the ZMEMBERS belonging to specific address book groups;

PREDEFINED_VIEWS: may specify predefined views;

SDN_FIELD_VALUES: stores and maintains all user personal information;

SDN_VIEW_FIELDS: keeps track of specific fields belonging to specific profile information views;

SDN_VIEW_SECURITY: the main table for information view access and keeps track of ZMEMBER access to particular profile information views;

SDN_VIEWS: the main table for customized profile information view data;

VALUE_SET_DEFINITIONS: contains a set of choices for a particular field, for example the field "State" would have 50 pre-set choices allowed, so this table keeps track of the actual data inside the value sets;

VALUE_SETS: a description of all value (validation) sets; and

INPUT_PAGE_INFO: contains default information for input page setup and order information.

With reference to FIG. 18, a preferred database schema for a calendar module is shown. As would be apparent to one of ordinary skill in that art, other schemas could be used. Each of the database tables are keyed on the SDN field described above. The tables within the database schema are comprised of the following:

Z_CAL: contains the main calendar event setup and information on an event;

Z_CAL_ATTENDEES: contains users attending an event and their attendance status (either accepted or rejected);

Z_CAL_LOCATIONS: contains locations of events for future use by member;

Z_CAL_RIGHTS: stores and maintains access control for an individual's calendar;

VAL_HOLIDAY_SETS: contains descriptions of various holiday sets (United States, Chinese, Jewish, etc.);

VAL_HOLIDAYS: contains dates and descriptions of actual holidays to add to the calendar;

VAL_APPT_TYPES: defines the type of the appointment a person can set (e.g., meals, birthday, conference call, etc.);

VAL_TIMEZONES: sets the calendar to the user's default time zone; and

VAL_CAL_ATT_STATUS: contains attendee's acceptance or rejection of an invitation to an event.

With reference to FIG. 19, a preferred database schema for the virtually infinite storage module is shown. Again, one of ordinary skill would recognize that other schemas could be used. Each of the database tables are keyed on the SDN field. The tables within this database schema are comprised of the following:

IMP_PREF: sets e-mail preferences;

IMP_LOG: logs e-mail activity; and

ZDRIVE_FILESHARE: maintains access control of files on the ZDRIVE.

With reference to FIG. 20, a preferred database schema for the chat module is shown. One of ordinary skill would recognize that other schemas could be used. Each of the database tables are keyed on the SDN field. The tables within this database schema are comprised of the following:

ZCHAT_GUESTS: contains and maintains chat room guest lists and member access information;

ZCHAT_MESSAGES: contains all messages posted in chat rooms; and

ZCHAT_SESSIONS: contains and maintains a list of which ZMEMBERS are currently in a particular chat area also known as a ZROOM.

Figure 21:
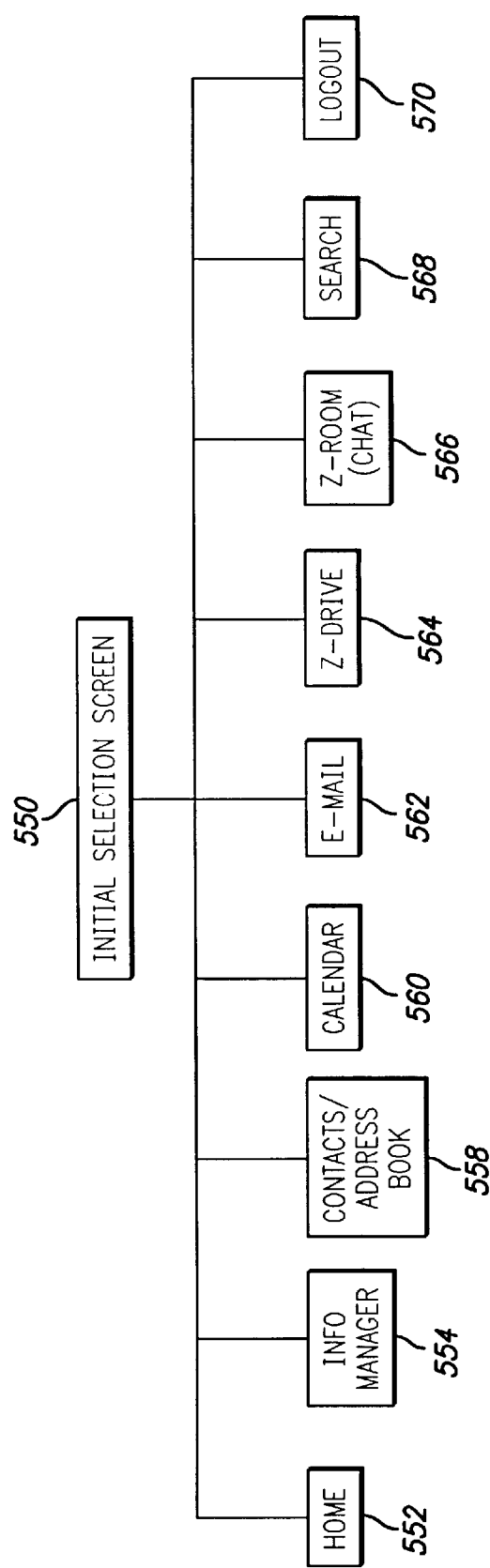
FIG. 21 is a block diagram of a structure of one web site embodiment of the present invention showing the interrelationship of the various modules.

With reference to FIG. 21, a generic block diagram illustrating some of the modular components of an embodiment of the present invention is shown. This diagram is not meant to be an exhaustive description of a preferred embodiment, which will be detailed below. An initial selection screen 550 inviting members to provide information is an initially displayed component of the system. From this initial selection screen 550, a member can select among various modules, including a home screen module 552; an information exchange system 554; a contacts/address book 558, which may be called ZADDRESS; a calendar 560, which may be called ZCALENDAR; an email system 562; a secure-access storage system 564, which may be called the ZDRIVE; a chat room 566, which may be called ZROOM or ZCHAT; a search subsystem 568, which may be called ZSEARCH; and the system logout module 570. Many of these modules allow direct access from one to the other without returning to the initial selection screen.

Login Sequence

Figure 22:
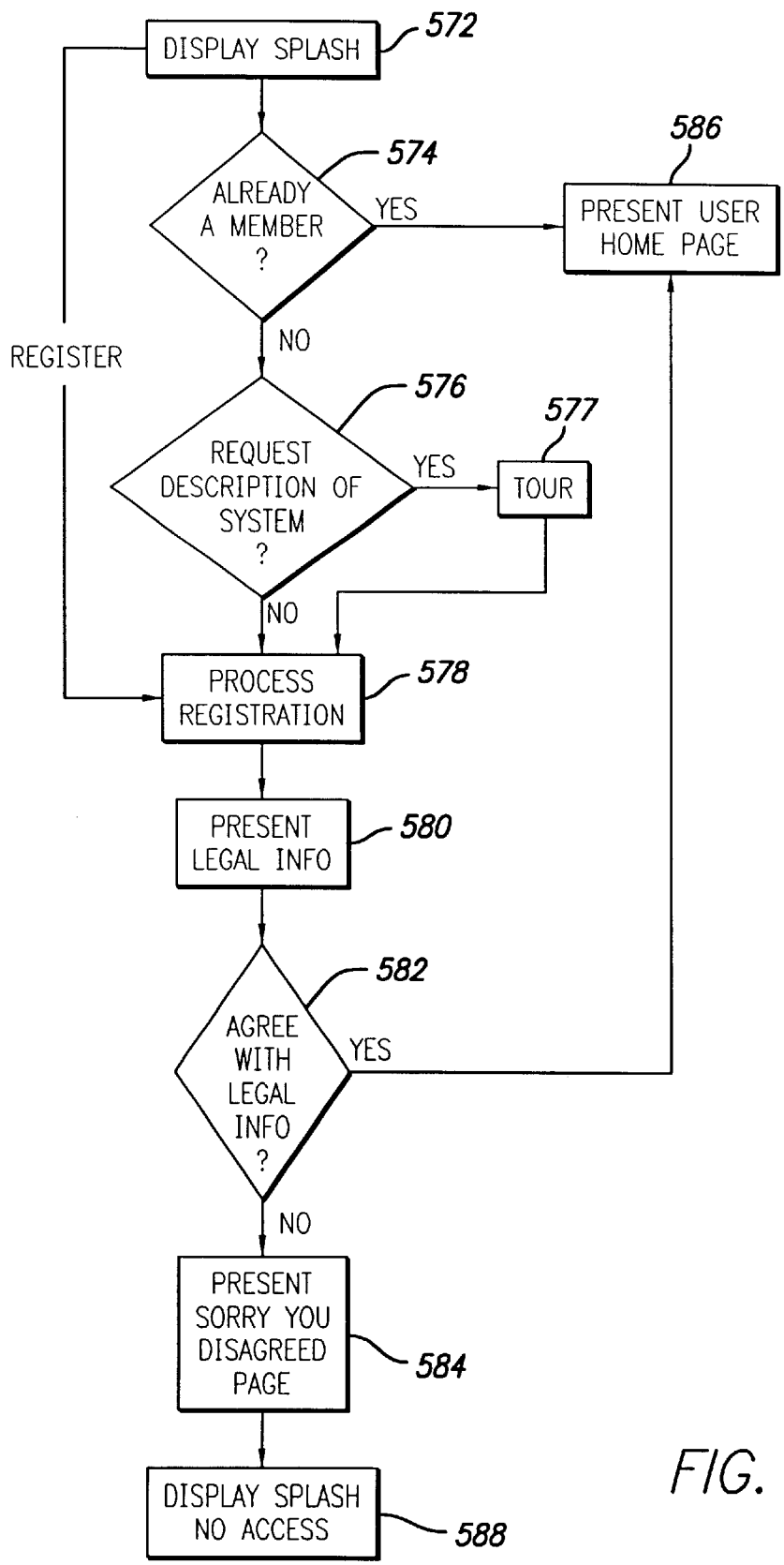
FIG. 22 is a flow diagram showing an initial login sequence for both new users and members.

With reference to FIG. 22, a preferred login sequence flow diagram for an embodiment of the present system is shown. A user who enters the site for the first time is presented with a splash screen (step 572) that provides an information about the system features. The system gives users an opportunity to identify themselves as previously registered members (step 574). If the user is an existing member, then the system proceeds directly to a user home page (step 586). Otherwise, from the splash screen, the user can either request a descriptive tour of the system (step 576), and then receive a tour (step 577), or proceed directly to a registration page (step 578). After entering appropriate registration information on the registration page (step 578), the user may optionally have a legal information page presented to them (step 580). The system checks to see if the user agrees with the terms and conditions presented on the legal information page (step 582). If so agreed, then the user is permitted to proceed to a user home page (step 586). Otherwise, the user is presented with a disagreement page (step 584). After the disagreement screen is shown, processing moves to the splash screen display and prevents access to the system (step 588).

Figure 23:
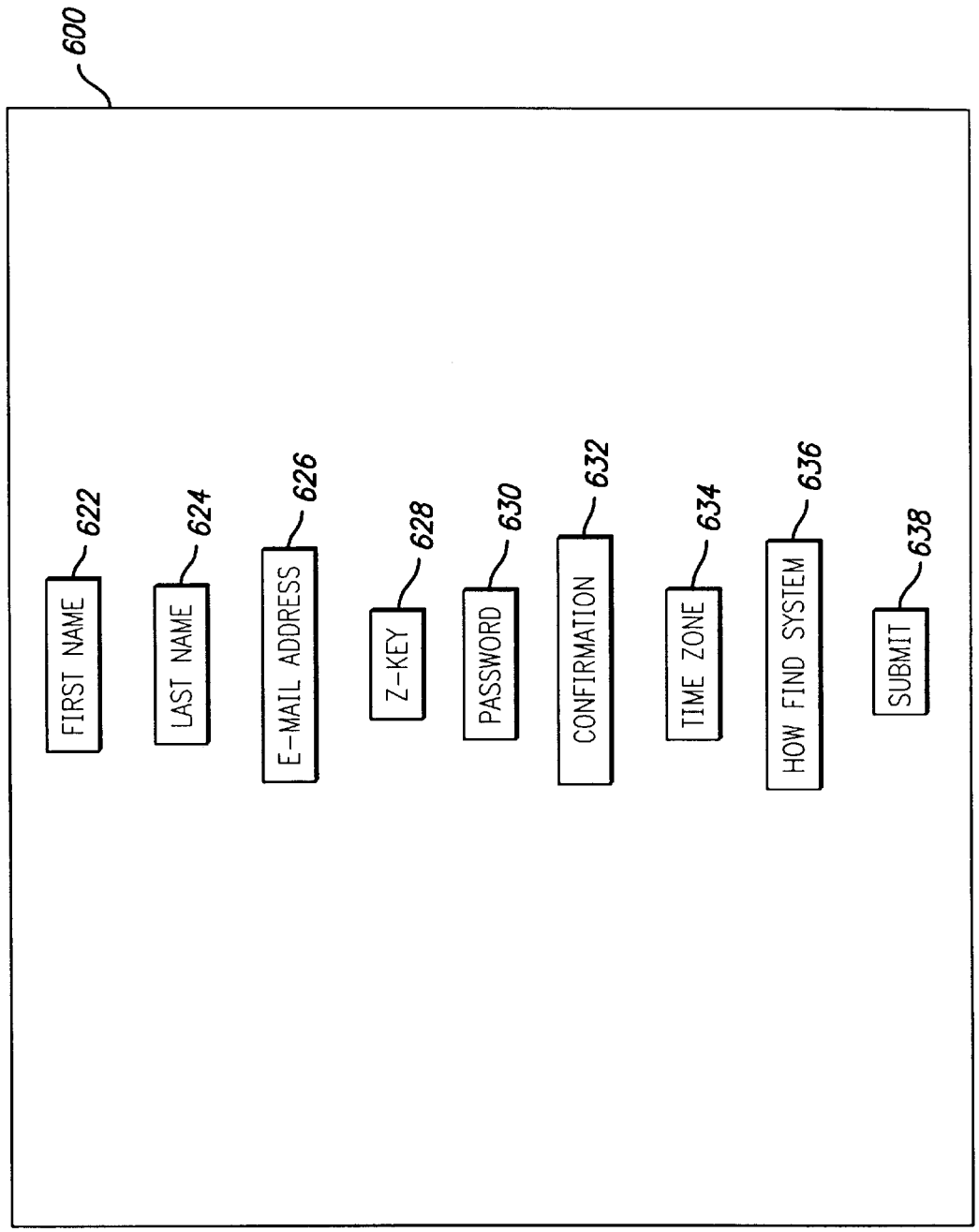
FIG. 23 is a block diagram of a registration page.

With reference to FIG. 23, a block diagram of a preferred registration page sequence 578 is shown in an Internet browser screen 500. The user may view relevant descriptive information on the registration page and may enter its first name in field 522, their last name in field 524, and their e-mail address in field 526. Users also enter a universal identification code, which may be called a ZKEY, in field 528. This code will be used as the universal identification code to uniquely identify the new member. The user is asked to choose a password in field 530 that will be requested whenever the user accesses their information on the system, whether by Internet client 510 (FIG. 16), WAP phone 512, kiosk unit 514, telephone 524, or other systems which are used to access server 500 by a member. The password is confirmed in field 532. In field 534, the user is asked which time zone they are in. In a selection list field 536, the user is asked how the user found out about the system. By actuation of selection icon or button 538, the information entered thus far is submitted to RDBMS 506. In other embodiments of the invention, additional information may be gathered on this registration page.

Figure 24:
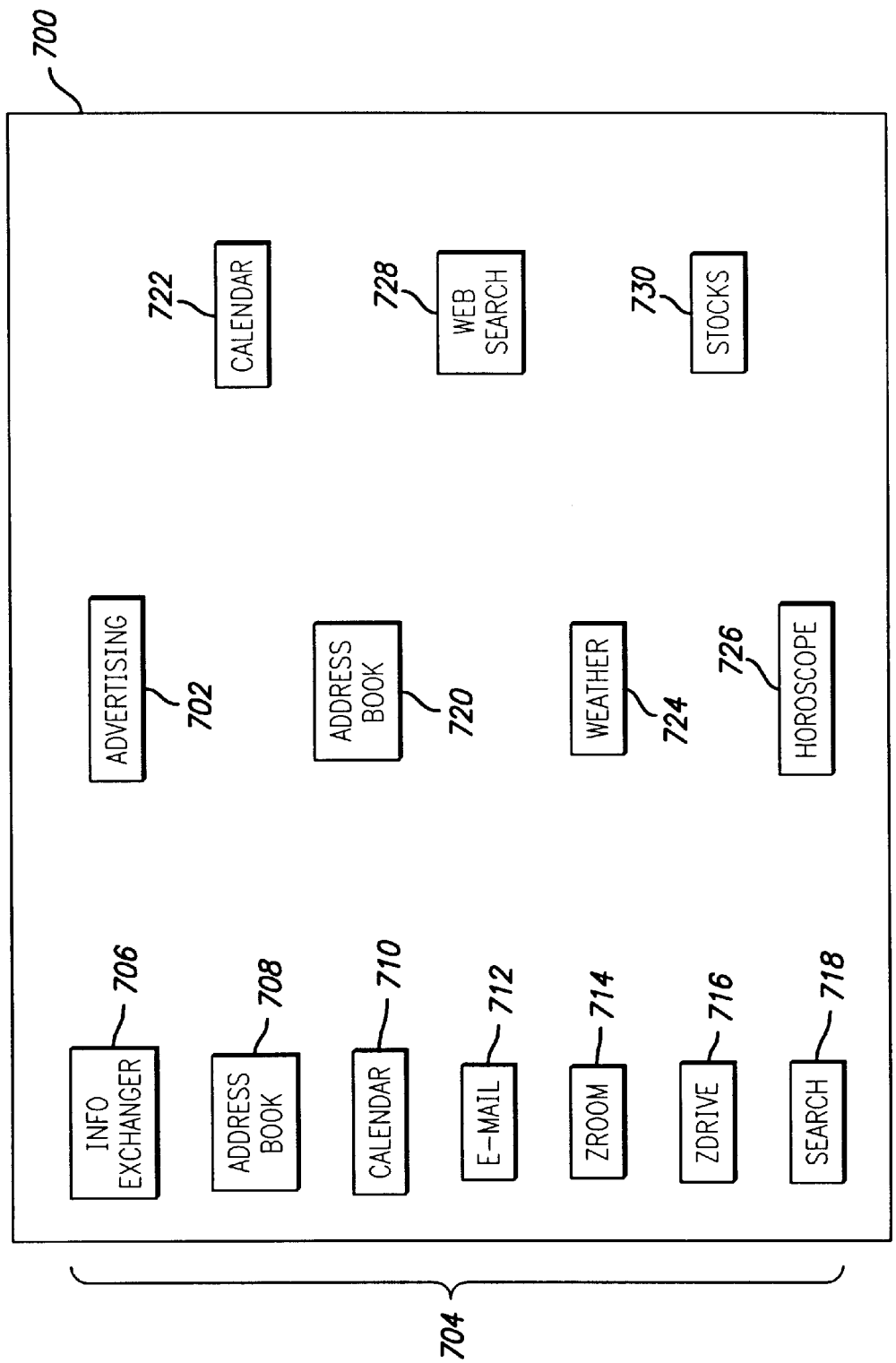
FIG. 24 is a block diagram of the initial selection screen.

FIG. 24 shows one form of a web-based embodiment of the initial selection screen 700, also called the home area. The content of the home area can be customized by the user through a drag-and-drop interface. Information related to a user's stored address book 720 and calendar 722 can be provided. Also, in a preferred embodiment, among other things, today's weather 724, horoscopes 726, web search capability 728 and stock information 740 can be provided. Hypertext markup language (HTML) tabs can be selected to create or edit the member's profile, edit a contact/address personal database, or to set up profile information views explained below. Context sensitive advertising appears throughout the screens as the user navigates through the system, such as the screen region shown at location 702. Also, a universal selection menu, generally indicated at 704, is used to navigate through various features of the system described below. Quick access to the information view exchange is provided through icon 706, to address book through an Address Book Icon 708. Similarly, the user has quick access to the calendar through the Calendar Icon 710 and to an e-mail and chat facility through the E-mail Icon 712 and ZROOM Icon 719 respectively. Additionally, access to the file storage facility is provided through the ZDRIVE Icon 716 and to the search facility (e.g., ZSEARCH), described below, through the Search Icon 718.

Figure 25:
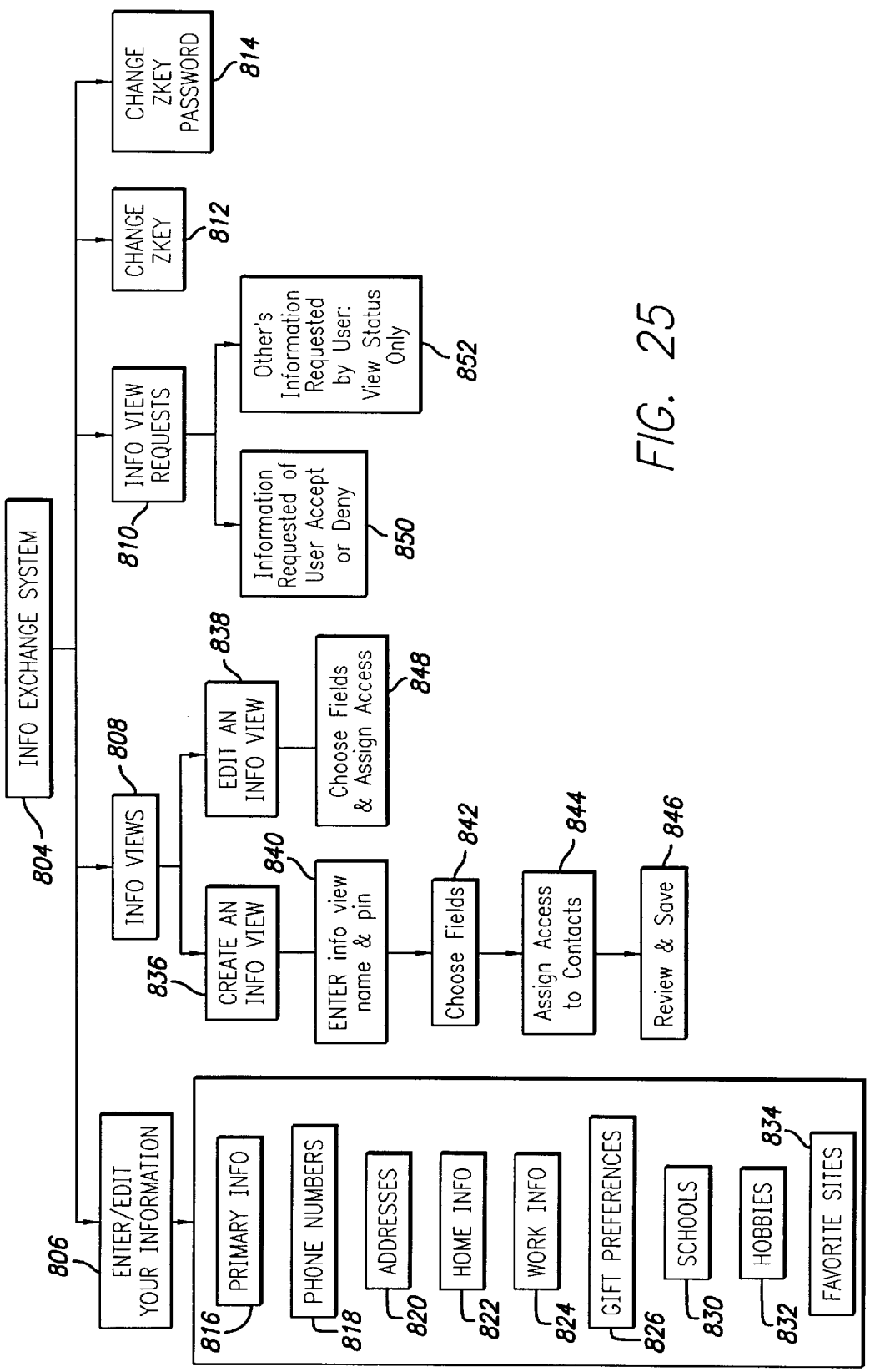
FIG. 25 is a block diagram showing the system information management module.

With reference to FIG. 25, a block diagram representing a detailed sub-module overview of a preferred embodiment of the information exchange system 804 is shown. The information exchange system is comprised of five sections: (1) an information entry and editing sub-system 806; (2) an information views sub-system 808; (3) an information view requests sub-system 810; (4) sub-system 812 for changing ZKEY; and (5) a sub-system for changing the site password 814. The information entry and editing sub-system 806 in turn allows a user to enter or edit profile information, including one or more of the following: primary information 816, phone numbers 818, addresses 820, home information 822, work information 824, gift preferences 826, schools attended 830, hobbies 832, favorite web sites 834, and other information that is not shown. The information views sub-system 808 allows a user to create 836 and edit 838 information views. The creation of an information view 836 allows a user to enter a profile information view name and associated personal information number (PIN) 840; selecting the data fields that will be displayed in the view 842; assigning access privileges to this view to other members or contacts 844, and reviewing and saving information views 846. The PIN relating to item 840 is not required in the preferred embodiment. The editing of an information view 838 allows a user to, among other things, choose profile information fields and assign or reassign access privileges to other members or contacts 848, on a field-by-field, person-by-person basis. The information-view-requests-sub-system 810 manages requests to access a profile information view including: accepting or denying information requested of the user by others 850; and accepting or denying information requested by the user of other members 852. The information exchange system 804 also allows the user to change the ZKEY 812 and the site password 814.

Figure 26:
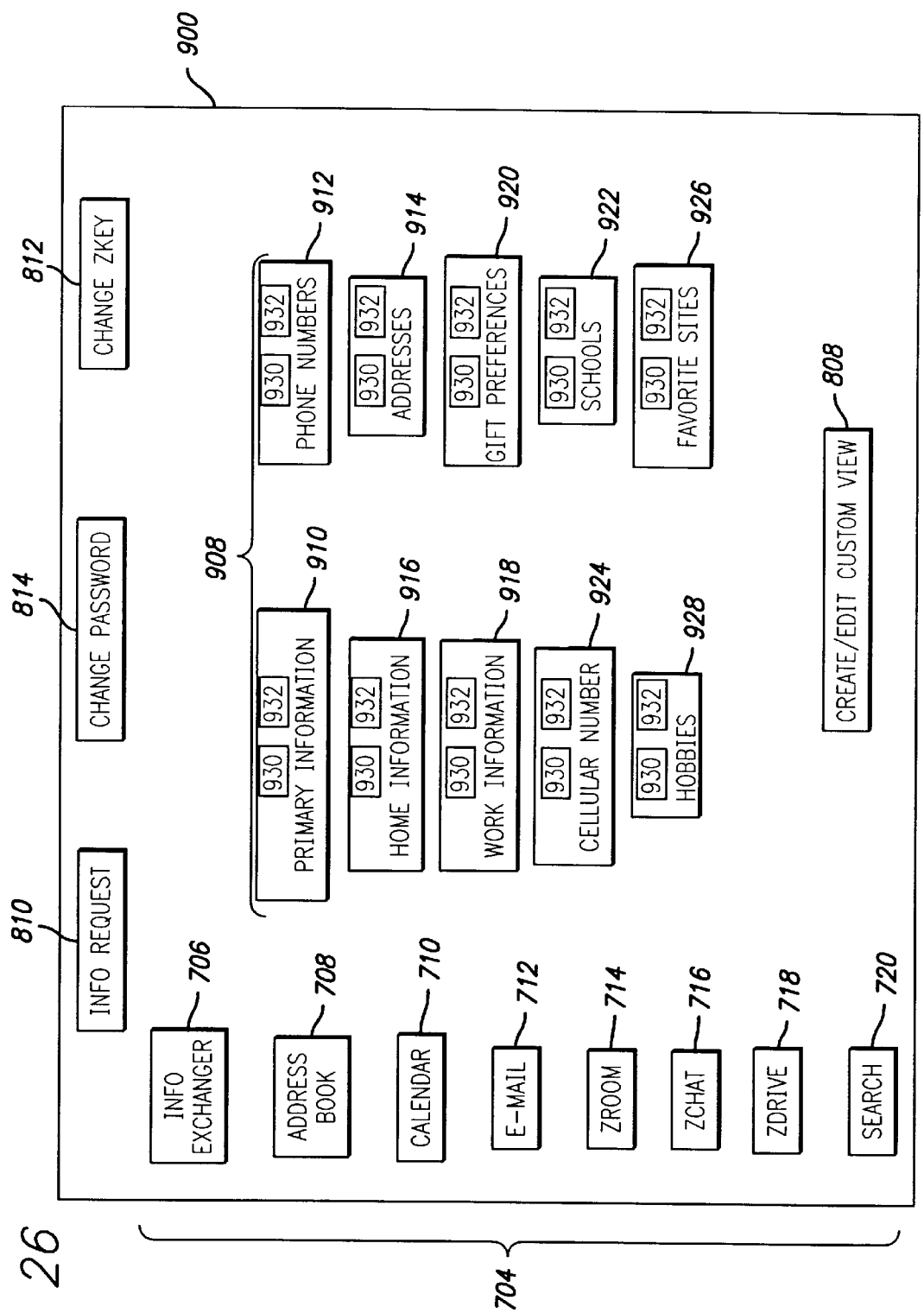
FIG. 26 is a block diagram of the system information management module.

With reference to FIG. 26, the information exchange system screen 900 is shown with a choice of available information fields 908 displayed. By actuating a link 930 on this page, one of a plurality of types of information which can be entered is shown. The member may select among the plurality of information fields or types including: primary information 910, phone numbers 912, addresses 914, home information 816, work information 818, gift preferences 820, schools attended 822, cellular phone number 824, favorite web sites 826, hobbies 828, and the like. This information may be entered or edited for storage in RDBMS 506. This allows the user to select a specific field to view or modify. By activating a link 932, the user can provide access to this information field to others. Each of the information fields 908 provide access to field information that can be created, edited and stored by the user. Additionally, this screen allows the user to create/edit a custom information profile view 934, which can contain any of the information located within the profile information fields. This custom profile can be viewed by other members and non-members who are provided access.

Figure 27:
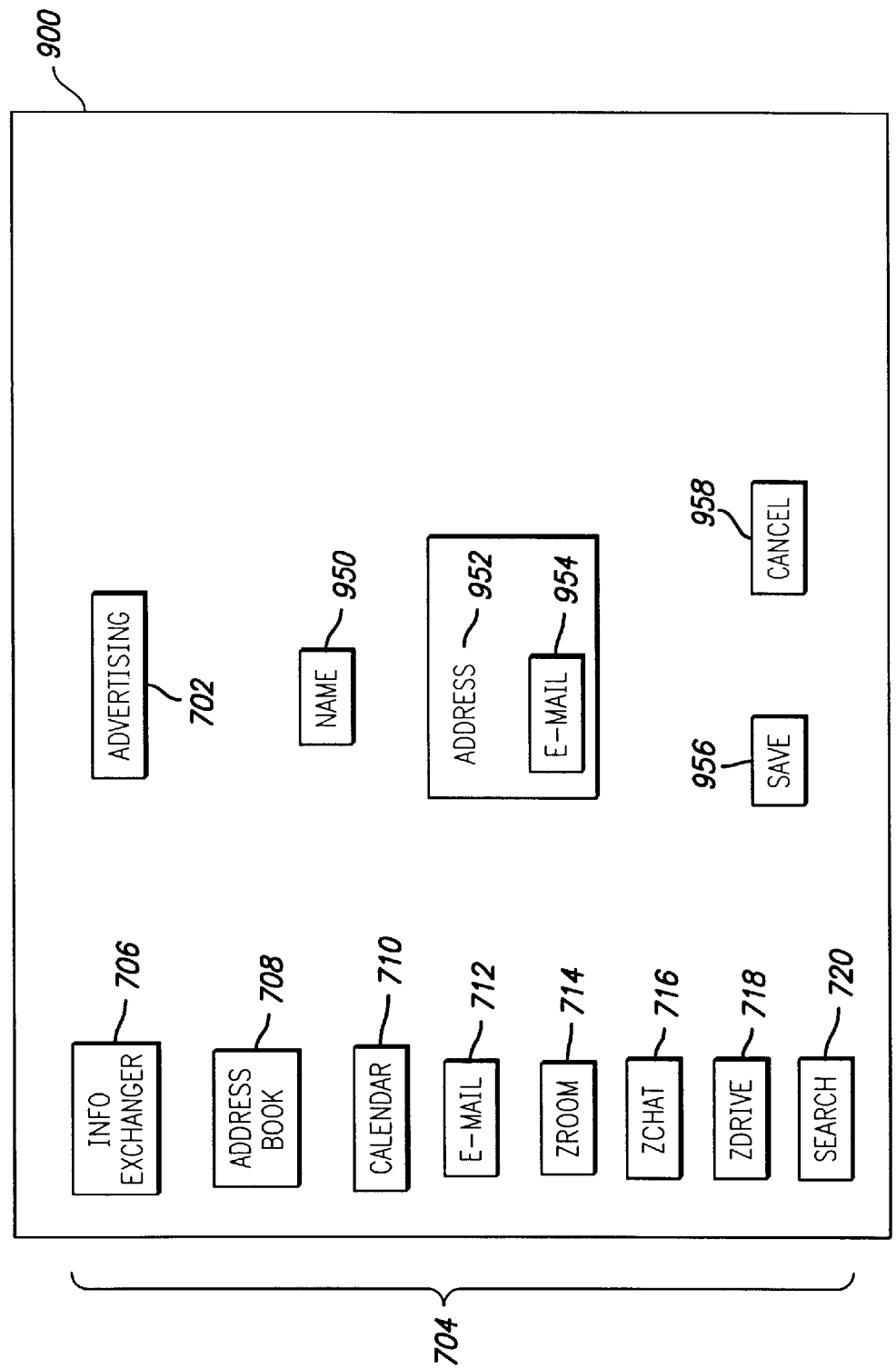
FIG. 27 is a block diagram of a primary information section of the information management module of FIG. 26.

With reference to FIG. 27, one example of entering information into the system is provided after choosing the selection 910 from FIG. 26. In order to enter/edit profile information 806 of FIG. 25, a primary information page will appear on browser 900. The user is prompted to enter a full name (e.g. first, middle, last, and nickname 950) and address information 952, including e-mail location information 954 (e.g., work, home or other e-mail), for updating of the RDBMS 506. The HTML page may be larger than the viewing area of the browser 900 because there are more fields in which text can be entered than those which could currently be displayed. The information can be saved 956 or canceled 958.

Moreover, an HTML page appears after selection of the "Phone Numbers" 912 information option in FIG. 26. The member is given the option to enter a plurality of different personal and business phone numbers. After the fields have been edited, a Save Icon may be actuated to store the input phone numbers into RDBMS 506.

Additionally, an HTML page appears after selection of the "Addresses" 914 information option in FIG. 26. In the screen of the browser 900, the user may enter address information for home, work, international travel and the like. The Slider bar of the screen may be lowered in order to enter more address information not shown on the screen, such as school, alternate, and travel addresses. A Save Icon may then be actuated in order to store the entered address information in RDBMS 506.

Figure 28:
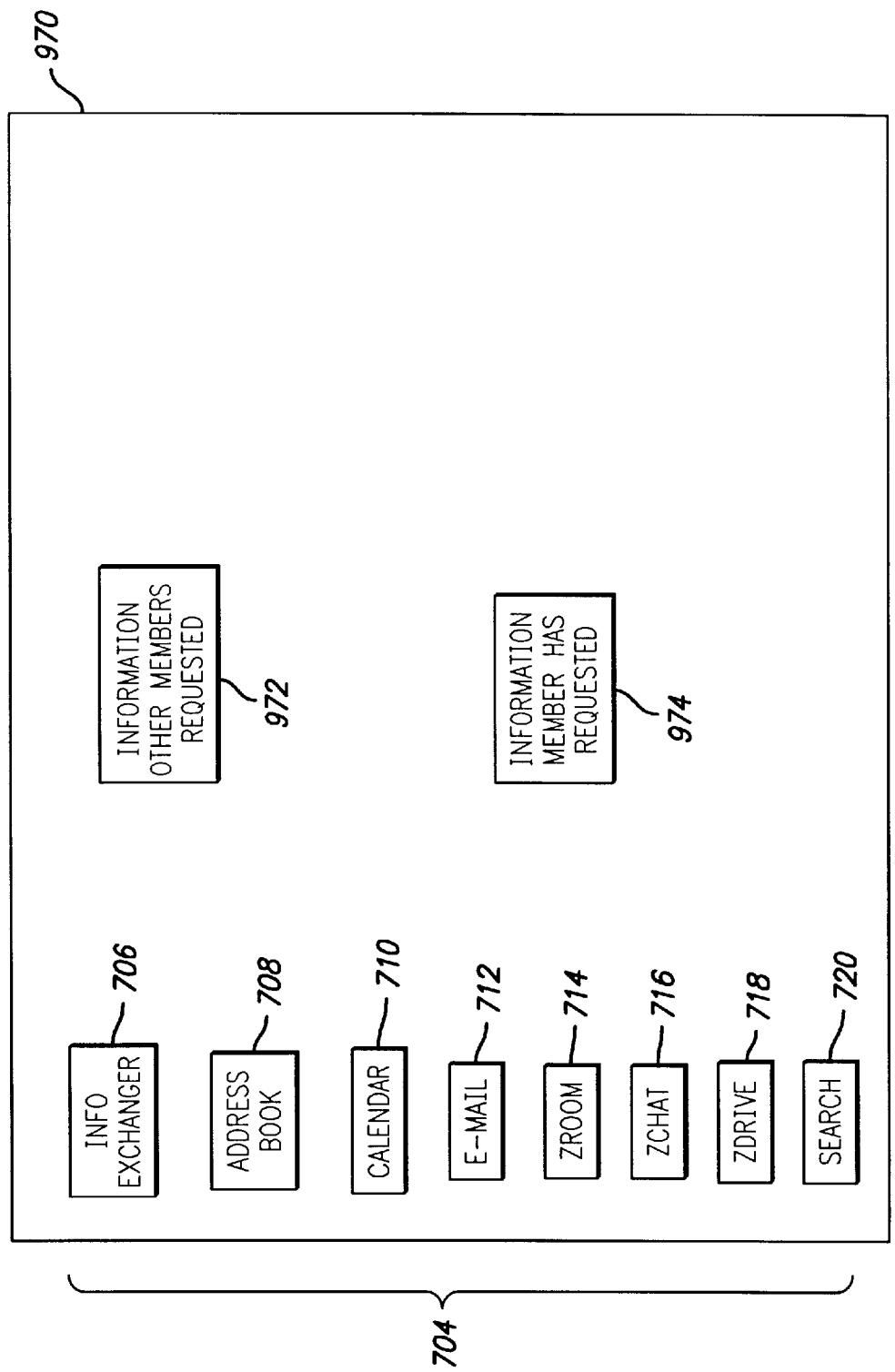
FIG. 28 is a diagram of the information view requests page.

With reference to FIG. 26, other HTML pages for entry and editing of information may be displayed by selecting link 930 next to each field or type of information. With reference to FIG. 28, an HTML page is shown which is presented after selection of the "Info Requests" selection 910 of FIG. 26. The various profile information views are views which the member can set up for different contacts that the member allows selective access for the member's information. As explained below, the member may choose different fields for different profile information views which different groups of people may view. Members implement the different views as explained below. The info-requests-HTML page 970 of FIG. 28 alerts the member to various information views which other members have requested access to 972, or information views for other members which the current member has requested access to 974. As will be understood by one of ordinary skill in that, any of the pages of this invention described herein may be programmed in HTML, DHTML, or any other method for creating a page of information.

Contact List Management System

Figure 29:
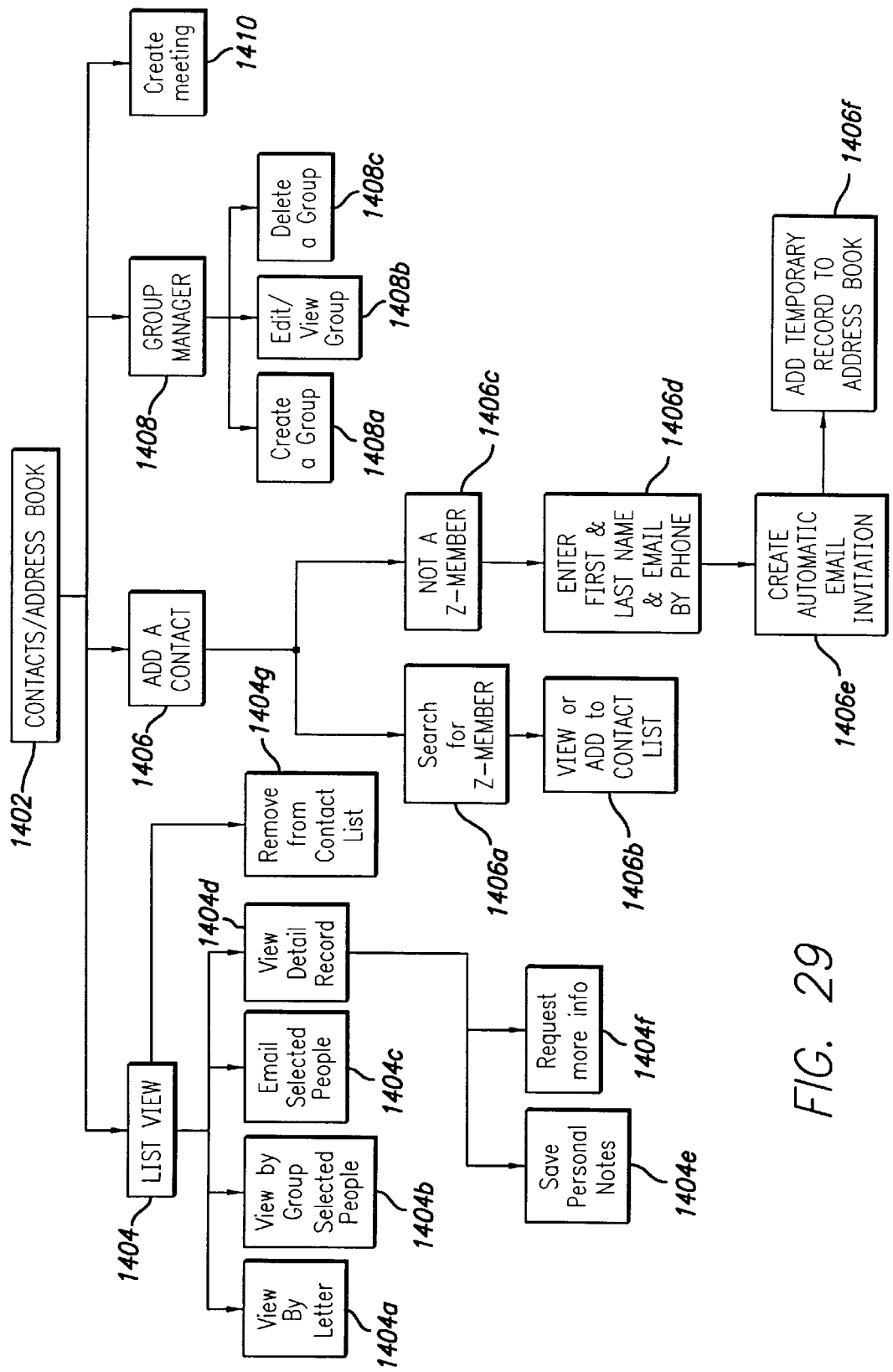
FIG. 29 is a block diagram showing the structure of a contacts management and address book module.

With reference to FIG. 29, a block diagram representing a detailed module overview of the contacts/address book module 558 shown in FIG. 21. The starting point 1402 initiates the contact list manager, which is an HTML page in the web site embodiment. From the contacts/address book page, the user may access a list view page 1404, a page for adding contacts 1406, a group manager page 1408, or create a meeting page 410.

In one aspect of the invention, the address book comprises a list view 1404 selection. Under list view 1404, a list of the member's contacts is provided 1404*a*. Additionally, contact information may be viewed by "Group" in one aspect of the invention 1404*b*, as contacts may be sorted into different contact groups. Also, contacts may be emailed 1404*c*. Finally, detailed records 1404*d* may be shown, including such things as personal notes 1404*e* and more information views 1404*f*. Also, the ability to remove a contact is provided 1404*g*.

By selecting "Add Contact" 1406 from the address book the user may add contact information. The system allows the user to search for members 1406*a*. If the new contact is a member of the system and assigned a member ID number or ZKEY, the member may enter the new contact's member ID number for a selection. If the member does not have the contact's member ID, the server application allows a search for the member by entering text into name fields in order to search by name, or by selecting a field for searching in a field, such as a Boolean field. After locating the member, the contact information may be viewed or added to 1406*b*.

Alternatively, if the contact is not a member of the system, the member may add a non-member contact 1406*c*. For example, an HTML page for adding a non-member contact will appear on a display screen 1406*d*. After entry is completed for the initial page, the member may actuate a button to proceed to enter further information regarding the non-member contact. In the preferred embodiment of the invention, the system creates an e-mail message to be sent to the non-member, which introduces the non-member contact to the system 1406*e*. The member is given the option of editing the message before it is sent. After sending the e-mail, the member has a temporary record added to the address book 1406*f*.

In one aspect of the invention, a group manager page 1408 appears after the member chooses the "GROUP MANAGER" selection on the menu. It will be understood that there are other ways of accessing the group manager page. In this page, the member may create 1408*a*, edit 1408*b* or delete groups 1408*c* for including contacts by actuating page buttons. A selection list appears listing contacts that the member has added to the contact list. A selection list of contacts already in the group is shown. In order to add a contact to the group, the member selects the contact from a selection list. Similarly, to remove a contact from the group, the member selects a contact from the selection list, and then selects a removal icon. After adding and removing contacts from the group, the member may direct the server application to store the group as edited to the RDBMS. Finally, a meeting for members or contacts can be created 1410.

Figure 30:
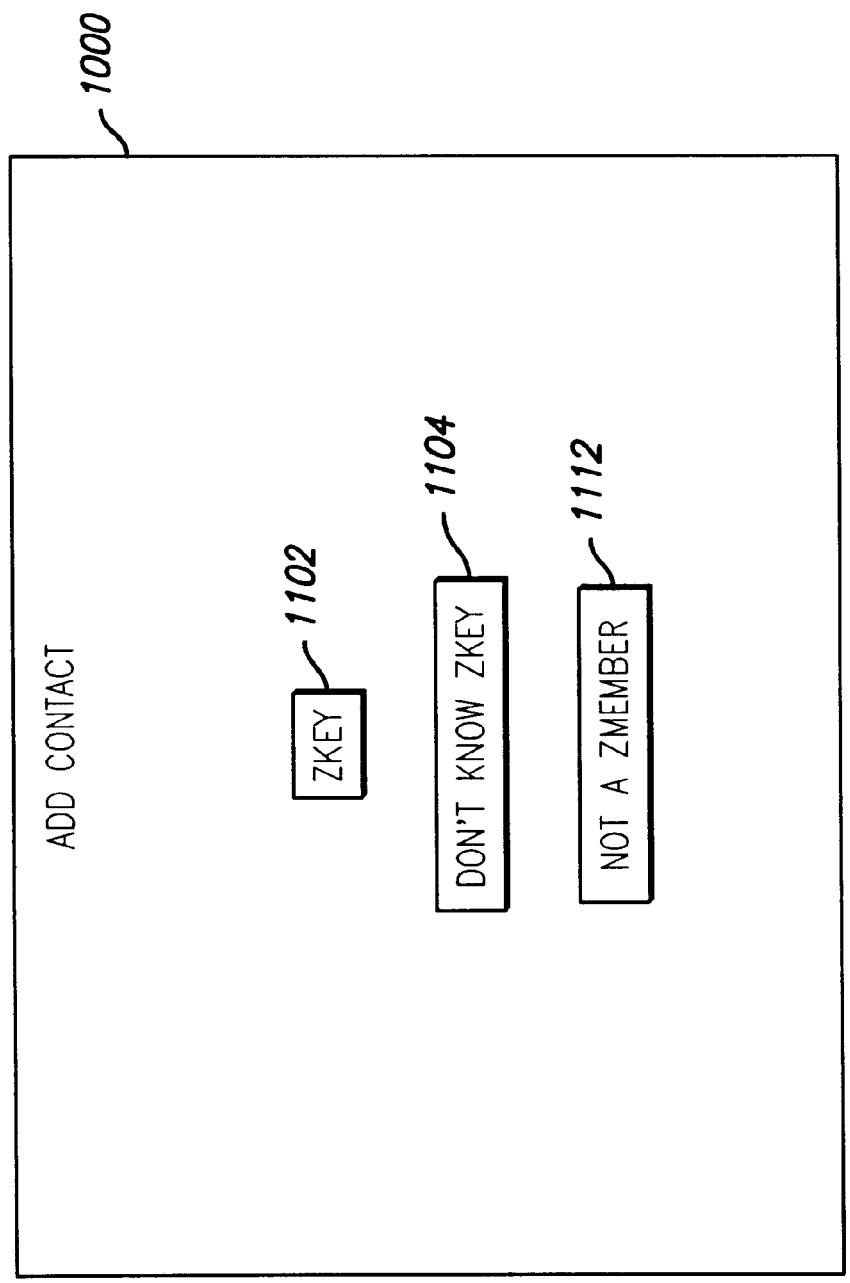
FIG. 30 is a block diagram for adding a contact to the contacts management and address modules.
Figure 31:
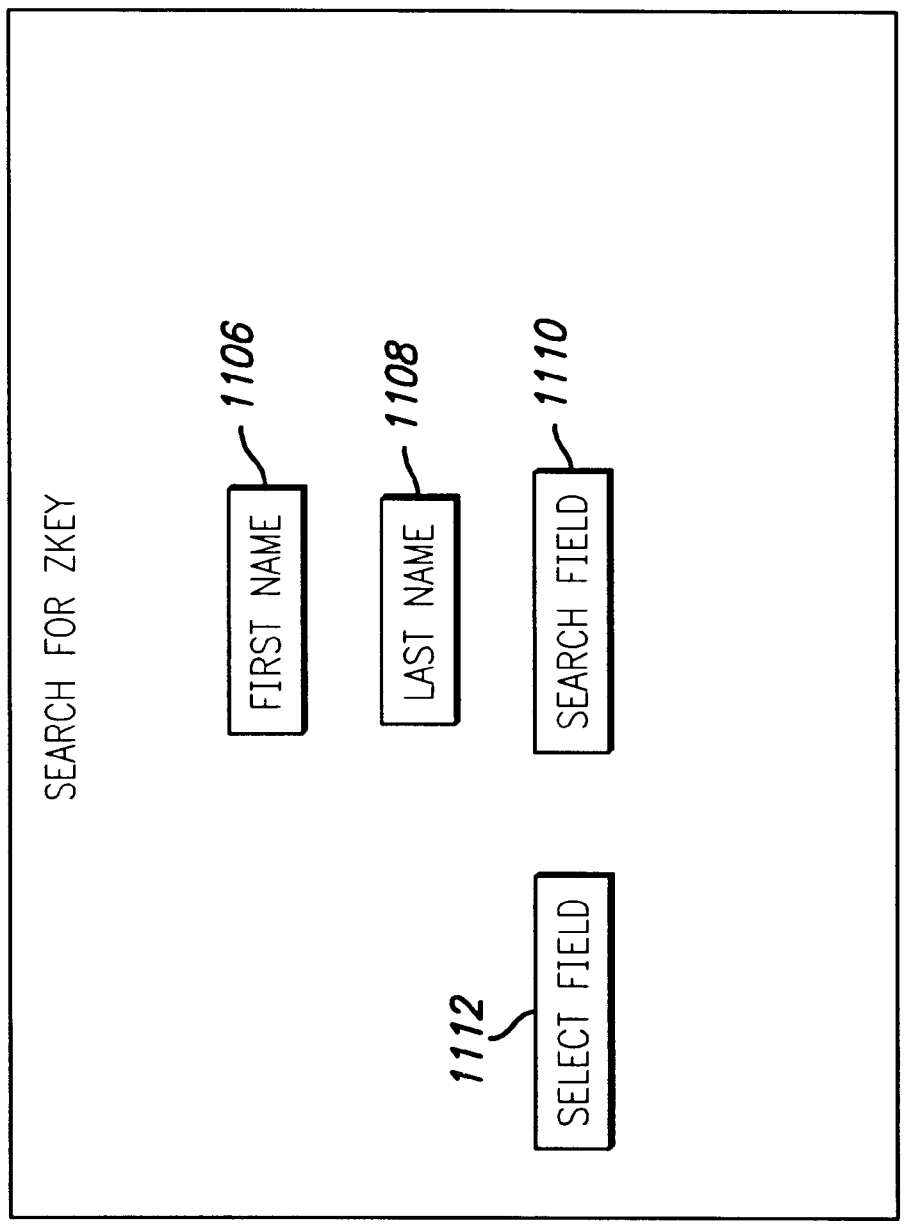
FIG. 31 is a block diagram for searching for a number while using the contacts management and address modules.

With reference to FIG. 30, an HTML page 1000 for adding contact information is shown. The member arrives at this page after selecting "Add Contact" 1406 (FIG. 29). If the contact is a member of the system of the present invention with an ID number, the member may enter the contacts ID number in field 1102. If the member does not have the contact's ID, then the member presses button 1104. As seen in FIG. 31, server application 504 in FIG. 16 is capable of searching for the member by entering text into fields 1106 and 1108 in order to search by name, or by a selecting a field for searching in field 1110 as indicated by a field selection list 1112.

Alternatively, if the contact is not a member of the system, the member may select an HTML tag 1112 in FIG. 30 for adding a non-member contact. The system creates an e-mail message to be sent to the non-member contact which introduces the non-member contact to the system. The member is given the option of editing the message before the message is sent, and is also given the option for entering notes regarding the new contact. After the information is input, the system may be updated, and return the member to the list view HTML page. Additionally, an HTML page is displayed which appears after the user of the system chooses an existing member from the HTML of the list view. The user is given the option to add notes regarding the existing member.

Figure 32:
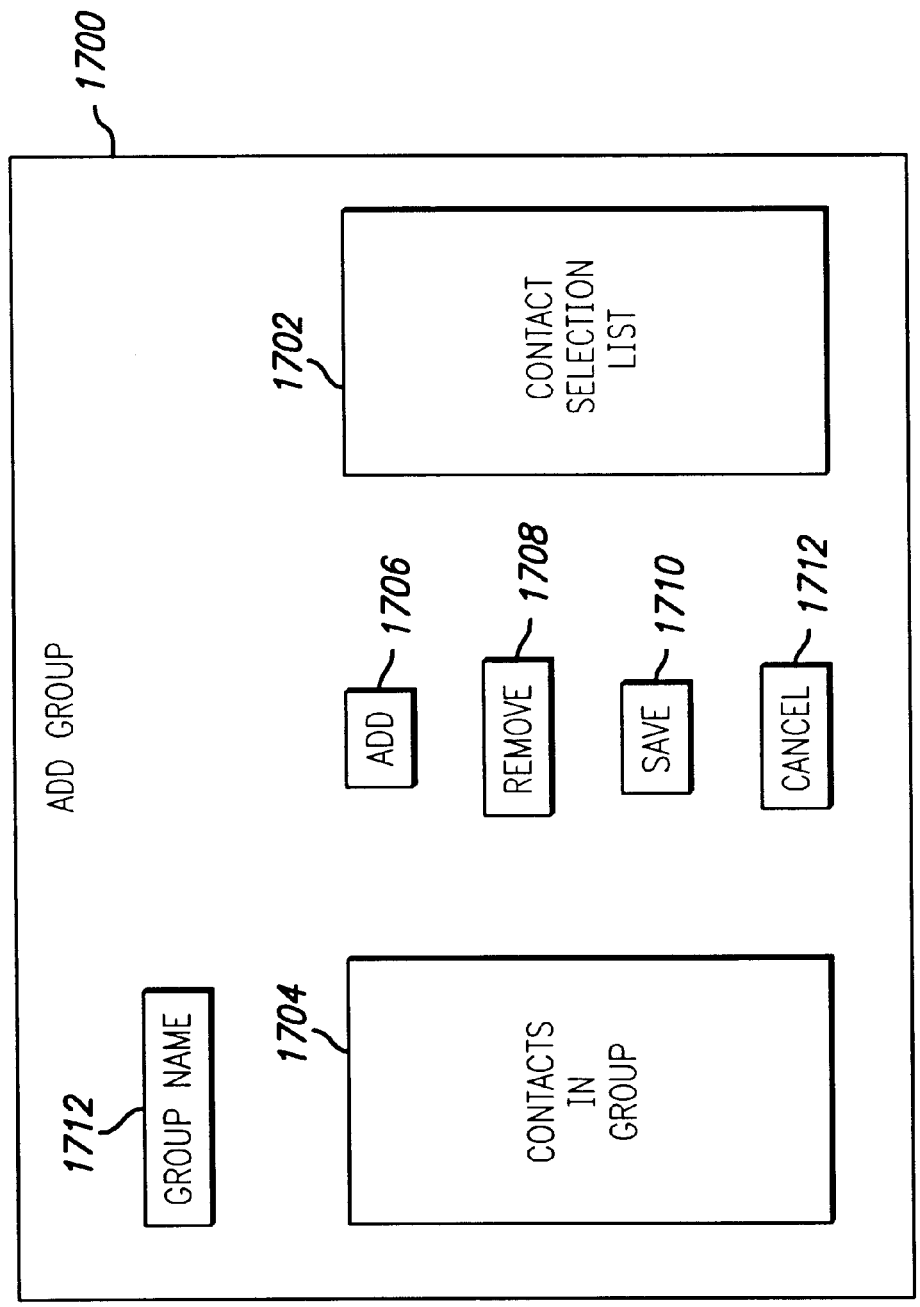
FIG. 32 is a block diagram of the group editor of the group management section of the address book module.

With reference to FIG. 32, if actuation of either of the create 1408*a* or edit/view groups 1408*b* is chosen from FIG. 29, then a group-manager-edit-HTML-page is displayed on the screen of the browser 1700. A selection list 1702 appears listing contacts which the member has added to the contact list. A selection list of contacts already in the group is shown as indicated at 1704. In order to add a contact to the group 1712, the member selects the contact from selection list 1702, and then actuates an Add icon 1706. Similarly, to remove a contact from the group, the member selects a contact from selection list 1704, and then actuates a Remove icon 1708. After adding and removing contacts from the group, the member may actuate a Save icon 1710 to direct server application 104 to store the group as edited to RDBMS 506 or a cancel icon 1712 to not store the information.

Figure 33:
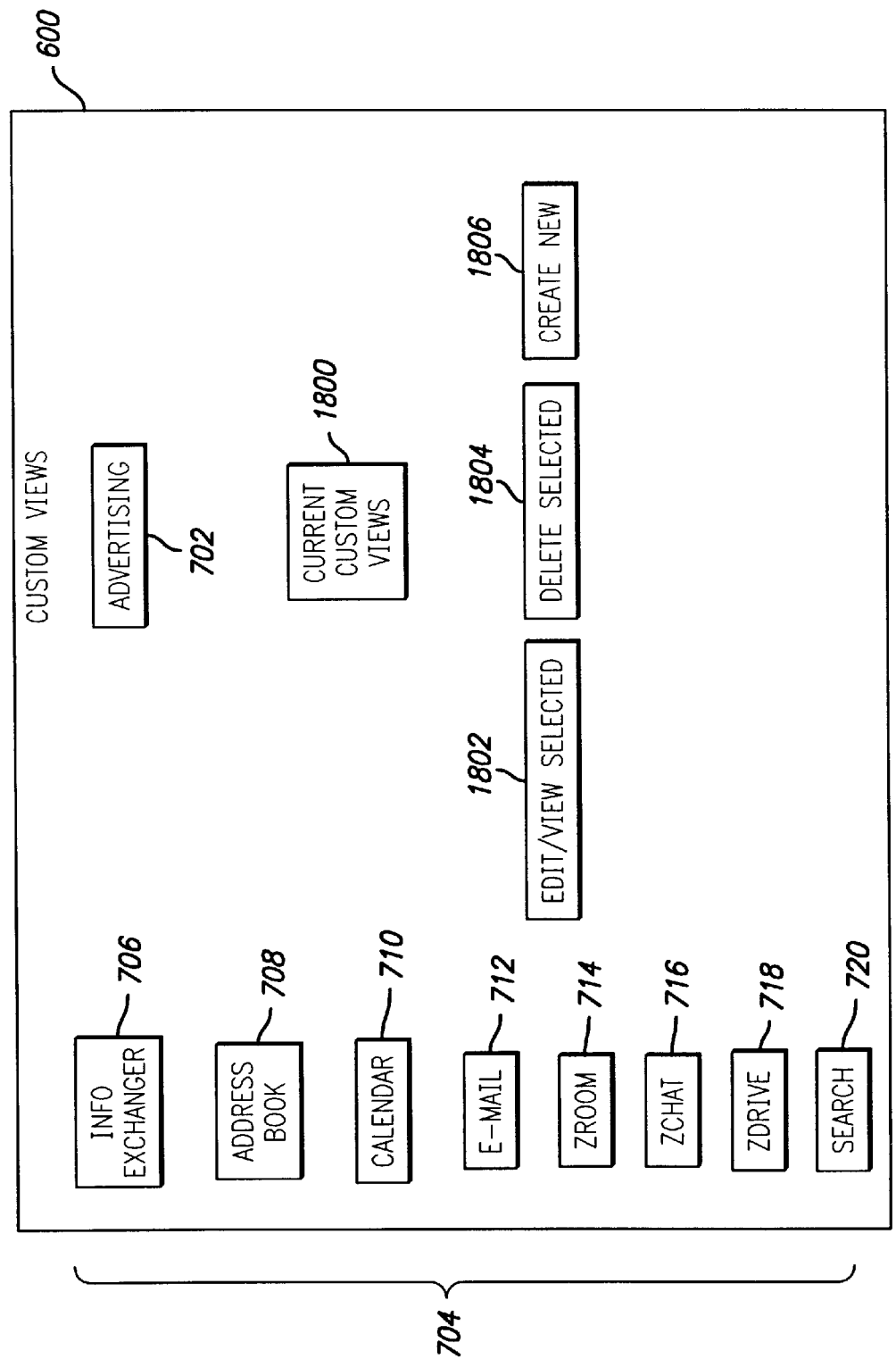
FIG. 33 is a block diagram of the information views section of the information management module.

With reference to FIG. 33, after selection of item 808 in FIG. 26, the currently available custom views are displayed in a scrolling list using methods known in the art. The user may select one of the current views 1800 and then edit 1802, view 1802, or delete 1804 the selected view. Users may also create new information views from this page 1806. The user can select fields that will be available in this particular profile information view. These fields include, among others, all fields or information within primary information, phone numbers, addresses, home information, work information, gift preferences, personal information, schools attended, hobbies, favorite web sites and other fields such as those described in conjunction with FIG. 25. Custom views are groups of profile information that the user creates. For example, after selection of item 1806, the user could create a customs view called "Business Card" consisting of the user's work address and pager numbers. This custom information view can then be shared with other members and non-members of the system, on a field-by-field, person-by-person basis. Through this aspect of the invention, the user can create as many custom information views as desired and grant access to one or more members and non-members.

Calendar System

Figure 34:
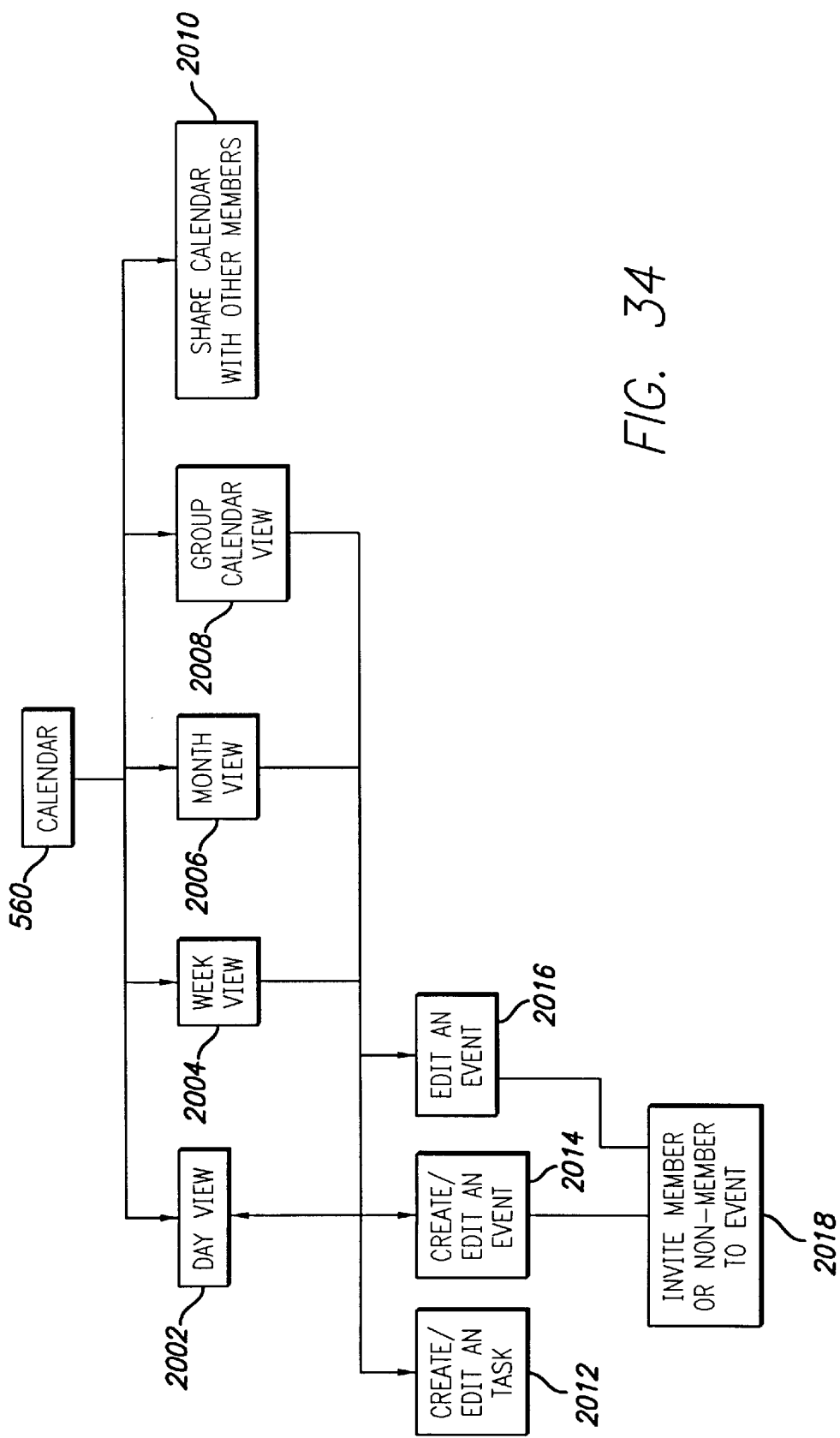
FIG. 34 is a block diagram showing a calendar system structure.

With reference to FIG. 34, a block diagram describing a calendar system structure is shown. The calendar comprises several information view options including a day view, a week view, a month view, a group calendar view, and views of the calendars of other system members. The universal identification code can be used to access any of the calendar information views that a user decides to make public. Selective access can also be granted through an instant access code. In the case of other members, the other members may be selected using their universal identification codes or ZKEYS. Instant access codes are transmitted to named non-members by e-mail or other known communication methods. The system of the present invention may incorporate features from other calendar systems such as Microsoft Outlook™ and CorelCENTRAL™.

The calendar system 560 is comprised of a day view 2002 where users can see the schedule information for a given day; a week view 2004 where users can see schedule information for a given week; a month view 2006 where users can see schedule information for an entire month; and a group calendar view 2008 where combined schedule information for all of the members of a group are displayed. The user can also choose to share calendar information with other users 2010 on a field-by-field, person-by-person basis. Within the calendar day/week/month/group calendar view, users can create or edit a task 2012, create or edit an event 2014, or simply edit an existing event 2016. When creating or editing an event 2014 or editing an event 2016, the user may also invite members or non-members to the event 2018.

E-mail System

Figure 35:
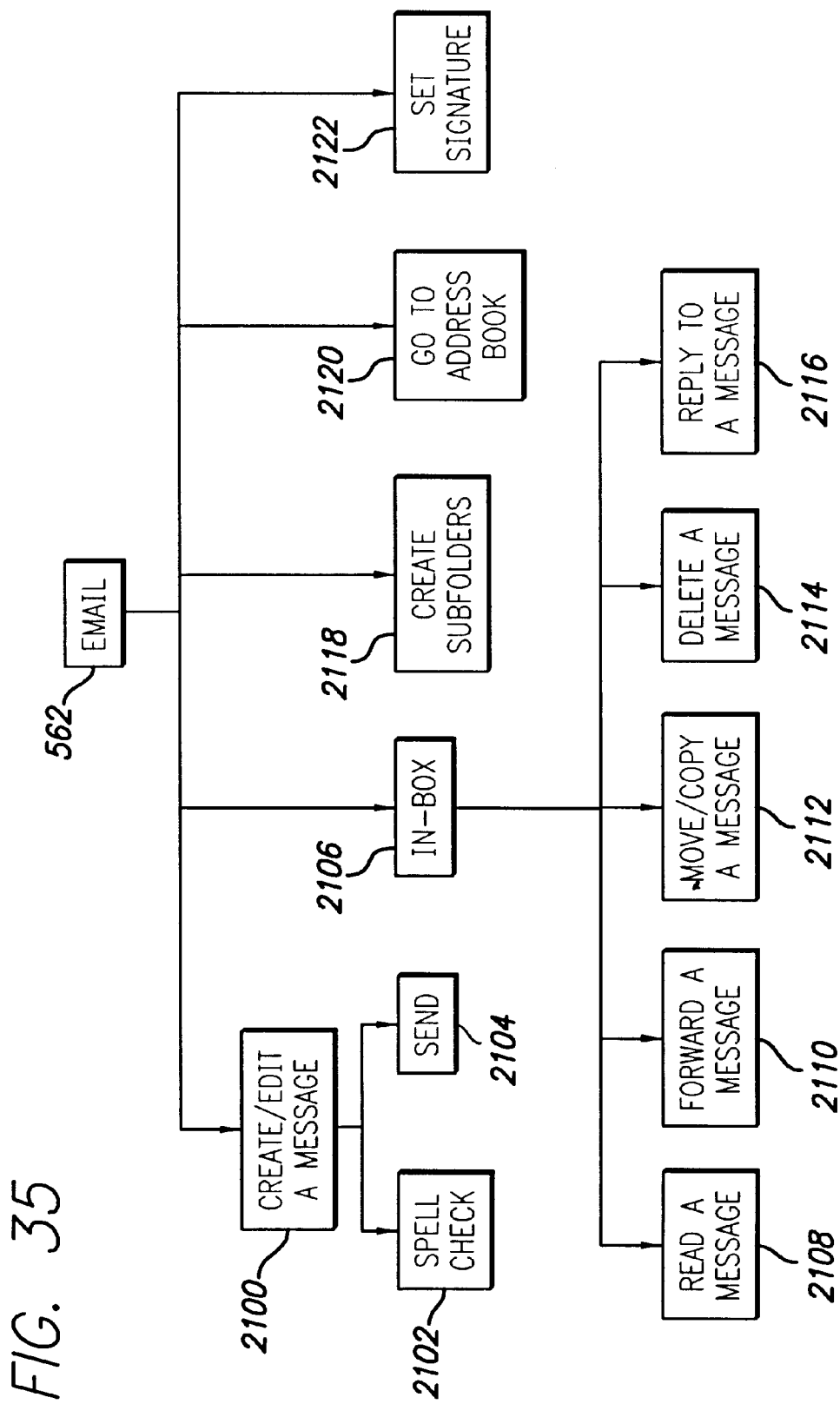
FIG. 35 is a block diagram showing an e-mail system structure.

With reference to FIG. 35, a block diagram is shown describing the electronic mail system 562 of FIG. 21. The e-mail system is comprised of facilities for creating and editing 2100, spell checking 2102 and sending email 2104, an in-box for receiving 2106, reading 2108, forwarding 2110, copying or moving 2112, deleting 2114, replying to 2116, and otherwise managing incoming e-mail messages; a directory manager to create, manage, and delete e-mail directories and subfolders 2118; an address book 2120; and a facility to set a default personal signature 2122. Here, the universal identification code can be used to efficiently locate users in the address book. Thus, by selecting a user from the address book based on their universal identification code, the system will ensure that their latest or preferred e-mail address is used. The system of the present invention may incorporate features from systems such as those in AOL NetMail™ or Microsoft Outlook™.

Storage System

Figure 36:
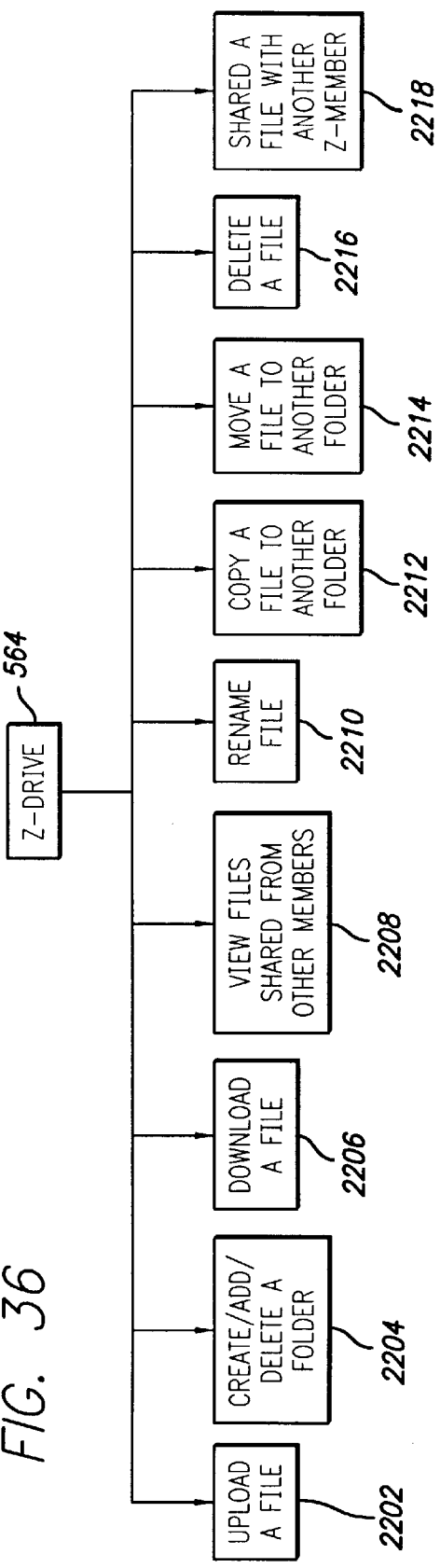
FIG. 36 is a block diagram showing a virtually unlimited storage system, which may be called the ZDRIVE system.

With reference to FIG. 36, a block diagram of a virtually infinite storage system, which may be called a ZDRIVE 564, is described. This system allows a user to upload files to the storage system 2202; create, add, or delete a folder 2204; copy 2212, move 2214, delete 2216, or otherwise manage files or folders; share a file with another member 2218; download files from the system 2206; view files that have been shared by other members 2208; and rename files 2210. The universal identification code may be granted to other members to selectively allow these members to access, read, copy, modify or delete data or files stored on the virtually infinite storage system, 2200. Non-members may be sent an instant access code, which, by itself or in conjunction with the universal identification code, allows access to the stored data.

Chat System

Figure 37:
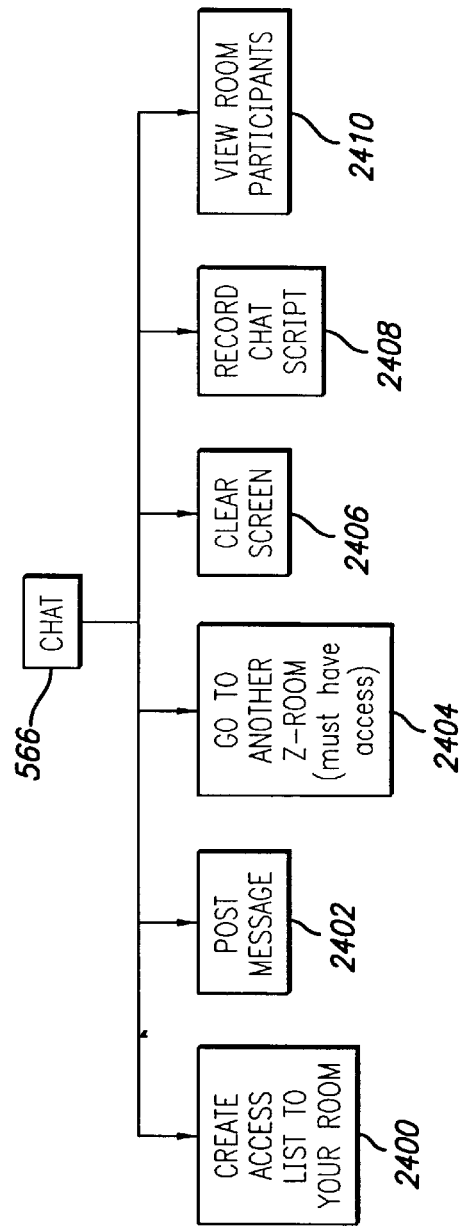
FIG. 37 is a block diagram showing a chat system structure.

With reference to FIG. 37, a block diagram of a chat system 566 is described. The chat system is comprised of modules implementing a method for creating access lists to a plurality of chat sessions 2400; a method for posting messages to a chat group 2402; a method for moving among chat groups or Z-ROOMS 2404; a method to view the chat participants 2410; and housekeeping methods such as methods to clear the screen 2406 or record a session 2408. The universal identification code can be used to identify member chat participants and to add or remove members from restricted access chat groups. Furthermore, non-members may be invited to restricted access chat groups through an instant access code. By using the universal identification code in combination with the instant access code, non-member users can quickly locate relevant chat groups and can become participants.

Searching

Figure 38:
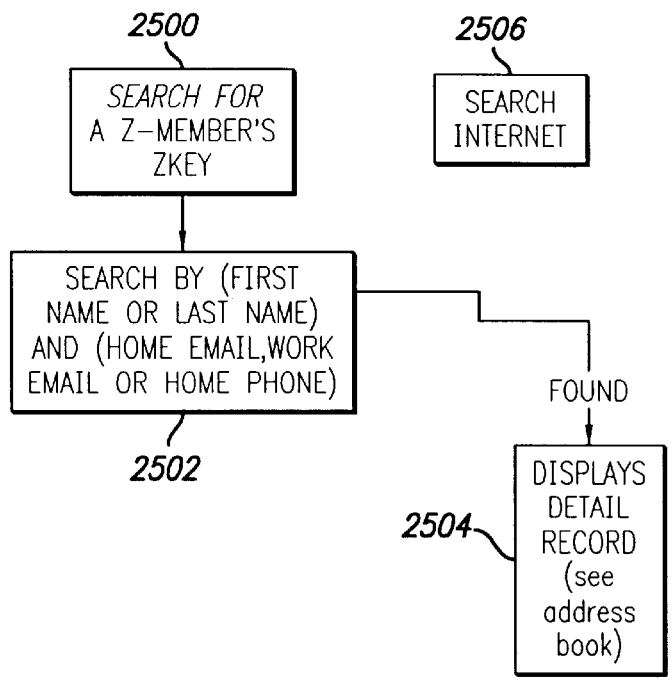
FIG. 38 is a block diagram showing a search system structure.

With reference to FIG. 38, a block diagram is shown describing a search system for locating a member based on their universal identification code or ZKEY. First, a user requests to search for another member using the ZKEY (step 2500). Alternatively, a search can be performed based on profile information (step 2502). If selected, this search can be performed by the system on the other member's first or last name or by other profile information, such as the other member's home e-mail, work e-mail, or home phone, 2506. If the other member is found through either 2500 or 2502, the system display the detailed records of the member 2510. If not found, the system may perform another search, 2502. Additionally, the system provides for a search of the Internet 2506 to assist in locating members and non-members.

Dual Code Field Level Access System

Figure 39:
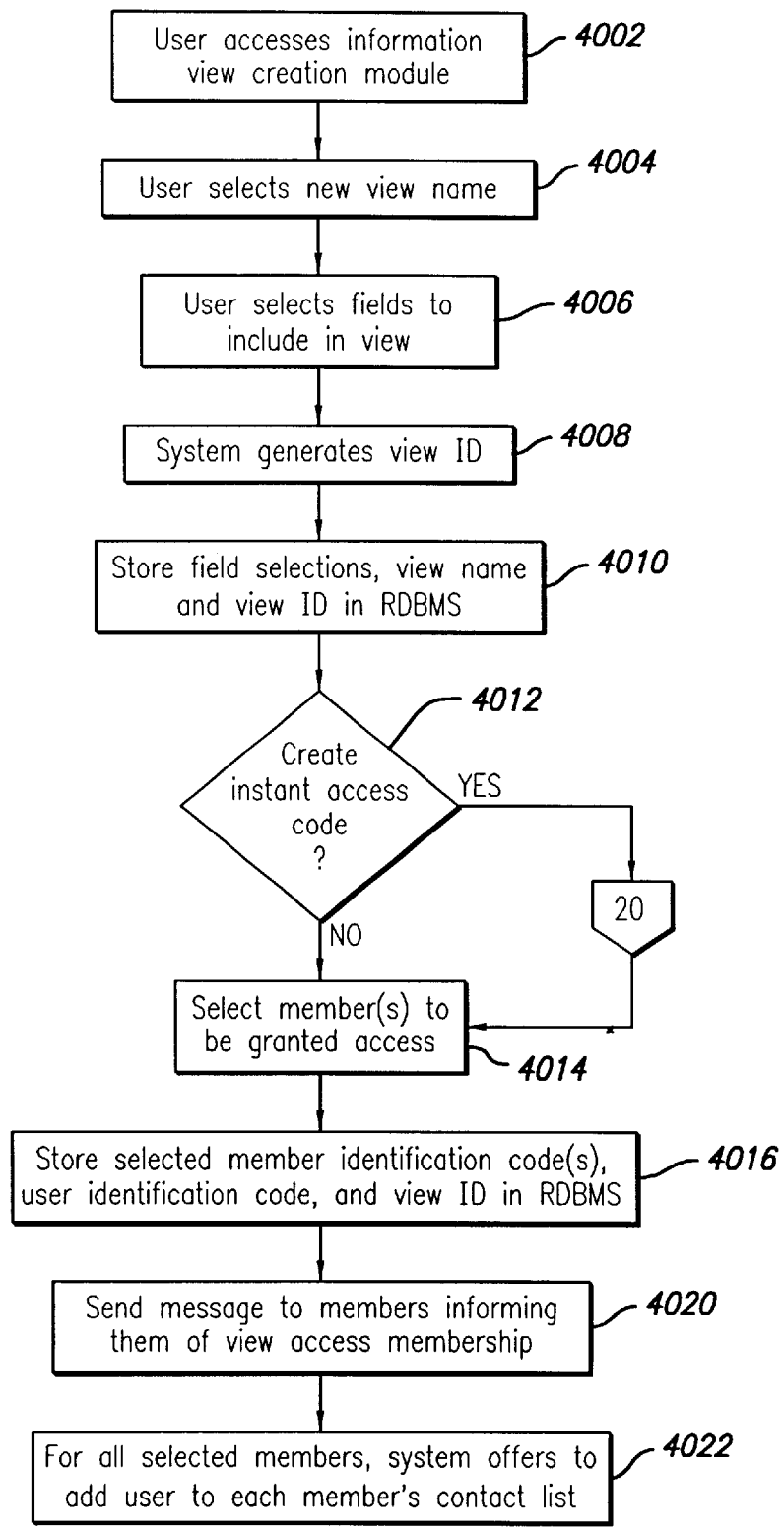
FIG. 39 is a flow diagram showing the steps for a member to grant access to one or more information views to other members.

With reference to FIG. 39, a flow diagram showing a method for creating and designating access to an information view is shown. The user begins by accessing the information view creation module (step 4002). The user then selects a new view name (step 4004), and elects fields to included in the view (step 4006). The system then generates a view ID (step 4008), and stores the view ID in the RDBMS 506 (step 4010). In a preferred embodiment, the user is given the option to provide an instant access code or PIN which will allow both members and non-members instant access to the view being created, step 4012. If an instant access code is not created, the user is only given the option to select members of the system for granting access rights to the view, step 4014. After selection of the members, the members' identification codes, the associated user's member identification code, and a unique view ID are stored in the SDN_VIEW_SECURITY table RDBMS 506 in relational key fashion for providing an easy lookup facility for granting access to the newly created view. A message is then sent to those members who were added to the viewer list, letting them know that they now have access to the new view (step 4020). This is an option given to the user granted access. Additionally, for all selected members, the system offers to add the user to each member's contact list (step 4022).

Figure 40:
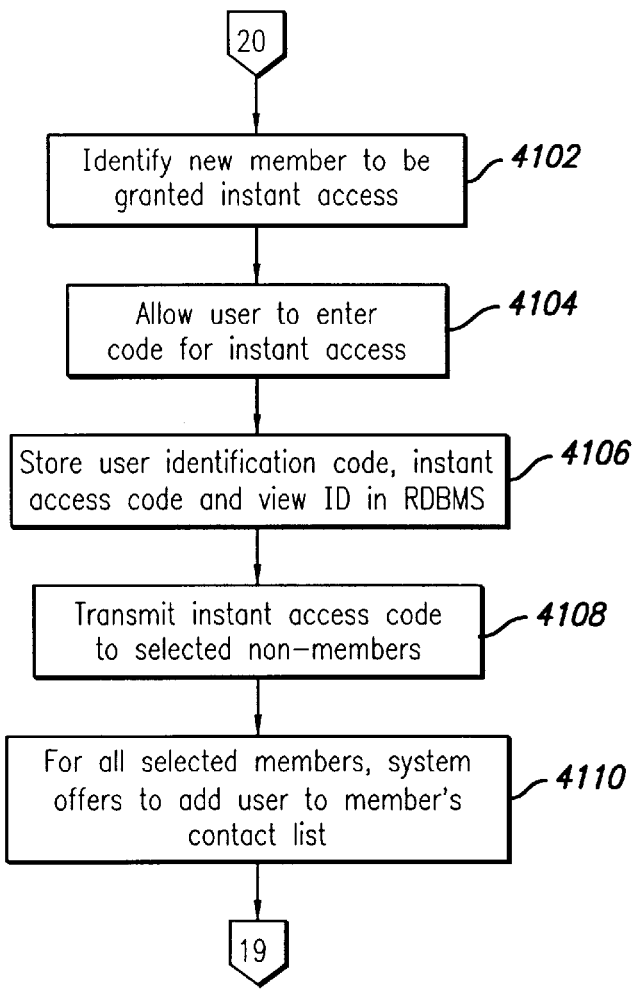
FIG. 40 is a flow diagram showing the steps for a member to grant access to one or more information views.
Figure 43:
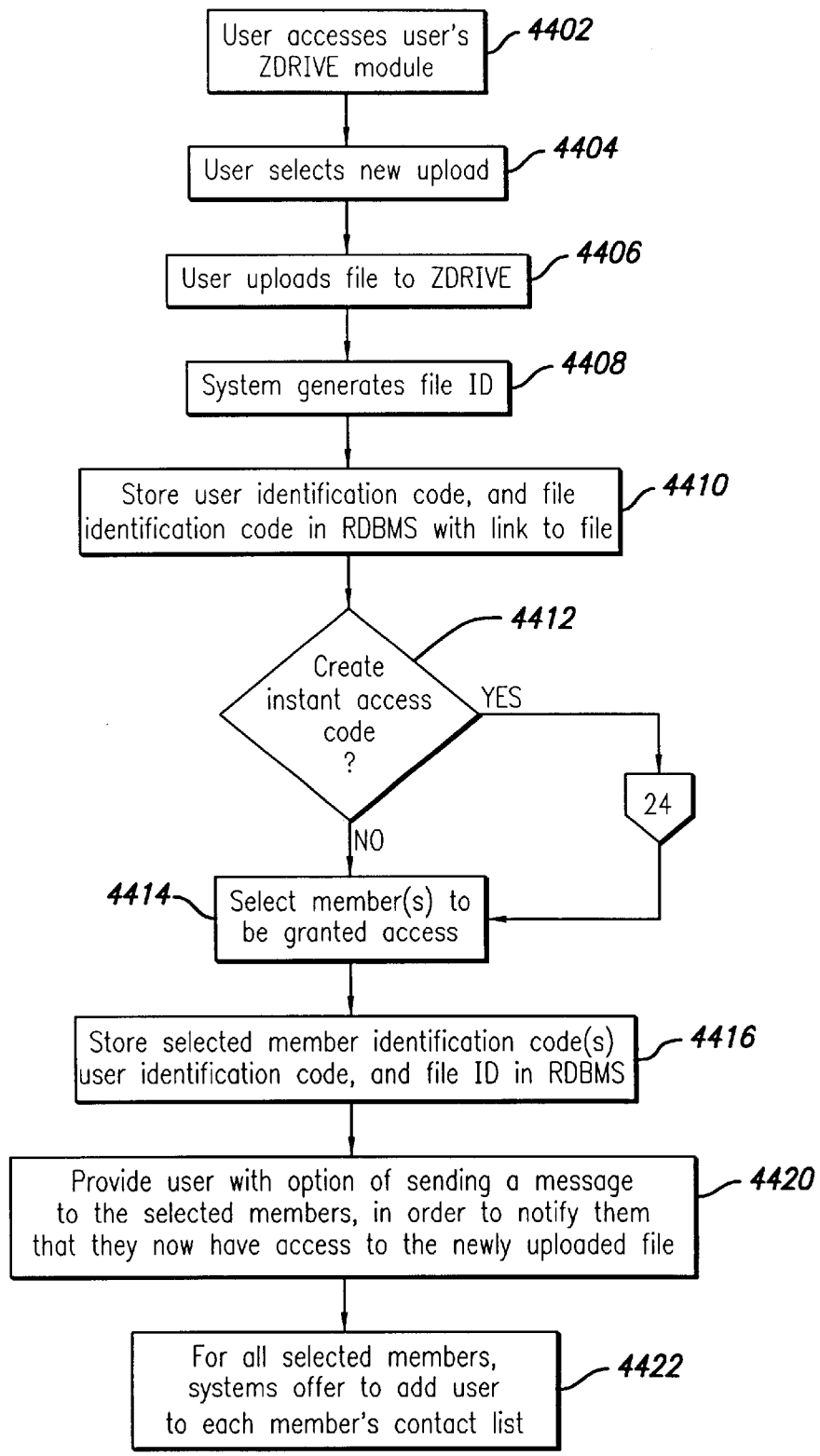
FIG. 43 is a flow diagram showing the steps for a member to grant access to files uploaded to selectively access an infinite storage system.

If an instant access code is created by the user in step 4012, the system performs the processing according to the flow diagram shown in FIG. 43. With reference to FIG. 40, a flow diagram is shown illustrating a preferred embodiment of a method for providing an instant access code. The instant access code or PIN provides an alternative method for granting non-members of the system access to a view. As described above, the user may type in an instant access code during the view creation process, which is a code which is sent to the designated non-members to be typed in when prompted during access of the view.

The user is allowed to identify non-members to be granted instant access by selecting them from the user's contact list (step 4102). The user may then enter the instant access code (step 4104). The system stores the user identification code, instant access code and view ID in RDBMS 506. The data may also be stored in the SDN_VIEW_SECURITY table, or alternatively, be stored in a separate table for storing instant access codes. Next, the system transmits the access code to the selected non-members (step 4108). The system offers to have the user appear on the individual member's contact list if the user does not already appear (step 4110). After concluding this routine disclosed in FIG. 40, the system returns to step 4014 in FIG. 39.

Figure 41:
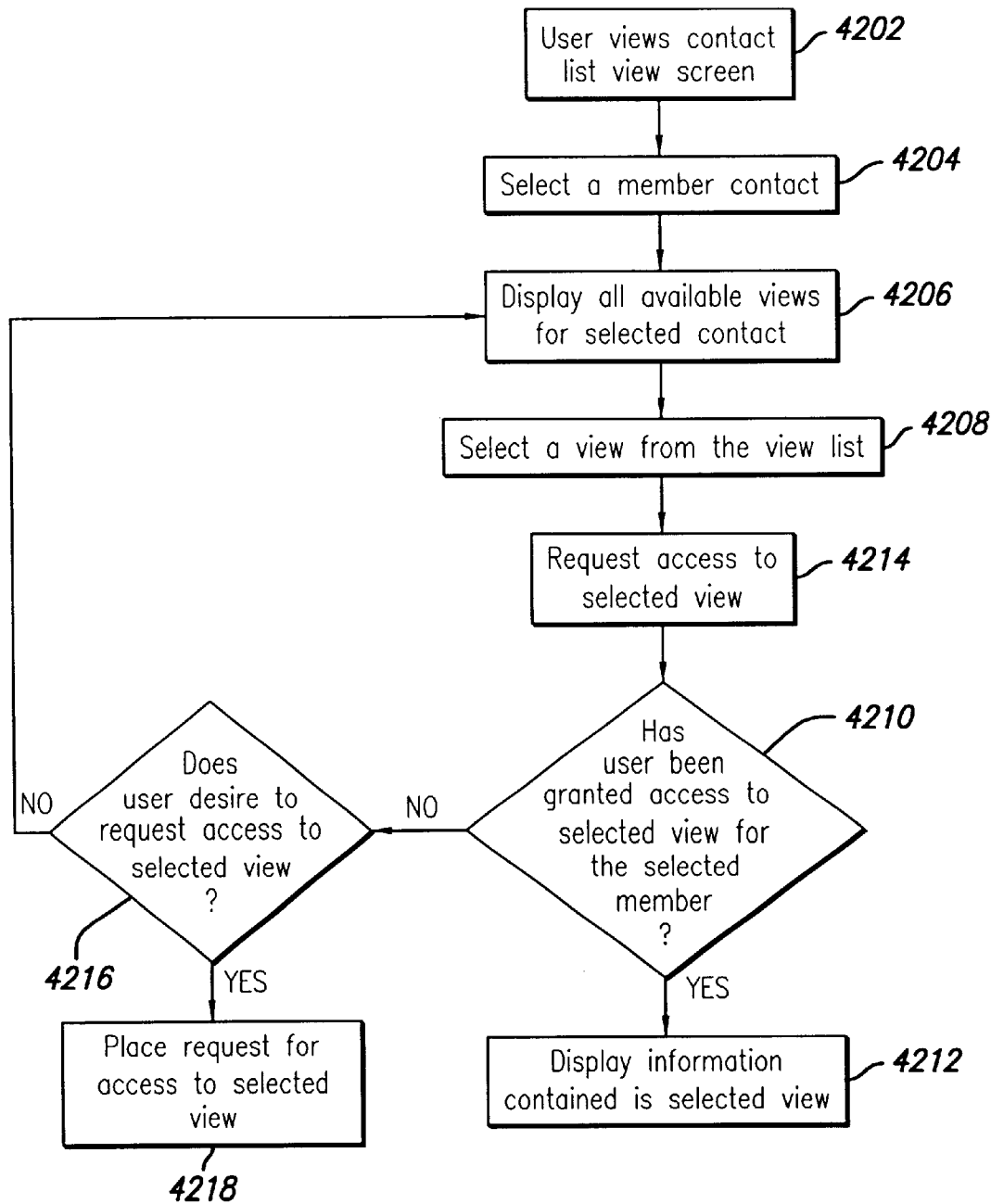
FIG. 41 is a flow diagram showing the steps for a member to view personal information from other members to which they have previously been granted access.

With reference to FIG. 41, a flow diagram showing a method for displaying a member's view created by the method described in FIGS. 39–40 is shown. The user may initially view his/her contact list (step 4202). The user may select a member from the contact list who has created at least one view (step 4204). A list of views for the selected member is displayed (step 4206). The user may select a view from the list of the selected member's views (step 4208). The user then requests access to the view (step 4214). The system checks to see if the user has been granted access to the selected view (step 4210). If so, the information from the fields in the selected view is displayed on screen (step 4212). If the user has not been granted access, then the system performs step 4216 to determine whether the user desires to request access to the view. If so, access is requested (step 4218). If the user does not desire access, then the system will return to displaying the list of the selected member's views (step 4206).

Figure 42:
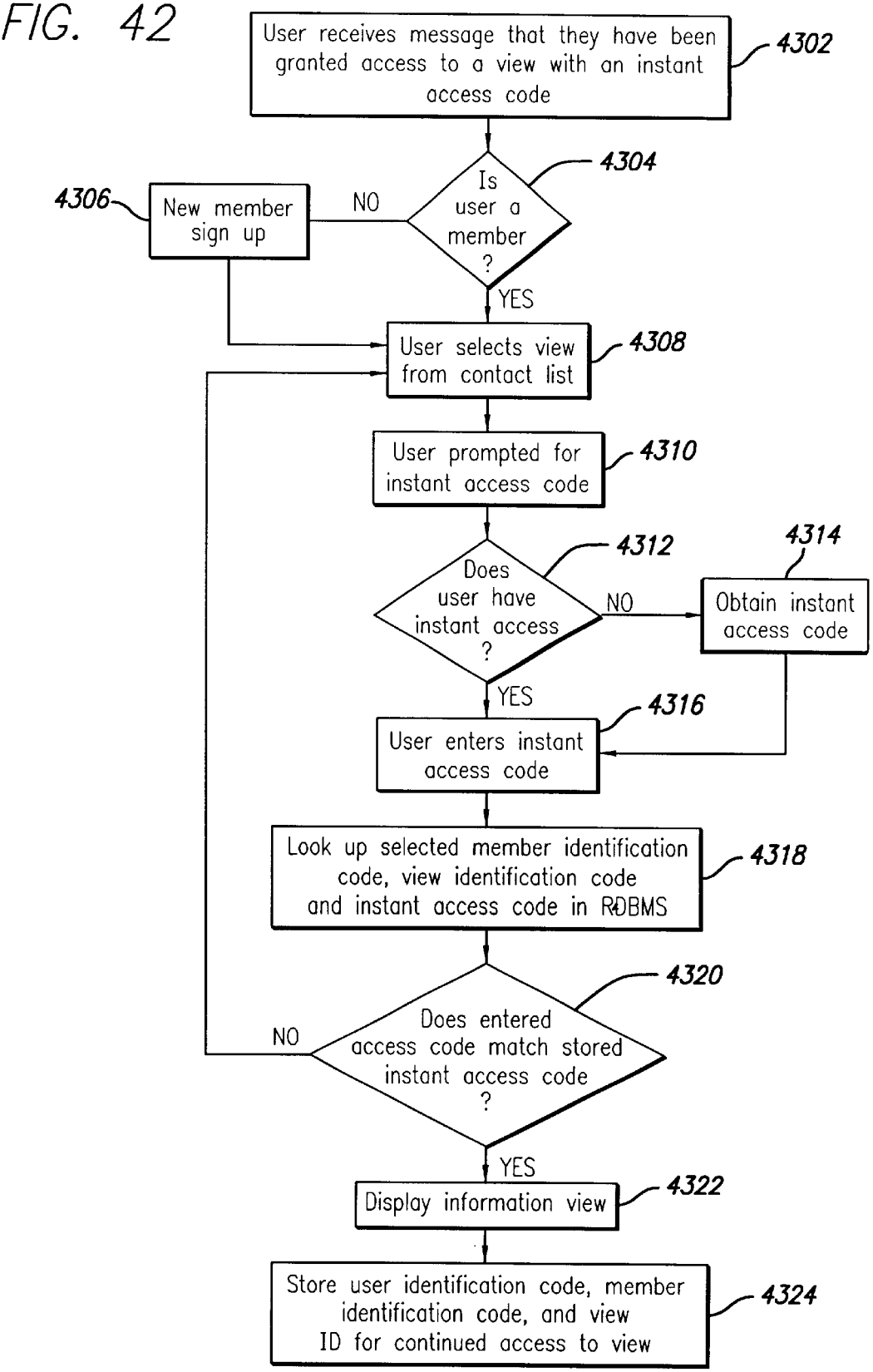
FIG. 42 is a flow diagram showing the steps for accessing an information view previously created by a member.

With reference to FIG. 42, a flow diagram is shown illustrating a method for selecting and displaying a view using an instant access code, which is a view provided by a member as described with respect to FIG. 39–40. The process begins when the user, who may either be a member or a non-member of the system, receives a message stating that access to a member's view has been granted, along with the instant access code for accessing the view (step 4302). A decision branch (step 4304) determines whether the user is a member or a non-member. If the user is a non-member, then the user may be required to go through the new member sign-up process as described above with respect to FIGS. 22–23 (step 4306). Alternatively, non-member view selection lists may be provided by the system. As described with respect to FIG. 41, the user then chooses a view for display from the contact list (step 4308). The user is prompted for the instant access code to the view (step 4310). If the user does not have the instant access code, the user must obtain an instant access code (step 4314). The user is then allowed to enter the instant access code (step 4316). The system processes and compares the entered code to the designated instant access code for the view in RDBMS 506 (step 4318). The system checks for a match (step 4320). If the entered number does not match, processing returns to step 4308. Otherwise, the field information in the selected view is displayed (step 4322). For member users, after access is granted to a view by instant access code, the system records the user's user identification code, along with the member identification code and view ID for the view, so that the next time the user accesses the view the user would not be prompted again for the instant access code (step 4324).

With reference to FIG. 43, a flow diagram is illustrated showing a method for creating and designating access to files on the ZDRIVE as described with respect to FIG. 36. The user begins by accessing the information of the ZDRIVE module (step 4402). The user then selects a new file from the user's client computer to upload (step 4404). The user then uploads the file, using the file transfer protocol (FTP) or other standard network information transfer protocol (step 4406). The system then generates a file ID (step 4408), and stores the file ID in the RDBMS 506 (step 4410). The user is given the option to input an instant access code or PIN which will allow both members and non-members instant access to the uploaded file (step 4412). If an instant access code is not created, the user is only given the option to select members of the system for granting access rights to the file (step 4414). After selection of the members, the members' identification codes, the associated user's member identification code, and a unique file ID are stored in the SDN_VIEW_SECURITY table in RDBMS 506 in relational key fashion for providing an easy lookup facility for granting access to the newly uploaded file. The system offers the user to send a message to those members who were added to the access list, notifying them that they now have access to the newly uploaded file (step 4420). Additionally, the system offers to add the user to each of the selected member's contact lists for selection of views (step 4422). If an instant access code is created by the user in step 4412, the system performs the method shown in FIG. 44.

Figure 44:
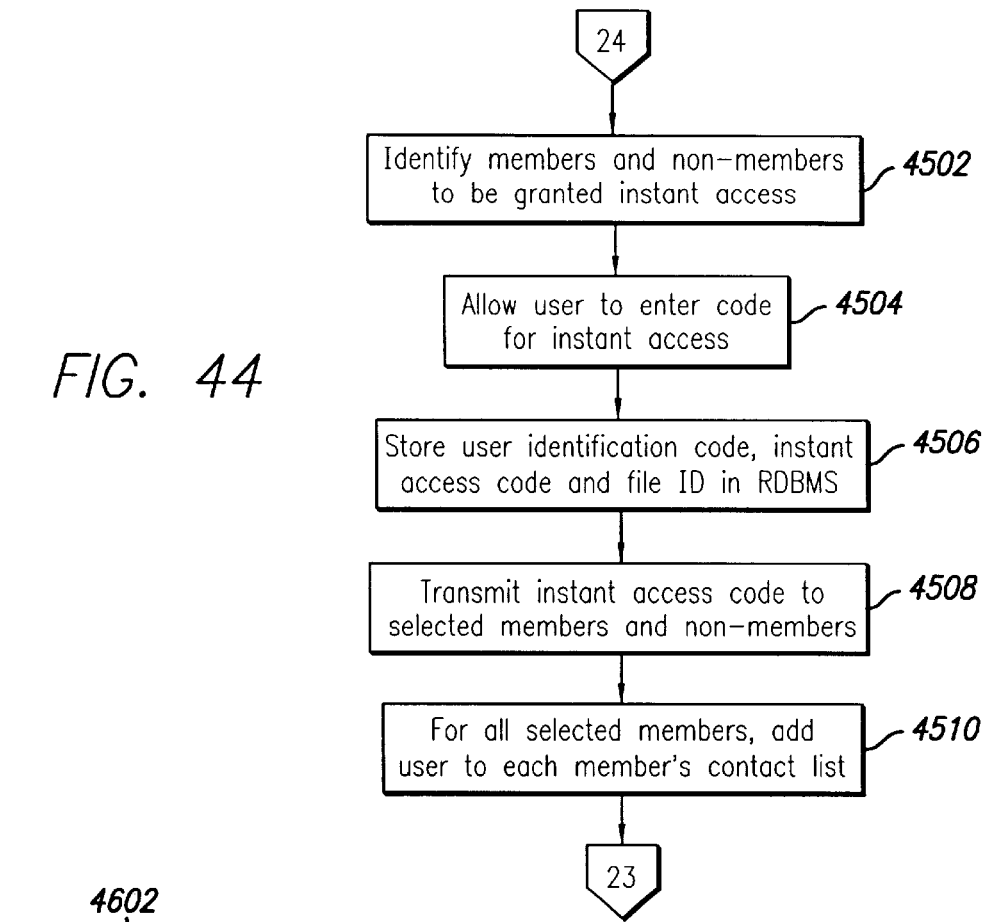
FIG. 44 is a flow diagram showing the steps for a member to grant access to the one or more files by using instant access codes.

With reference to FIG. 44, a flow diagram is shown illustrating a preferred method for providing an instant access code to members. The instant access code or PIN provides an alternative method for granting members access to a file, while allowing non-members of the system to also have access to a file. The user may input an instant access code during the file upload process in similar fashion with respect to views as described above, which is a code that is sent to the designated members and non-members to be input when prompted during access of the file.

The user is allowed to identify members and non-members to be granted instant access by selecting them from the user's contact list (step 4502). Next, as described above, the user may enter the instant access code (step 4504). The system stores the user identification code, instant access code and file ID in RDBMS 506 in step 4506. This data may also be stored in the SDN_VIEW_SECURITY table, or alternatively, be stored in a separate table for storing instant access codes. Next, the system transmits the access code to the selected members and non-members (step 4508). For the members, the user will now appear on the individual member's contact list if the user does not already appear (step

4510). In other embodiments of the invention, note that a member may share files without providing access through an identification code or instant access code. The files may simply be available on the ZDRIVE.

Figure 45:
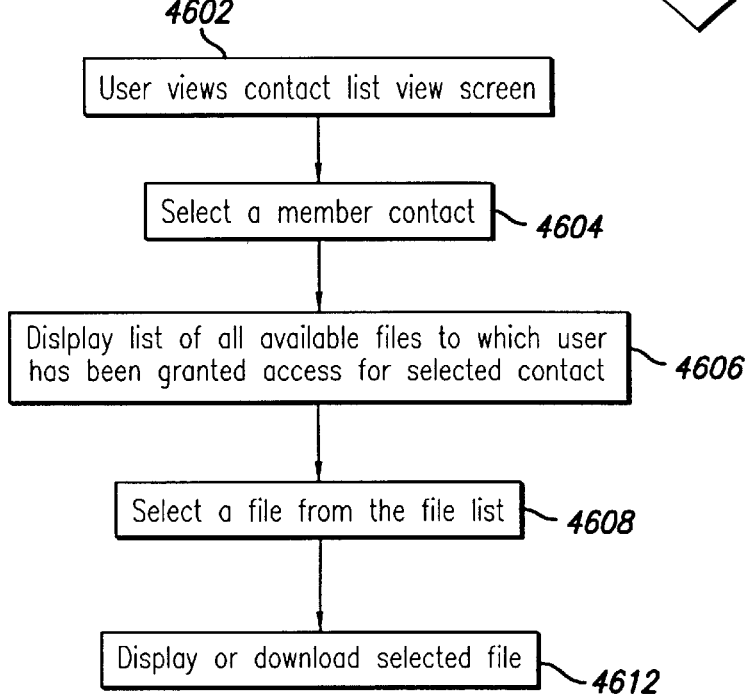
FIG. 45 is a flow diagram showing the steps for a user to access one or more of the files.

With reference to FIG. 45, a flow diagram shows a method for providing access to a file uploaded by the method described in FIG. 43. The user may initially view their contact list (step 4602). The user may then select a member from the contact list who has uploaded at least one file (step 4604). A list of files uploaded by the selected member to which the user has been granted access is displayed (step 4406). The user may select a file from the list of the selected member's views (step 4608), and is provided the option to have the file presented or to download the file to the local client (step 4612).

Figure 46:
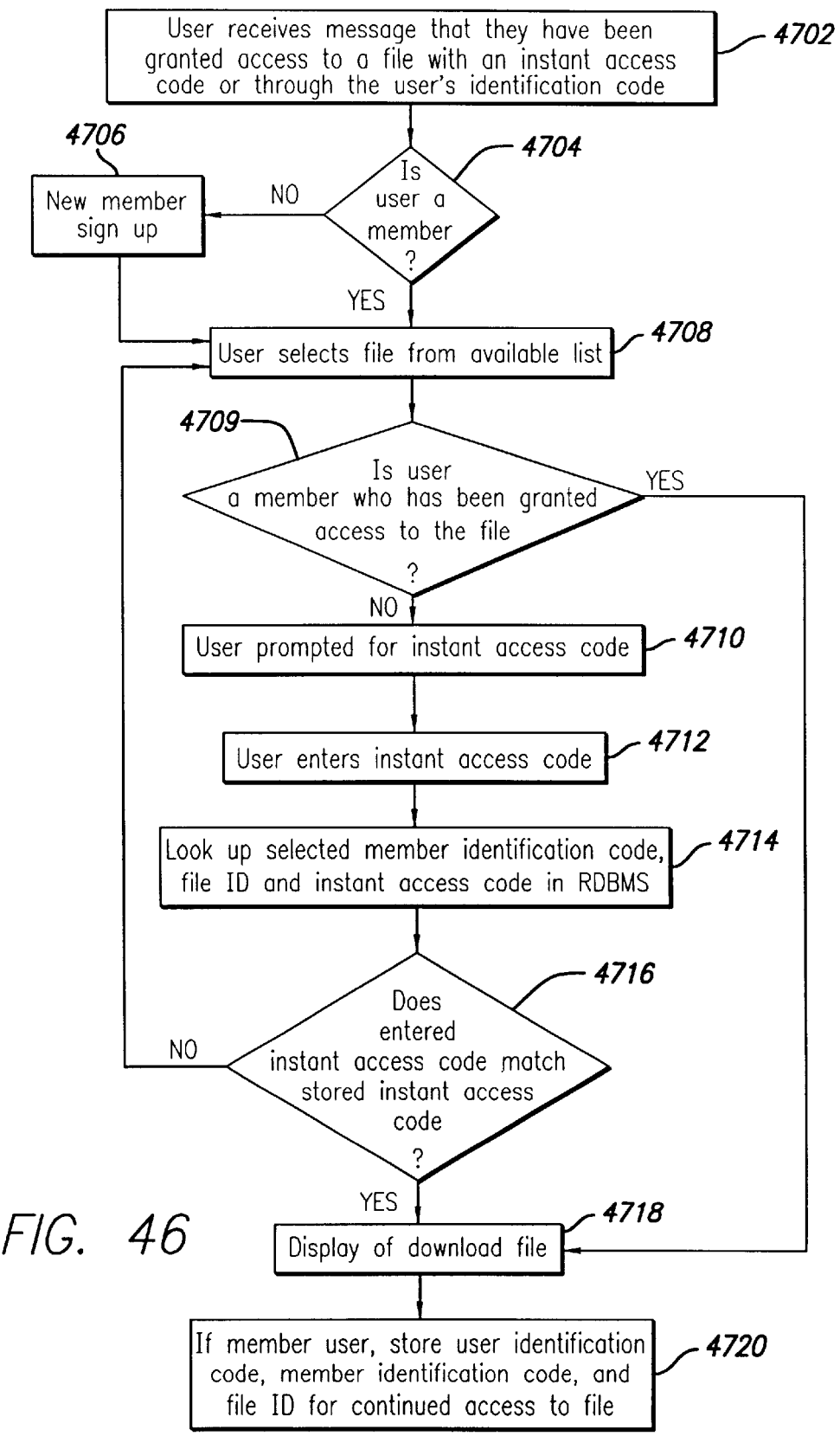
FIG. 46 is a flow diagram showing the steps of accessing the files using one or more instant access codes.

With reference to FIG. 46, a flow diagram is shown illustrating a method for selecting and presenting or downloading a file using an instant access code using a file by a member as described with respect to FIG. 44. The process begins when the user, who may either be a member of the system or a non-member, receives a message stating that access to a member's file has been granted, along with the instant access code for accessing the file or, with respect to members, that access has been granted through a ZKEY (step 4702). A decision branch (step 4704) determines whether the user is a member or a non-member. If the user is a non-member, then the user may be required to go through the new member sign-up process (step 4706). Alternatively, non-member view selection lists may be provided by the system. The user then chooses a file through the available list (step 4708). If the user is a member and has been granted access through the user's universal identification code, then the downloaded file is displayed (step 4709). Otherwise, the user is prompted for the instant access code to the file if access has not already been granted through the universal identification code or ZKEY (step 4710). The user is then allowed to enter the instant access code (step 4712). The system searches for and compares the entered code to the designated instant access code for the file in RDBMS 506 (step 4714). The system checks for a match (step 4716). If the entered code does not match, processing returns to step 4708. Otherwise, the access is granted to the file for display or download (step 4718). For member users, after access is granted to a file by the instant access code, the system records the user's user identification code, along with the file member's identification code and file ID for the file so that the next time the user accesses the file, the user would not be prompted again for the instant access code (step 4720).

Figure 47:
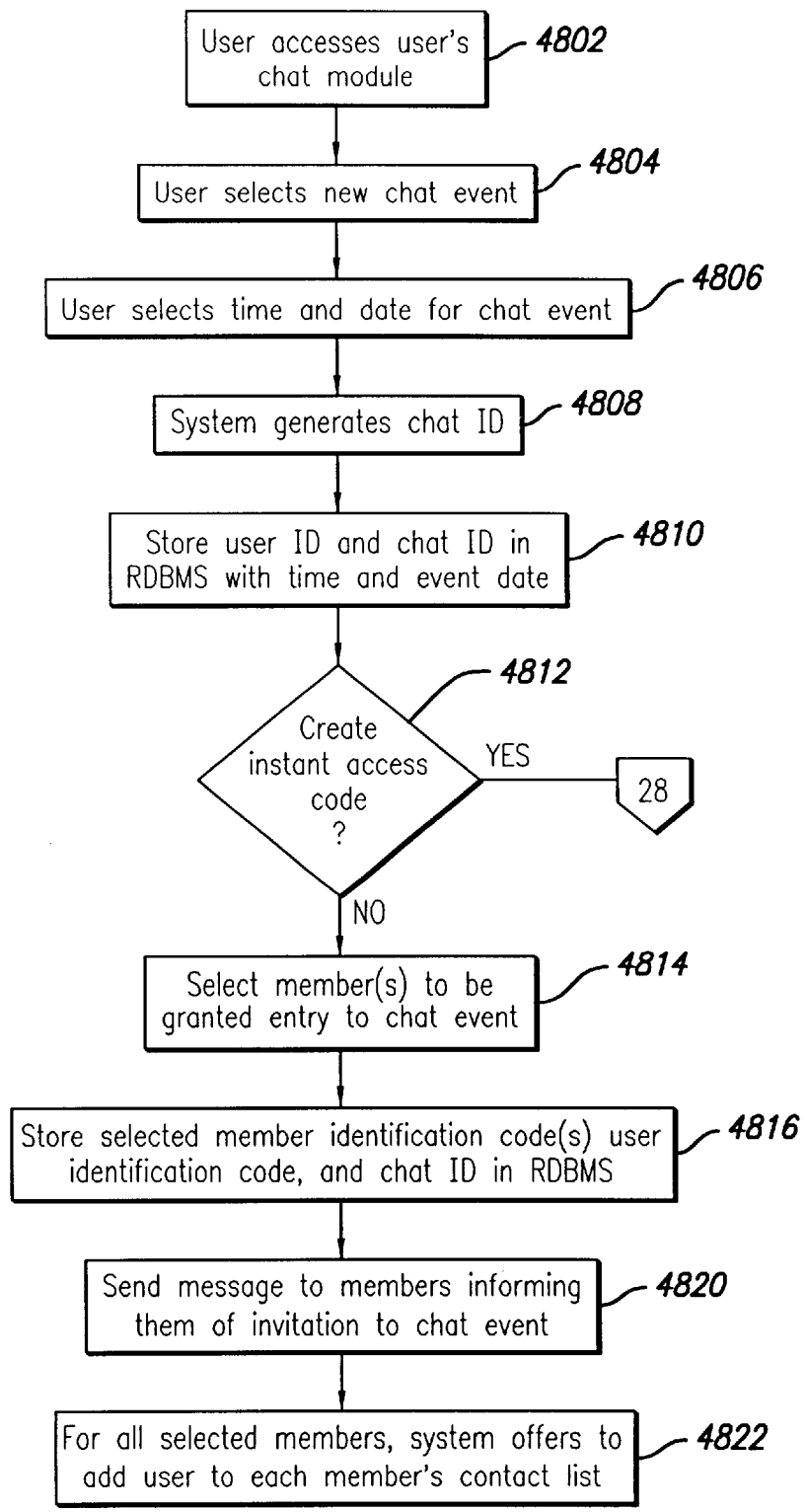
FIG. 47 is a flow diagram showing the steps for a member to grant access to a chat event created by the member.

With reference to FIG. 47, a flow diagram shows a preferred method for creating and designating access to an online chat event. The user begins by accessing the chat module (step 4802). The user then selects a new chat event name (step 4804) and selects a time and date for the chat event (step 4806). The system then generates a chat event ID (step 4808) and stores the chat ID in the RDBMS 506 (step 4810). The user is given the option to provide an instant access code or PIN which will allow both members and non-members instant access to the chat event being defined (step 4812). If an instant access code is not created, the user is only given the option to select members of the system for inviting to the chat event (step 4814). After selection of the members, the members' identification codes, the associated user's member identification code, and a unique chat ID are stored in the SDN_VIEW_SECURITY table RDBMS 506 in relational key fashion for providing an easy lookup facility for granting access to the scheduled chat event (step 4816). A message is then sent to those members who were added to the invite list, notifying them that they were invited to the chat event (step 4820). The system then offers to add the user to each of the selected member's contact list (step 4822).

Figure 48:
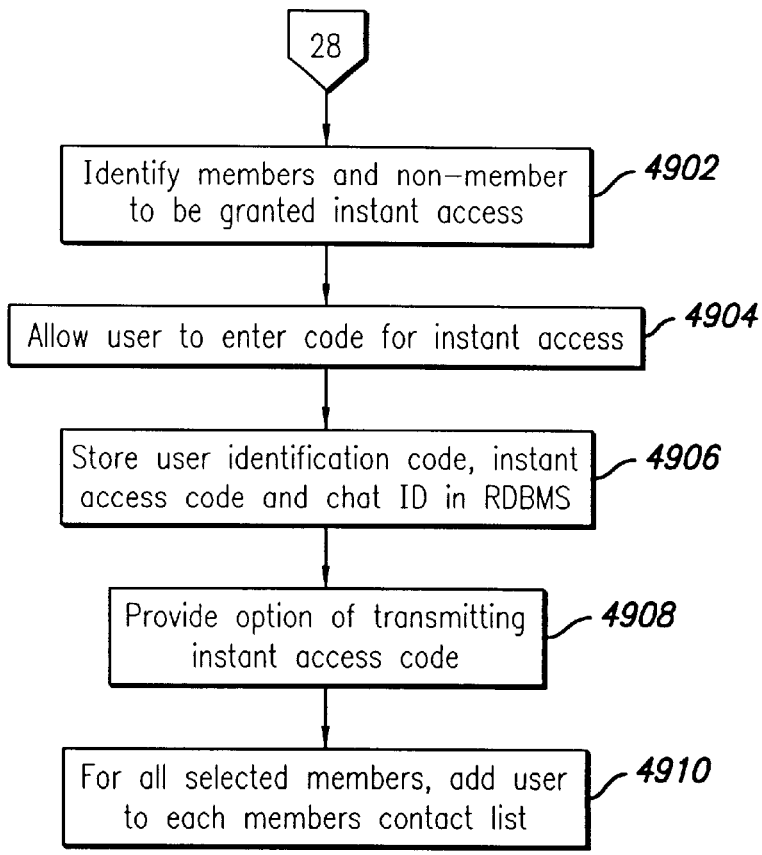
FIG. 48 is a flow diagram showing the steps for a member to grant access to the chat event by using instant access codes.

If an instant access code is created by the user in step 4812, the system performs the method shown in FIG. 48. With reference to FIG. 48, a flow diagram is shown illustrating a preferred method for providing an instant access code to members. The instant access code or PIN provides an alternative method for inviting members to a chat event, while allowing non-members of the system to also be invited to the chat event. The user may input an instant access code during the chat event scheduling process, which is a code which is sent to the designated members and non-members to be typed in when prompted during access of the chat event room.

The user is allowed to identify members and non-members to be granted instant access by selecting them from the user's contact list (step 4902). The user may then input the instant access code (step 4904). The system stores the user identification code, instant access code and chat ID in RDBMS 506. This data may also be stored in the SDN_VIEW_SECURITY table, or alternatively, be stored in a separate table for storing instant access codes. Next, the system transmits the access code to the selected members and non-members (step 4908). For the members, the user will now appear on the individual member's contact list if the user does not already appear (step 4910).

Figure 49:
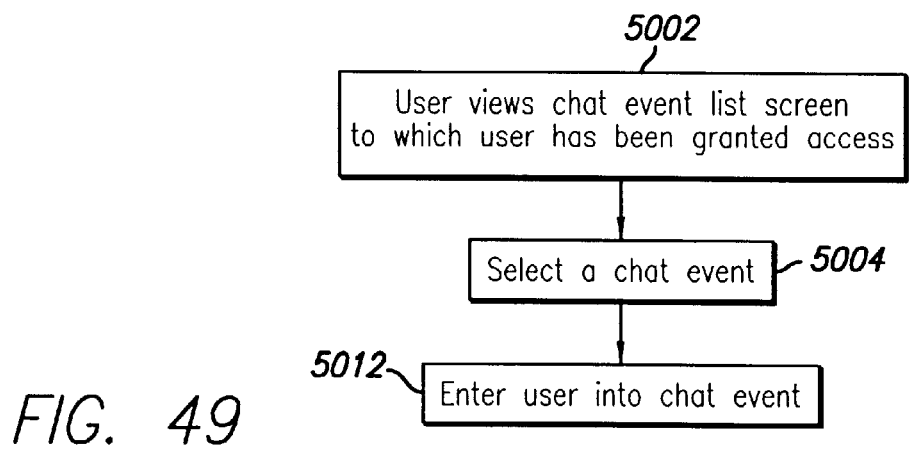
FIG. 49 is a flow diagram showing the steps for a member to enter the chat event.

With reference to FIG. 49, a flow diagram shows a preferred method for accessing a member's chat event created by the method described in FIG. 4748. The user may initially view a current chat event list (step 5002). The user may select a chat event from the chat event list (step 5004). The system checks to see if the user has been granted access to the selected chat event (step 5010). If the user has not been granted access, then processing returns to step 5004 to re-display the list of the chat events. Otherwise, the user is entered into the chat event (step 5012).

Figure 50:
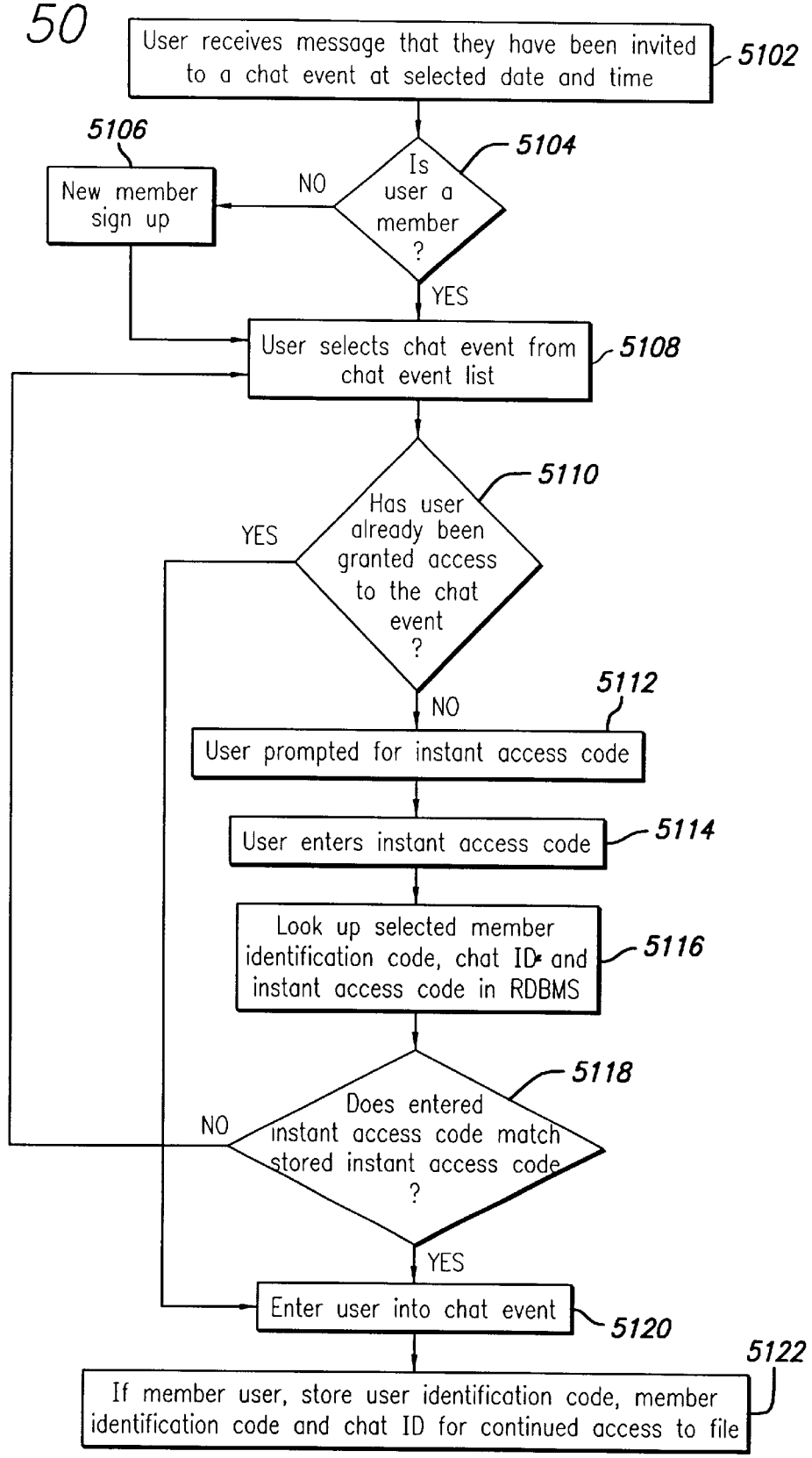
FIG. 50 is a flow diagram showing the steps for entry into the chat event by using an instant access code.

With reference to FIG. 50, a flow diagram is shown illustrating a method for selecting and entering a chat event using an instant access code provided by a member according to the method described with respect to FIGS. 47–48. The process begins when the user, who may either be a member of the system or a non-member, receives a message stating that access to a member's chat event has been granted, along with the instant access code for entering the chat event (step 5102). A decision branch (step 5104) determines whether the user is a member or a non-member. If the user is a non-member, then the user may be required to go through the new member sign-up process as described above with respect to FIGS. 22–23 (step 5106). Alternatively, non-member view selection lists may be provided by the system. The user then chooses a chat event from a current chat event list (step 5108). The user is prompted for the instant access code to the view if they have not been given access through the universal identification code (step 5110). The user is then allowed to enter the instant access code (step 5112). The system processes and compares the entered code to the designated instant access code to the guest list for the chat event in RDBMS 506 (step 5114). The system checks for a match (step 5118). If the entered number or universal ID does not match, processing returns to step 5108. Otherwise, the user is granted entry to the selected chat event (step 5120). For member users, after access is granted to a chat event by instant access code or identification code, the system records the user's user identification code, along with the member identification code and chat ID for the chat event so that the next time the user accesses the chat event, they would not be prompted again for the instant access code (step 5122).

Advertisement Banner System

Figure 51:
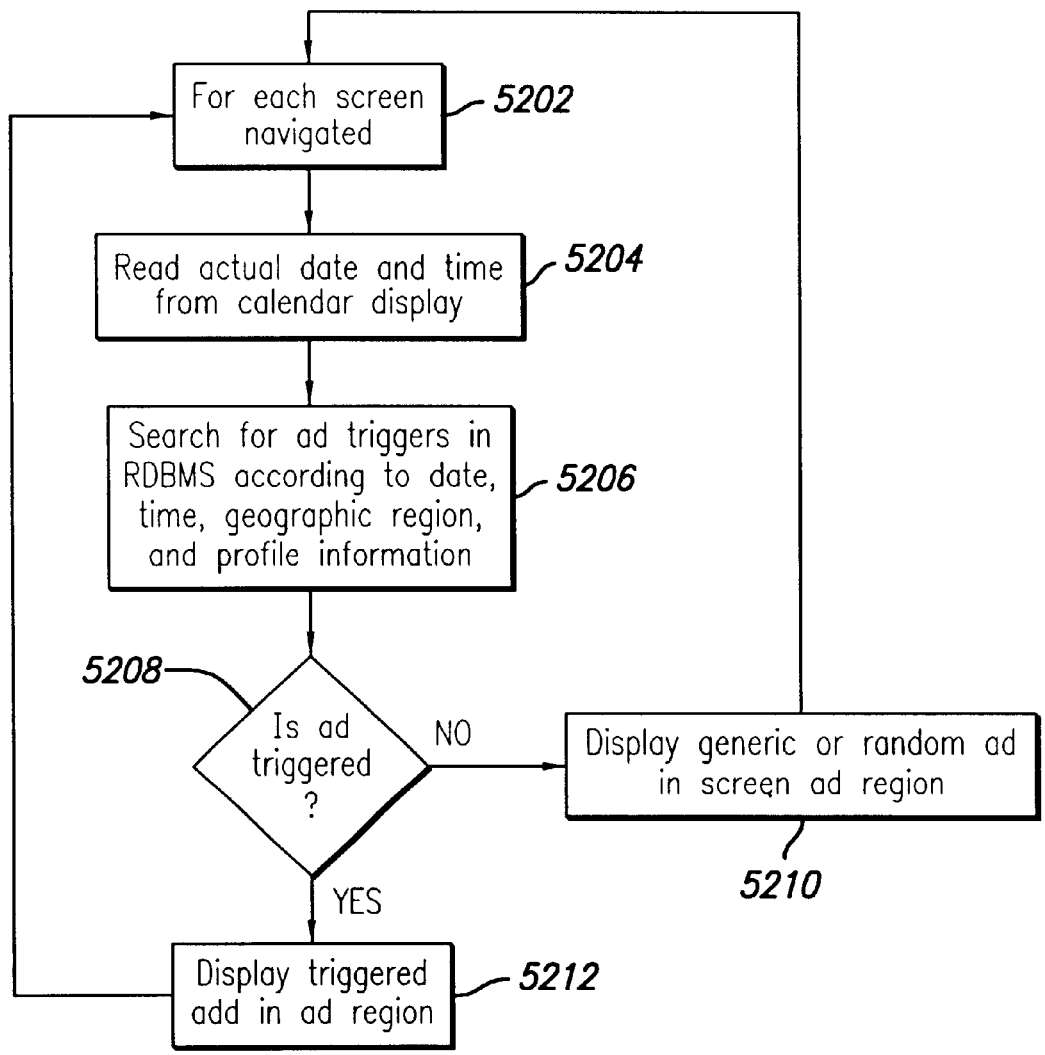
FIG. 51 is a flow diagram showing the steps for displaying context sensitive ads throughout navigation of the system.

With reference to FIG. 51, a flow diagram is shown for selection of advertisement messages for display on screen during navigation of the system of the present invention. Advertisement messages may be selected from RDBMS 506 depending on things such as the date, time, geographic region and key words on the display screen or the profile information of the user. Beginning with step 5202, the system sets a system loop for navigation through each screen. The system reads the date and time, actual and calendar display (step 5204). The system checks for a trigger in RDBMS 506 according to date, time, geographic region, key words, profile information, and any other triggers which may appear in the display of each screen (step 5206). The system checks to see if an advertisement has been triggered (step 5208). If an advertisement is not triggered, a generic advertisement is displayed in ad region 702, for example as shown in FIG. 24 (step 5210). Otherwise, an advertisement indicated by the trigger as being set for display in an advertisement region 702 is displayed (step 5212).

Having thus described a preferred embodiment of the SYSTEM AND METHOD FOR SELECTIVE INFORMATION EXCHANGE, it should be apparent to those skilled in the art that certain advantages of the within system have been achieved. It should also be appreciated that various modifications, adaptations, and alternative embodiments thereof may be made within the scope and spirit of the present invention. For example, it should be apparent that the inventive concepts described above are applicable to any stored data, including data from personal calendars, contact databases, e-mail systems and document management systems. The scope of the invention is defined by the following claims.

What is claimed:

1. In a network including a plurality of network devices operated by a plurality of users, a real-time information exchange, system for sharing user profile information between respective users of the network devices, comprising:

a database management system connected to the network and storing the user profile information for a plurality of registered users of the information exchange system, the user profile information including a plurality of data elements, each data element having an associated one of the plurality of registered users;

wherein each data element has an associated subset of users to whom access to the data element has been granted; and wherein users not included in the associated subset of users are denied access to the data element.

2. The information exchange system of claim 1 further including:

a profile management application executing on the information exchange system, the profile management application providing each respective user with facilities to selectively control the granting and denying of access to each of its associated data elements by other respective users.

3. The information exchange system of claim 2 wherein the user profile information includes a set of pre-defined data fields, and wherein the profile management application is adapted to dynamically create new data fields for storing a new data element, upon the request of a registered user.

4. The information exchange system of claim 3 wherein the database management system includes a plurality of databases distributed across the network.

5. The information exchange system of claim 4 further comprising:

an affiliate system, including:

an affiliate database management system connected to the network through a physical firewall, and adapted to store the user profile information for a plurality of registered users of the information exchange system, the user profile information including a plurality of data elements; and a plurality of affiliate network devices connected to the affiliate database management system through a local network.

6. The information exchange system of claim 5 wherein the data elements stored in the affiliate database management system are categorized as one of private information and public information; and wherein a software firewall prevents data elements categorized as private information from being accessed from network devices connected to the affiliate database management system through the physical firewall.

7. The information exchange system of claim 6 wherein the software firewall does not prevent data elements categorized as private information from being accessed by an affiliate network device.

8. The information exchange system of claim 4 wherein the profile management application provides each respective user with facilities to selectively push individual data elements to respective users.

9. The information exchange system of claim 4 wherein at least one network device includes intelligent synchronization software executing thereon, the intelligent synchronization software operating to detect network connectivity and selectively download updated user profile information.

10. The information exchange system of claim 9 wherein the profile management application further provides each respective registered user with facilities to define views of user profile information, each view including at least one data element associated with the registered user; and wherein the profile management application further provides each respective registered user with facilities to selective grant and deny other respective users access to each respective view.

11. The information exchange system of claim 10 wherein the profile management application further provides each respective registered user with facilities to define user groups, each user group including at least one user; and wherein the profile management application further provides each respective registered user with facilities to selective grant and deny the members of each data group access to each respective view.

12. The information exchange system of claim 11 wherein each stored data element is encrypted with a secret key.

13. The information exchange system of claim 12 wherein each registered user has an associated public key/private key pair, each key being selected for use in a public key cryptography system.

14. The information exchange system of claim 13 wherein, for each user that has been granted access to a respective data element, a copy of the secret key associated with the data element is encrypted using the user's public key, and the encrypted secret key is stored by the database management system.

15. The information exchange system of claim 14 further comprising:
a key management system connected to the database management system, the key management system, in response to requests from the database management system, generates encryption and decryption keys.

16. In a network including a plurality of network devices operated by a plurality of users, a real-time information exchange system for sharing user profile information between respective users of the network devices, comprising:
a first database management system storing a first subset of the user profile data for a plurality of registered users of the information exchange system, the first subset of profile information including a plurality of data elements, each data element having an associated one of the plurality of registered users; and
a first network server connected to the network and the first database management system, the first network server including:
a first processor; and
a first program memory connected to the first processor and having program instructions stored therein, the first processor being operable to execute the program instructions, the program instructions including:
for each registered user, selectively granting and denying access to each of the registered user's associated data elements, to other users in the network.

17. The information exchange system of claim 16 further comprising:
a second database management system storing a second subset of the user profile data for a plurality of registered users of the information exchange system, the second subset of profile information including a plurality of data elements, each data element having an associated one of the plurality of registered users; and
a second network server connected to the network and the second database management system, the second network server including:
a second processor; and
a second program memory connected to the second processor and having program instructions stored therein, the second processor being operable to execute the program instructions, the program instructions including:
for each registered user, selectively granting and denying access to each of the registered user's associated data elements, to other users in the network;
wherein the profile data for at least one registered user is distributed across the first and second database management systems.

18. In a network including a plurality of network devices operated by a plurality of users, a method for storing member profile information that provides for selective real-time information exchange of the member profile information between network devices comprising the steps of:
receiving profile information for a member, the member having a member identification number and an associated public key/private key pair;
generating a secret key for each granular data element of the received profile information;
encrypting each granular data element using its associated secret key;
storing each encrypted granular data element in a first database;
encrypting each secret key with the member's public key; and
storing each encrypted secret key in a second database, along with the member's identification number.

19. In a network including a plurality of network devices operated by a plurality users, a method for granting access to member profile information that provides for selective real-time information exchange of the member profile information between network devices comprising the steps of:
selecting, by a member, at least one data element associated with the member;
selecting, by the member, at least one other member to which to grant access to the selected data elements;
for each data element,
retrieving an encrypted secret key associated with the data element and the member;
decrypting the encrypted secret key with a private key associated with the member; and
for each selected member,
encrypting the secret key with the member's associated public key; and
storing the encrypted secret key and the member's identification number in a database.

20. In a network including a plurality of network devices operated by a plurality of users, a method for retrieving member profile information of another member that provides for selective real-time information exchange of the member profile information between network devices comprising the steps of:
selecting a data element for retrieval;
retrieving an encrypted secret key associated with the requestor and the data element;
decrypting the encrypted secret key using the member's private key;
decrypting the data element using the secret key; and
providing the decrypted data element to the requestor.

21. In a network, a real-time information exchange server comprising:
a data storage including a database of profile information for a plurality of members, the profile information for each member including a member identification number and a public/private key pair;
a processor connected to the data storage;
a memory connected to the processor and having program instructions stored therein, the processor being operable to execute the program instructions, the program instructions including:
receiving data elements to be stored in the database, each data element having an associated member;
generating a secret key for each received data element;
encrypting each data element with its corresponding secret key;
storing each encrypted data element in a first table in the database;
encrypting each generated secret key using the associated member's public key; and
storing each encrypted secret key, its corresponding member's ID and a reference to the corresponding stored encrypted data element in a second table in the database.

22. The information exchange server of claim 21 wherein the program instructions further include instructions for selectively granting and denying access to each of its associated data elements to users of the network including:

receiving at least one data element selected by a granting member;

receiving at least one member identity selected by the granting member to whom to grant access to the selected data element;

for each selected data element, retrieving from the second table of the database an encrypted secret key associated with the data element and the granting member;

decrypting the encrypted secret with the granting member's private key; and for each selected member to whom access is to be granted, encrypting the decrypted secret key with the selected member's public key; and storing the encrypted secret key and the selected member's identification number in the second table of the database.

23. The information exchange server of claim 22 wherein the program instructions further include instructions for selectively retrieving member profile information of another member, including:

receiving a selection of a data element for retrieval;

retrieving, from the second table of the database, an encrypted secret key associated with the requesting member and the data element;

decrypting the encrypted secret key using the requesting member's private key;

decrypting the data element using the decrypted secret key; and providing the decrypted data element to the requestor.

24. In a network including a plurality of network devices operated by a plurality of users, a real-time information exchange system for sharing member profile information between the network devices comprising:

means for storing member profile information;

means, controlled by each respective member, for selectively granting and denying access to its stored member profile information on a field-by-field basis; and means for retrieving, by one member, the member profile information of another member.

\* \* \* \* \*